(12) United States Patent
He

(10) Patent No.: US 12,408,798 B2
(45) Date of Patent: Sep. 9, 2025

(54) MICROWAVE COOKING SYSTEMS

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 1026 days.

(21) Appl. No.: 17/383,729

(22) Filed: Jul. 23, 2021

(65) Prior Publication Data

US 2022/0031123 A1 Feb. 3, 2022

Related U.S. Application Data

(60) Provisional application No. 63/057,519, filed on Jul. 28, 2020.

(51) Int. Cl.
| | |
|---|---|
| *A47J 44/00* | (2006.01) |
| *A47J 36/32* | (2006.01) |
| *A47J 37/10* | (2006.01) |
| *A47J 47/01* | (2006.01) |
| *B25J 11/00* | (2006.01) |
| *B67D 7/02* | (2010.01) |
| *H05B 6/64* | (2006.01) |

(52) U.S. Cl.
CPC .............. *A47J 44/00* (2013.01); *A47J 36/32* (2013.01); *A47J 37/108* (2013.01); *A47J 47/01* (2013.01); *B25J 11/0045* (2013.01); *B67D 7/02* (2013.01); *H05B 6/6411* (2013.01)

(58) Field of Classification Search
None
See application file for complete search history.

(56) References Cited

U.S. PATENT DOCUMENTS

| | | | | |
|---|---|---|---|---|
| 3,736,860 | A * | 6/1973 | Vischer, Jr. ............. | F24C 7/087 99/477 |
| 11,717,115 | B2 * | 8/2023 | He .......................... | A47J 36/34 99/339 |
| 2012/0102883 | A1 * | 5/2012 | Raniwala .............. | B67C 7/0073 53/425 |

* cited by examiner

*Primary Examiner* — Steven W Crabb
*Assistant Examiner* — Theodore J Evangelista

(57) ABSTRACT

The present application firstly discloses a cooking system comprising two cooking apparatuses, each capable of producing a cooked food from food or food ingredient(s). The first cooking apparatus comprises a plurality of microwave ovens which can be moved by an intermittent motion mechanism or a transport system. The second cooking apparatus comprises a cookware and a motion mechanism to move the cookware to dispense a cooked food to a food container. A semi-cooked food is produced by a microwave oven of the first cooking apparatus and is used as an ingredient in the second cooking apparatus to produce cooked food.

20 Claims, 49 Drawing Sheets

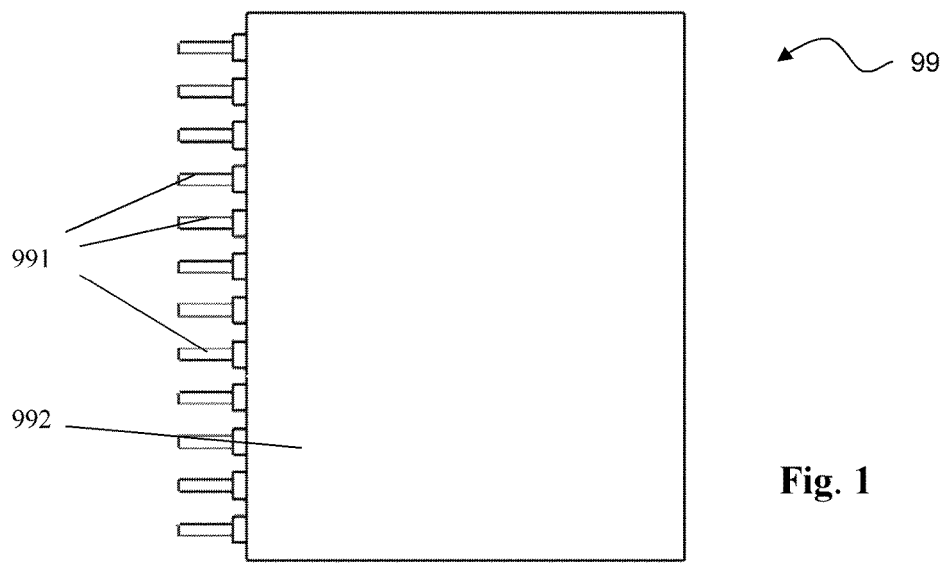
Fig. 1
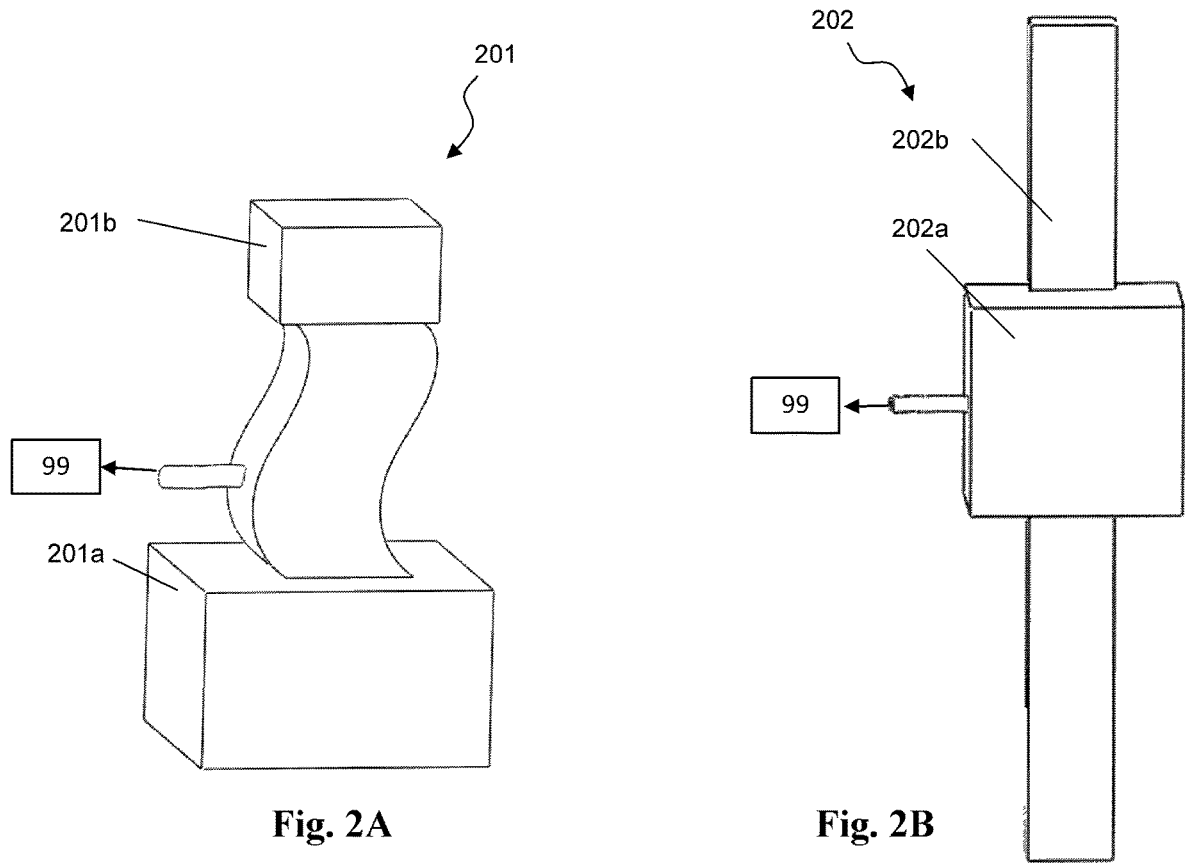
Fig. 2A
Fig. 2B

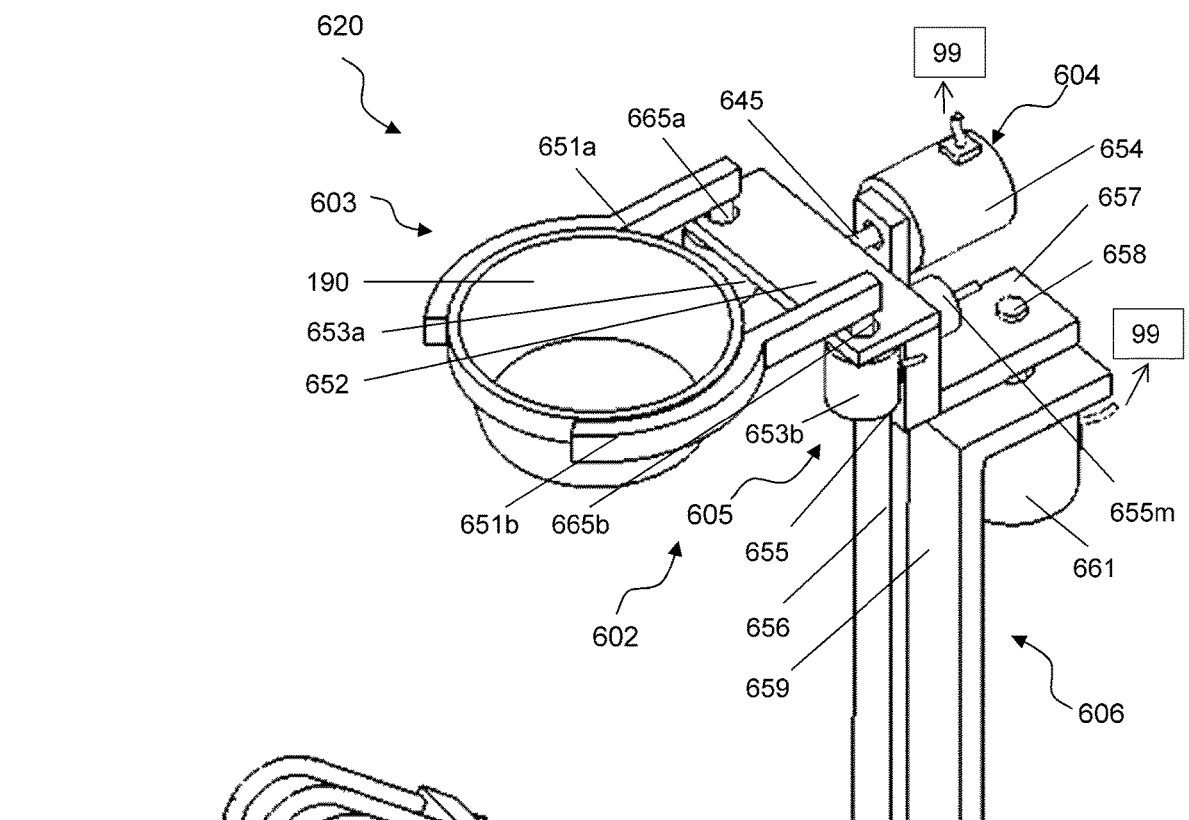
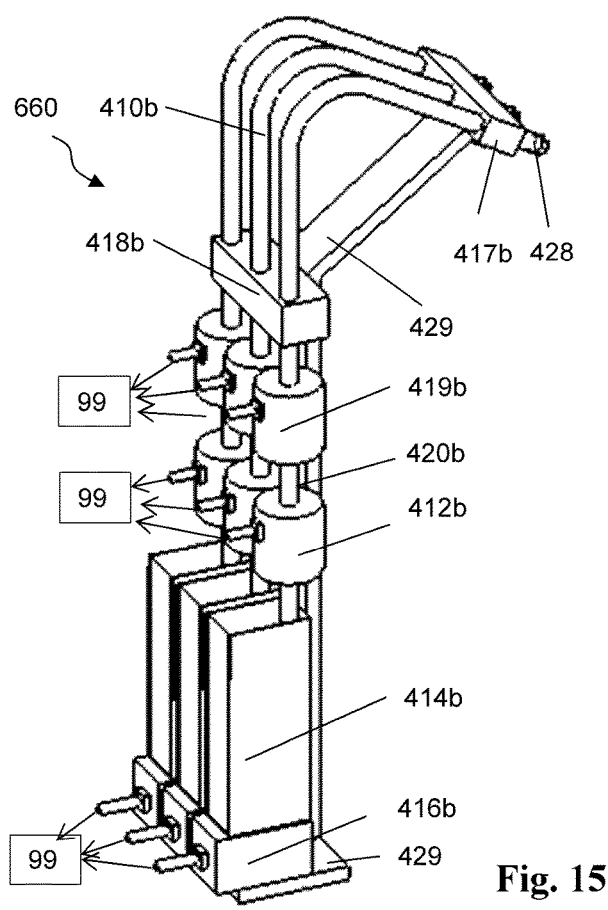
Fig. 14
Fig. 15

The computer system 99 is configured to store a program configured to send or receive signals to and from the motorized mechanisms, inductive stoves, motors, and pumps of the cooking system 909. 961

↓

The computer system 99 comprises a database. 962

↓

The computer system 99 stores the IDs of the cooking apparatuses, receiving apparatus, cookware cleaning mechanism, liquid dispensing mechanism, ingredient dispensing mechanism, transfer mechanisms, transport system. 963

↓

The computer system 99 stores the information of the structure of each mini-vehicle of the transfer system 302, including the ingredient container types that can be placed on the holders of the vehicle 790. 964

↓

The computer system 99 stores a program for controlling the transport systems 302 and 303, said program configured to control a mini-vehicle 790 of the transport system 302 to move to a position near a cooking station of the cooking system 909, so that an ingredient container on a given holder of the mini-vehicle 790 is at a dispensing position relative to the cooking apparatus at a pre-scheduled time. Said program configured to control a mini-vehicle 640 of the transport system 303 to move to a position near a receiving apparatus, so that the mini-vehicle 640 is at a food container transferring position relative to the support component of the receiving apparatus. 965

↓

The computer system 99 stores a list of food items which can be cooked by the cooking system 909. 966

↓

For each food item of the list of Step 966, the computer system 99 stores a cooking program configured to control the motorized mechanisms, inductive stoves, pumps and devices in the cooking system 909. 967

↓

For each food item of the list of Step 966, the computer system 99 stores types and quantities of food ingredients, relative timing of their dispensing and the respective ID of the destination cooking apparatus for each ingredient. 968

Fig. 27

```
┌─────────────────────────────────────────────────────────────────────┐
│ The computer system 99 takes an order of a food item. 971          │
└─────────────────────────────────────────────────────────────────────┘
                                    ↓
┌─────────────────────────────────────────────────────────────────────┐
│ The computer system 99 finds the information on the types and      │
│ quantities of the ingredients needed for cooking the ordered food   │
│ item, in accordance with the information stored by the computer     │
│ system in Step 968. 972                                             │
└─────────────────────────────────────────────────────────────────────┘
                                    ↓
┌─────────────────────────────────────────────────────────────────────┐
│ The computer system 99 locates the ingredient containers that       │
│ contain the ingredients. 973                                        │
└─────────────────────────────────────────────────────────────────────┘
                                    ↓
┌─────────────────────────────────────────────────────────────────────┐
│ The computer system 99 schedules cooking of the ordered food item   │
│ at the cooking system 909, including the timing for running the     │
│ program of Step 967 corresponding to the ordered food item, timing  │
│ of dispensing of the food ingredients from each ingredient          │
│ container into a respective cooking container or cookware of the    │
│ cooking system 909. 974                                             │
└─────────────────────────────────────────────────────────────────────┘
                                    ↓
┌─────────────────────────────────────────────────────────────────────┐
│ The computer system 99 controls the transport system 302 so that    │
│ each ingredient container of Step 972 may be moved and stopped per  │
│ the schedule of Step 974. 975                                       │
└─────────────────────────────────────────────────────────────────────┘
                                    ↓
┌─────────────────────────────────────────────────────────────────────┐
│ The computer system 99 runs the program of Step 967 corresponding   │
│ to the ordered food item, according to the schedule of Step 974,    │
│ as to send or receive signals to or from the motorized mechanisms,  │
│ inductive stoves, temperature sensors and pumps of the cooking      │
│ system 909. The cooking of the food item is complete after all      │
│ these steps. 976                                                    │
└─────────────────────────────────────────────────────────────────────┘
```

Fig. 28

MICROWAVE COOKING SYSTEMS

This application claims the benefit of U.S. Provisional Application Ser. No. 63/057,519 filed Jul. 28, 2020, the disclosures of which are hereby incorporated herein by reference in their entireties.

CROSS-REFERENCE TO RELATED APPLICATIONS

US Provisional Patent Application

Ser. No. 63/057,519, filed Jul. 28, 2020, Inventor: Zhengxu He

US Patent Application

Ser. No. 15/706,136, filed Sep. 15, 2017, Inventor: Zhengxu He

Ser. No. 15/801,923, filed Nov. 2, 2017, Inventor: Zhengxu He

Ser. No. 15/798,357, filed Oct. 30, 2017, Inventor: Zhengxu He

Ser. No. 16/155,895, filed Oct. 10, 2018, Inventor: Zhengxu He

Ser. No. 16/510,982, filed Jul. 15, 2019, Inventor: Zhengxu He

Ser. No. 16/517,705, filed Jul. 22, 2019, Inventor: Zhengxu He

Ser. No. 16/997,196, filed Aug. 19, 2020, Inventor: Zhengxu He

Ser. No. 16/997,933, filed Aug. 20, 2020, Inventor: Zhengxu He

Ser. No. 17/069,707, filed Oct. 13, 2020, Inventor: Zhengxu He

U.S. Pat. No. 10,455,987, issued Oct. 29, 2019, Inventor: Zhengxu He.

BACKGROUND OF THE INVENTION

The present application relates to a cooking system for producing a cooked food from food or food ingredient(s). In cooking of a food item, one or more of the following steps are required: (1) a first food or food ingredient is dispensed in a cookware such as wok; (2) a second food or food ingredient is heated in a cooking container and then dispensed in the cookware; (3) all foods or food ingredients are then stirred and/or mixed and/or heated in the cookware, to produce a cooked food; and (4) the cooked food is then dispensed into a food container, such as a dish or a bowl.

A cost-effective cooking apparatus or cooking system that does some or all of the above steps are important, as it can save labor and cost.

Furthermore, cost-effective transportation of the first and second food or food ingredient(s) to the cookware or cooking containers, respectively, is also important for the same reason.

The automation of such cooking system depends on new computer algorithms.

BRIEF SUMMARY OF THE INVENTION

A cooking system in our application comprises some cooking apparatuses and other mechanisms and/or apparatuses. The present patent application discloses a cooking system comprising a second cooking apparatus and a first cooking apparatus; wherein the first cooking apparatus comprises a plurality of microwave ovens and an intermittent motion mechanism which moves the microwave ovens.

The second cooking apparatus comprises one or more of the following parts: (1) a cookware configured to contain or otherwise hold a food or a food ingredient for the purpose of cooking a food; (2) a motion apparatus comprising a stirring motion mechanism configured to move the cookware to stir or mix the food or food ingredient contained in the cookware and a motion mechanism configured to directly or indirectly move the cookware, to dispense a cooked food into a food container; (3) a transfer apparatus configured to grip and hold a food container to allow the motion apparatus to dispense a cooked food from the cookware into a food container; and (4) a plurality of cooking containers configured to contain or otherwise hold a food or a food ingredient, a food dispensing apparatus configured to move a cooking container, said food dispensing apparatus configured to dispense a semi-cooked food held in the cooking container to the cookware. The first cooking apparatus comprises one or more of the following parts: (5) a plurality of cooking containers each configured to contain or otherwise hold a food or a food ingredient for the purpose of heating the latter; (6) a connected group of container holders each configured to position or otherwise hold a said cooking container; (7) a motion mechanism configured to produce a cyclic motion in the group of container holders; (8) above and corresponding to each of the container holders, an enclosure mechanism comprising an enclosure device configured to help enclose a cooking chamber; (9) heaters; and (10) a dispensing apparatus configured to grip and hold a said cooking container and to move it to dispense the food or food ingredient from the cooking container to the cookware of the second cooking apparatus.

The cookware may be a wok, a pan, or any container configured to contain or otherwise hold a food or a food ingredient during cooking. A cooking container may be a wok, a pan, a bowl, a basket, etc.

Implementations of our cooking system may include one or more of the following. The stirring motion mechanism may comprise a support component and a mechanism configured to produce a motion of the cookware relative to the support component, to stir or mix the food or food ingredient in the cookware. The stirring motion mechanism may comprise: a first shaft; a second shaft; a third shaft; a fourth shaft; and a fifth shaft, wherein the axes of the shafts may be configured to be parallel to each other.

Implementations of our cooking system may include one or more of the following. A motion mechanism is configured to produce an axial rotation of the support component of the stirring motion mechanism to dispense a cooked food from the cookware; wherein the axis of the axial rotation is configured to be horizontal.

Our cooking system may further comprise a dispensing apparatus which dispenses a food or a food ingredient into the cookware and/or a cooking container. The cooking system may also comprise a transfer apparatus which may move a food container containing a cooked food to an area accessible by humans.

Implementations of our cooking system may include one or more of the following. A dispensing apparatus may comprise: (1) a gripping mechanism comprising a first support component, grippers, and a motion mechanism configured to produce a controlled rotation of the gripper relative to the first support component to grab or release a container; (2) a second support component; and (3) a motion mechanism configured to produce a rotation of the first support component relative to the second support component.

A computer is used to control the above-described mechanisms and apparatuses.

BRIEF DESCRIPTION OF THE SEVERAL VIEWS OF THE DRAWINGS

FIG. 1 shows an aerial view of a computer system.

FIG. 2A shows an aerial view of a motion mechanism. FIG. 2B shows an aerial view of a linear motion mechanism

FIG. 14 shows an aerial view of a food dispensing apparatus.

FIG. 15 shows an aerial view of a liquid dispensing apparatus.

FIG. 27 is a flow chart showing the procedures performed by the computer system of the cooking system of FIG. 20B prior to cooking of a food.

FIG. 28 is a flow chart showing the procedures performed by the computer system of the cooking system of FIG. 20B during the cooking of a food.

DETAILED DESCRIPTION OF THE INVENTION

Figure 2C:
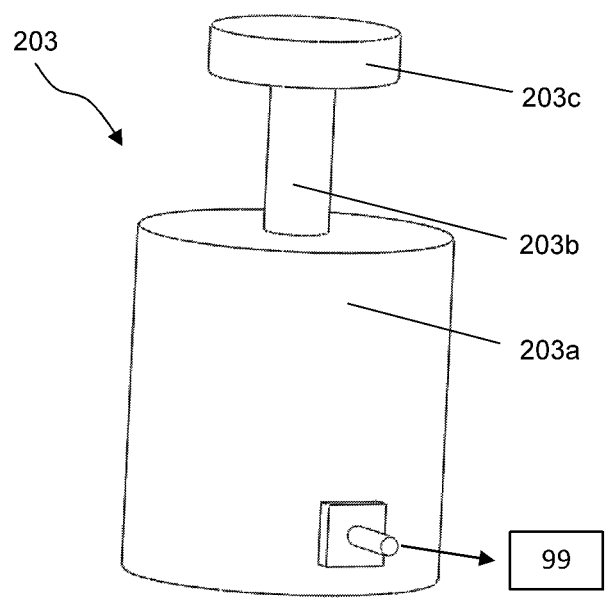
FIG. 2C shows an aerial view of a rotational motion mechanism.

For the present patent application, a food ingredient refers to any of the foods or substances that are combined to make a particular food. A food ingredient can be raw or pre-cooked. A food ingredient can be solid, powder, liquid, or a mixture, etc. A food ingredient can be raw meat, sausage, fresh vegetable, dry vegetable, cooking oil, vinegar, soy sauce, water, or salt, etc.

For the present patent application, a computer system is meant to be any system or apparatus that includes one or more computers. A computer system may or may not include a database. A computer system may or may not include a network. A computer system may or may not include a memory shared by several computers. A computer system may include software. A single computer with software can be considered to be a computer system.

For the present patent application, a shaft always comprises an axis. A shaft can have different shapes at different sections. A sectional shape of a shaft can be round or rectangular, or of other shapes. For the present patent application, a rotational movement refers to a rotational movement around an axis. A rotational mechanism refers to any mechanism comprising two mating parts which are constrained to rotate relative to each other. An example of a rotational mechanism comprises a shaft and a bearing housing as mating parts, wherein the shaft and bearing housing are connected by bearings and accessories.

In some applications or embodiments, a motor comprises a base component (e.g., a frame) which is a stationary member of the motor, and a shaft which is a moving member of the motor, wherein a (usually rotational) motion of the shaft relative to the base component can be produced. A motor may be connected to a computer via wires, and/or through a driver, and/or a controller and/or a relay and/or a wireless communication device. The base component of a motor may be referred to as the support component of the motor.

Similarly, an encoder may comprise a base component, and a shaft which is rotatable relative to the base component, where the encoder can detect the degree of rotation of the shaft relative to the base component, and then inform a computer of the degree by sending signals to the computer.

Various parts of our cooking apparatuses and cooking systems are described below.

Referring to FIG. 1, a computer system 99 comprises a computer 992 with I/O ports 991. Via the I/O ports 991, the computer 992 may be connected to other electric or electronic devices including but not limited to: motors (including motors with controllers); actuators; inductive stoves; sensors; etc., so that the computer may communicate with the devices by known techniques. The communications can optionally be one way or two-way (to and from). For example, the signals of the electrical or electronic devices may be sent to the computer 992; the computer 992 may control the operations of the electrical or electronic devices by sending signals to the electrical or electronic devices. The connection of the computer 992 to the electric or electronic devices may comprise wires, wireless communication devices, controllers, drivers, and/or circuit boards. The computer system 99 comprises a memory. The computer system 99 may store data in the computer system's memory. The computer system 99 may control motors; actuators; stoves or heaters; and other devices by known techniques.

It should be noted that the computer system 99 may further comprise additional computers, a computer network, a database, computer programs, wireless communication ports, and/or other electric and electronic components.

A connection of the computer system 99 to an electric or electronic device may comprise a (wired or wireless) connection of a computer of the computer system to the device. Thus, a device is connected to the computer system 99 if the device is connected to a computer of the computer system.

Referring to FIG. 2A, a motion mechanism 201 comprises a stationary member 201a and a moving member 201b, which is connected (but not rigidly connected) to the stationary member. In many applications the movement of the moving member 201b is constrained relative to the stationary member 201a. The motion mechanism 201 comprises a driving mechanism (not shown in figure) configured to produce a motion of the moving member 201b relative to the stationary member 201a. The motion mechanism 201 may be connected to the computer system 99 of FIG. 1 via wires or by wireless means and the computer system 99 may be configured to control the timing and speed of the motion mechanism 201.

The motion mechanism 201 is a generic motion mechanism. Implicitly, the motion mechanism 201 includes a connection configured to connect the moving member to the stationary member, wherein the connection may often comprise bearings, sliders, kinematic pairs, and/or transmission mechanisms. The driving mechanism may be connected to the computer system 99 (via wires or by wireless means). The driving mechanism may be powered by electricity or other energy sources. A typical example of a driving mechanism is a motor.

Referring to FIG. 2B, a linear motion mechanism 202 comprises a stationary member 202a and a moving member 202b, wherein the moving member 202b is constrained to move linearly relative to the stationary member 202a. The linear motion mechanism 202 comprises a driving mechanism (not shown in figure) configured to produce a linear motion of the moving member 202b relative to the stationary member 202a. The linear motion mechanism 202 may be connected to the computer system 99 of FIG. 1 via wires or by wireless means, and the computer system 99 may be configured to control the timing and speed of the linear motion mechanism 202.

The linear motion mechanism 202 is a generic one. Examples of linear motion mechanisms include but are not limited to: a linear actuator; and a mechanism comprising linear rail, a slider configured to slide linearly on the linear rail, and a driving mechanism configured to drive the linear motion of the slider; etc.

It should be noted that the linear motion mechanism 202 may comprise an electric (or pneumatic, hydraulic) putter, or other types of putter. The linear motion mechanism 202 may include a motor which produces a rotational motion and a transmission mechanism configured to convert a rotation into a linear motion; wherein the transmission mechanism may optionally comprise a gear and rack, a screw rod and nut, or a sprocket and chain, etc.

A linear motion mechanism (such as the mechanism 202) is called a vertical motion mechanism if the direction of the linear motion is vertical. A linear motion mechanism (such as the mechanism 202) is called a horizontal motion mechanism if the direction of the linear motion is horizontal.

It should be noted that the rotation produced by a rotational motion mechanism may be a continuous rotation, an intermittent motion, or a rotation between two end-positions.

Referring to FIG. 2C, a rotational motion mechanism 203 comprises a stationary member 203a and a moving member 203b which is constrained to rotate relative to the stationary member 203a. The rotational motion mechanism 203 comprises a driving mechanism (not shown in figure) configured to produce a rotation of the moving member 203b relative to the stationary member 203a around an axis, wherein the axis of the rotation is referred to as the axis of the rotational motion mechanism. The rotational motion mechanism 203 may be connected to the computer system 99 of FIG. 1 via wires or by wireless means, and the computer system 99 may be configured to control the timing and speed of the rotational motion mechanism 203.

Figure 2D:
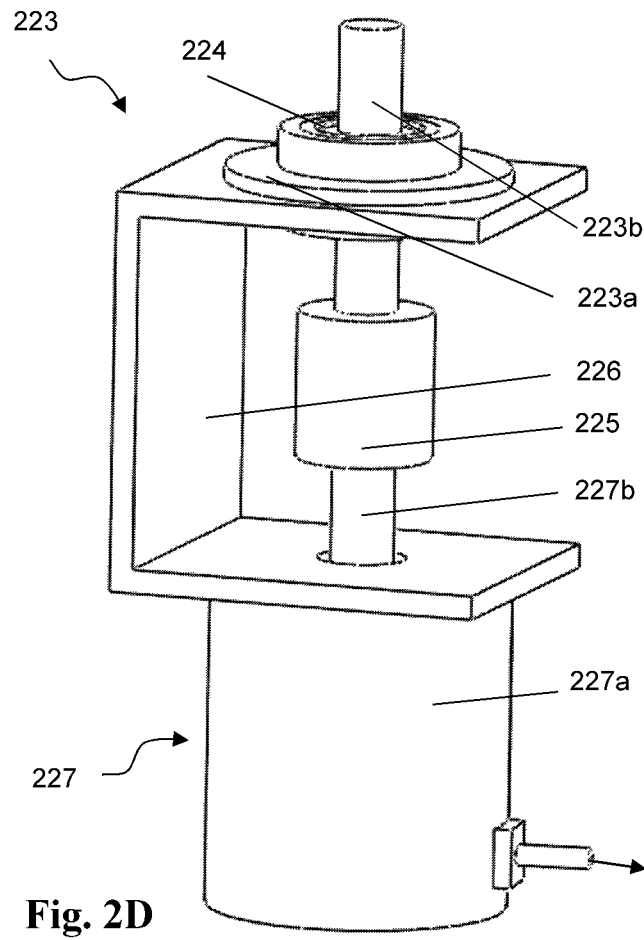
FIG. 2D shows an aerial view of a rotational motion mechanism.

Referring to FIG. 2D, a rotational motion mechanism 223 comprises: a bearing housing 223a as a stationary member;

a shaft 223b as a moving member; and a motor 227 as a driving member, i.e., a driving mechanism. The bearing housing 223a and the shaft 223b are connected by bearings 224 and accessories so that the shaft 223b is constrained to rotate relative to the bearing housing 223a. The motor 227 comprises a base component 227a and a shaft 227b so that the motor may produce a rotation of the shaft 227b relative to the base component 227a. The base component 227a of the motor is rigidly or fixedly connected to the bearing housing 223a via a connector 226, and the shaft 227b of the motor is connected to the shaft 223b by a coupling 225. It should be clear that the motor 227 may produce a rotation of the shaft 223b relative to the bearing housing 223a. The motor 227 is a driving mechanism of the rotational motion mechanism 223.

It should be noted that the rotation produced by a rotational motion mechanism may be a continuous rotation, an intermittent motion, or a rotation between two end-positions.

Figure 2E:
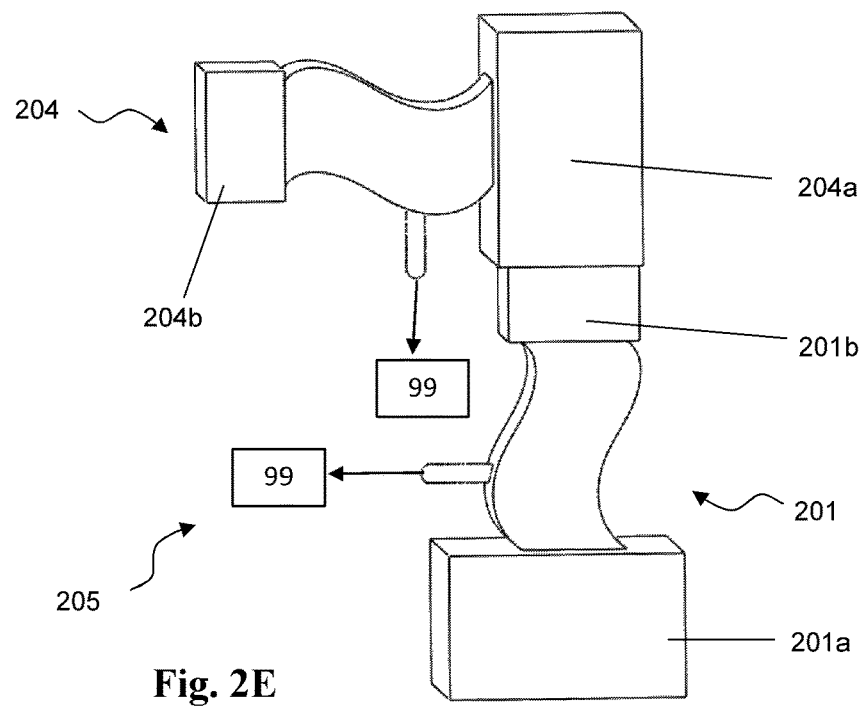
FIG. 2E shows an aerial view of a combination motion mechanism.

Referring to FIG. 2E, a motion mechanism 205 is a combination of two motion mechanisms 201 and 204, which may also be referred to as motion sub-mechanisms; wherein the motion mechanism 201 is as described as in FIG. 2A; wherein the motion mechanism 204 is a motion mechanism comprising a stationary member 204a, a moving member 204b which is connected to the stationary member 204a, and a driving mechanism (not shown in figure) configured to produce a motion of the moving member 204b relative to the stationary member 204a. The moving member 201b of the motion mechanism 201 is fixedly or rigidly connected to the stationary member 204a of the motion mechanism 204, so that the motion mechanism 201 can produce a motion of the stationary member 204a relative to the stationary member 201a of the motion mechanism 201. The combination motion mechanism 205 may be connected to the computer system 99 of FIG. 1 in the sense that the motion sub-mechanisms 201 and 204 are connected to the computer system 99 via wires or by wireless means, and the computer system 99 may be configured to control the motions produced by the motion sub-mechanisms of the combination motion mechanism 205.

The motion mechanism 205 is referred to as a combination motion mechanism. It should be noted that the motion sub-mechanisms 201 and 204 may produce motions simultaneously. This applies to any combination motion mechanism in the following. Combination motion mechanisms are special cases of motion mechanisms.

Figure 2F:
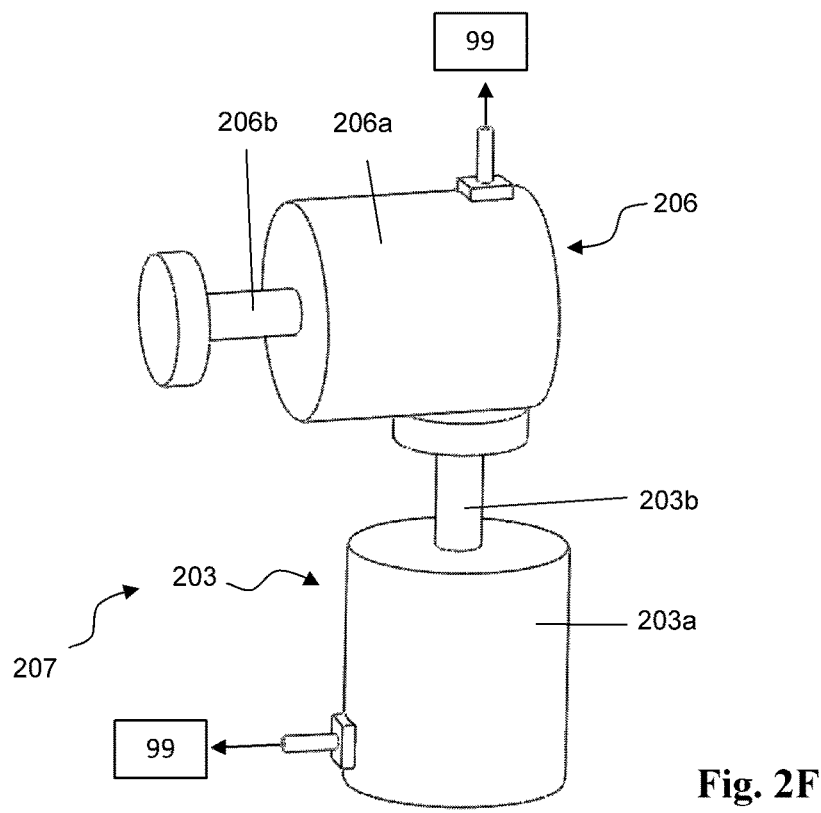
FIG. 2F shows an aerial view of a combination motion mechanism.

Referring to FIG. 2F, a combination motion mechanism 207 comprises rotational motion mechanisms 203 and 206, referred to as motion sub-mechanisms; wherein the motion mechanism 203 is described in FIG. 2C; wherein the motion mechanism 206 is a rotational motion mechanism comprising a stationary member 206a, a moving member 206b which is constrained to rotate relative to the stationary member 206a, and a driving mechanism (not shown in figure) configured to produce a rotational motion of the moving member 206b relative to the stationary member 206a. The moving member 203b of the motion mechanism 203 is fixedly or rigidly connected to the stationary member 206a of the rotational motion mechanism 206, so that the rotational motion mechanism 203 can produce a rotation of the stationary member 206a relative to the stationary member 203a around the axis of the rotational motion mechanism 203. The combination motion mechanisms 207 may be connected to the computer system 99 of FIG. 1 in the sense that the motion sub-mechanisms 203 and 206 are connected to the computer system 99 via wires or by wireless means, and the computer system 99 may be configured to control the motions produced by the motion sub-mechanisms of the combination motion mechanism 207.

Figure 2G:
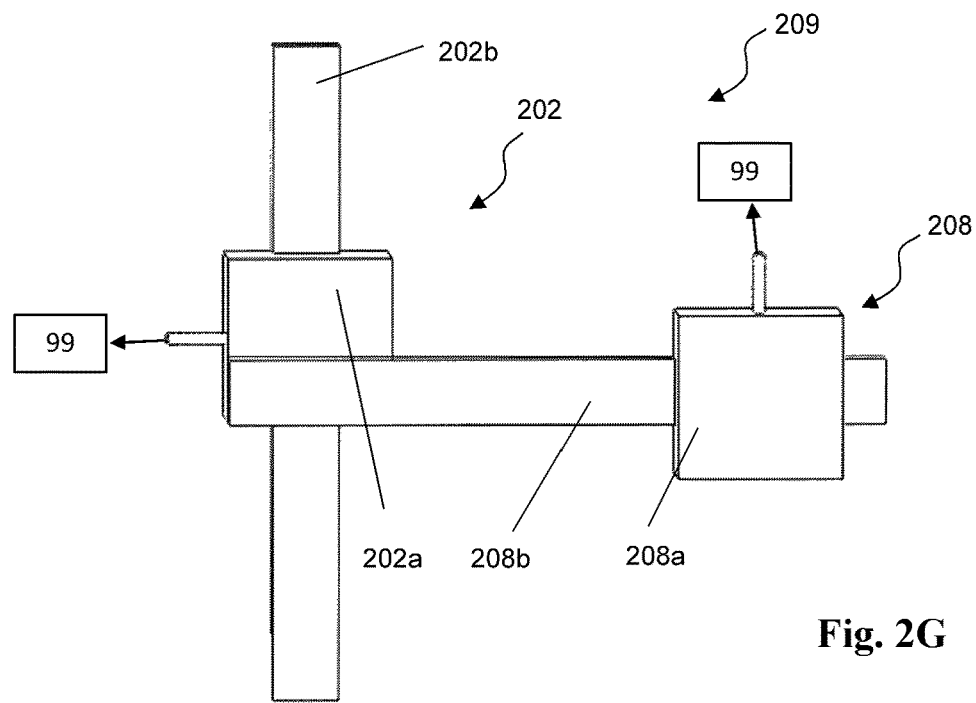
FIG. 2G shows an aerial view of a combination motion mechanism.

Referring to FIG. 2G, a combination motion mechanism 209 comprises two linear motion mechanisms 202 and 208, which may also be referred to as motion sub-mechanisms; wherein the motion mechanism 202 is described in FIG. 2B; wherein the motion mechanism 208 is a linear motion mechanism comprising a stationary member 208a, a moving member 208b which is constrained to move linearly relative to the stationary member 208a, and a driving mechanism (not shown in figure) configured to produce a linear motion of the moving member 208b relative to the stationary member 208a. The moving member 208b of the linear motion mechanism 208 is rigidly or fixedly connected to the stationary member 202a of the linear motion mechanism 202, so that the linear motion mechanism 208 can produce a linear motion of the stationary member 202a relative to the stationary member 208a. The combination motion mechanism 209 may be connected to the computer system 99 of FIG. 1 in the sense that the motion sub-mechanisms 202 and 208 are connected to the computer system 99 via wires or by wireless means, and the computer system 99 may be configured to control the motions produced by the motion sub-mechanisms of the combination motion mechanism 209.

Figure 2H:
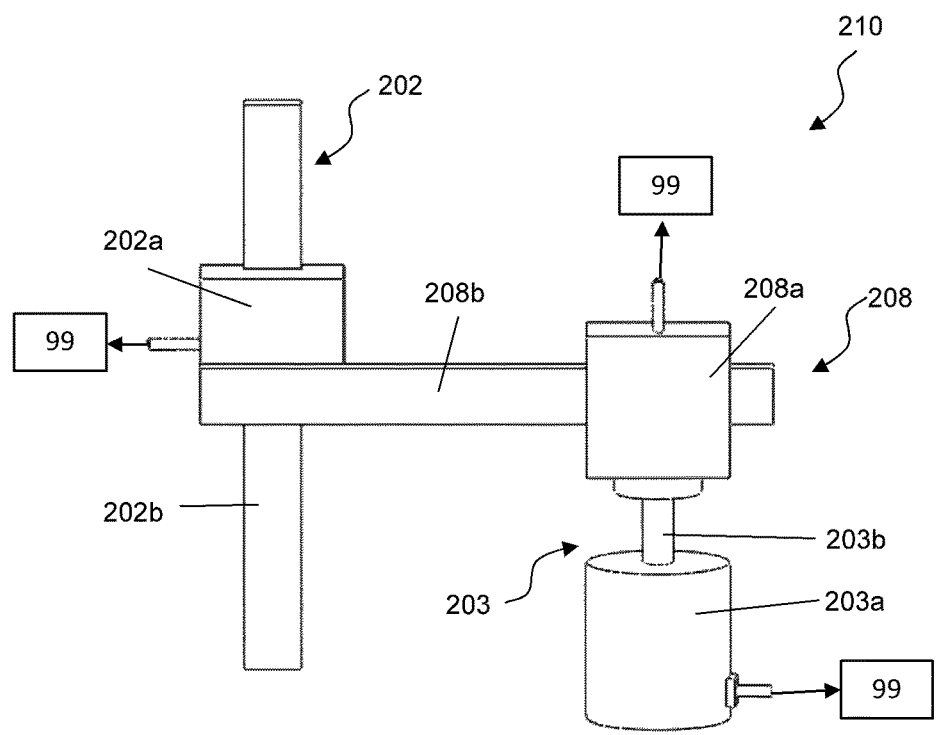
FIG. 2H shows an aerial view of a combination motion mechanism.

Referring to FIG. 2H, a combination motion mechanism 210 comprises a rotational motion mechanism 203 and two linear motion mechanisms 202 and 208; wherein motion mechanisms 203, 202 and 208 are referred to as motion sub-mechanisms. The moving member 208b of the linear motion mechanism 208 is rigidly or fixedly connected to the stationary member 202a of the linear motion mechanism 202, so that the linear motion mechanism 208 can produce a linear motion of the stationary member 202a relative to the stationary member 208a of the linear motion mechanism 208. The moving member 203b is fixedly connected to the stationary member 208a of the linear motion mechanism 208, so that the rotational motion mechanism 203 can produce a rotation of the stationary member 208a relative to the stationary member 203a. The combination motion mechanisms 210 may be connected to the computer system 99 of FIG. 1 in the sense that the motion sub-mechanisms 202, 203 and 208 are connected to the computer system 99 via wires or by wireless means, and the computer system 99 may be configured to control the motions produced by the motion sub-mechanisms of the combination motion mechanism 210.

Figure 2I:
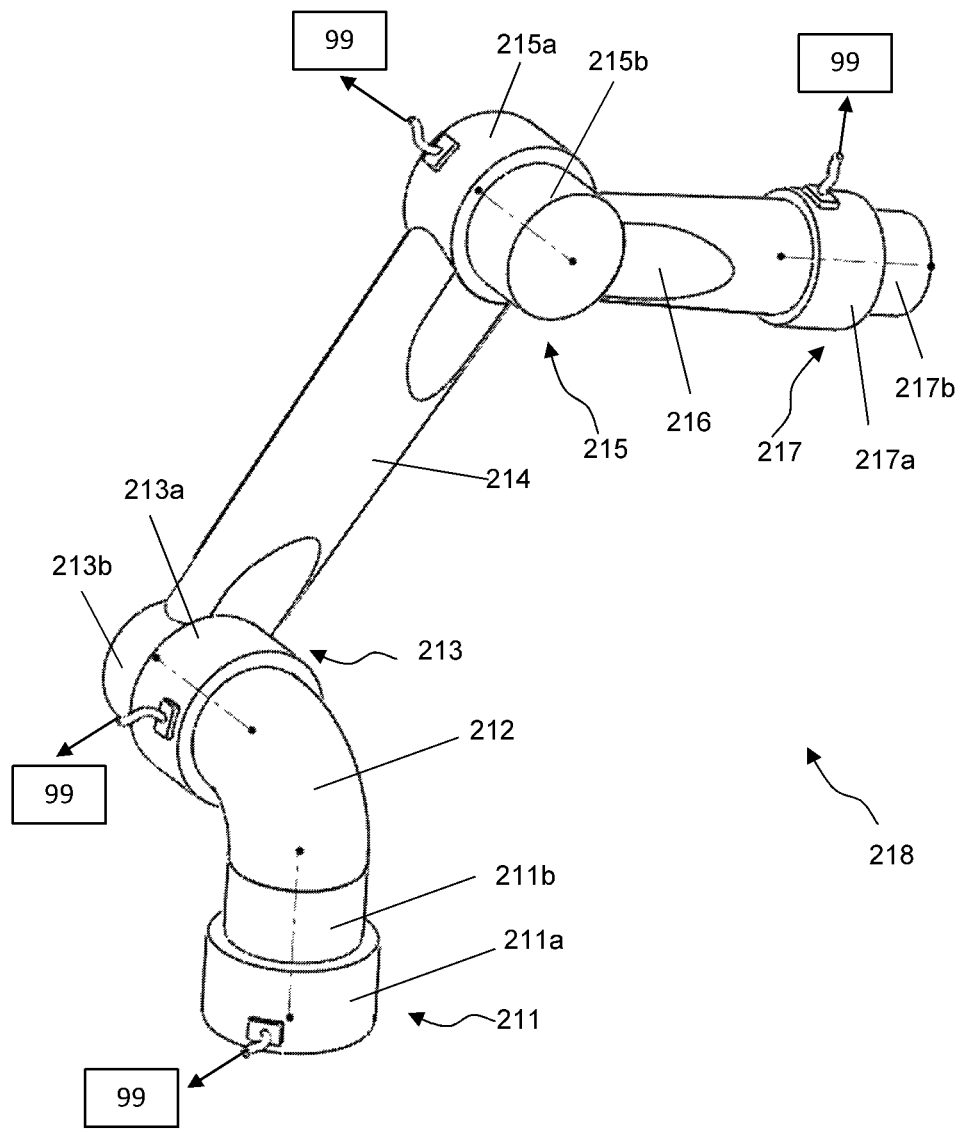
FIG. 2I shows an aerial view of a robot arm.

Referring to FIG. 2I, a robot arm 218 comprises a plurality of rotational motion mechanisms 211, 213, 215 and 217; wherein the motion mechanisms 211, 213, 215 and 217 are referred to as motion sub-mechanisms. The rotational motion mechanism 211, 213, 215 or 217 comprises: a stationary member 211a, 213a, 215a, or respectively 217a; a moving member 211b, 213b, 215b, or respectively 217b which is constrained to rotate relative to the respective stationary member; and a driving member comprising a motor (not shown in figure) configured to drive a rotation of the respective moving member relative to the respective stationary member around an axis. The moving member 211b of the rotational motion mechanism 211 is rigidly connected to the stationary member 213a of the rotational motion mechanism 213 via a connector 212; wherein the axis of the rotational motion mechanism 211 may optionally be perpendicular to the axis of the rotational motion mechanism 213. Thus, the motion mechanism 211 can produce a rotation of the stationary member 213a relative to the stationary member 211a. The moving member 213b of the rotational motion mechanism 213 is rigidly connected to the stationary member 215a of the rotational motion mechanism 215 via a rigid connector 214; wherein the axis of the rotational motion mechanism 213 may optionally be parallel to the axis of the rotational motion mechanism 215. The rotational motion mechanism 213 can produce a rotation of the stationary member 215a relative to the stationary member 213a. The moving member 215b of the rotational motion mechanism 215 is rigidly connected to the stationary member 217a of the rotational motion mechanism 217 via a connector 216; wherein the axis of the rotational motion mechanism 215 may optionally be perpendicular to the axis of the rotational motion mechanism 217, and the rotational motion mechanism 215 can produce a rotation of the stationary member 217a relative to the stationary member 215a. The robot arm 218 may be connected to the computer system 99 of FIG. 1 in the sense that the motion sub-mechanisms 211, 213, 215 and 217 are connected to the computer system 99 via wires or by wireless means, and the computer system 99 may be configured to control the motions produced by the motion sub-mechanisms of the robot arm 218.

The robot arm 218 is a combination motion mechanism which is a combination of the motion sub-mechanisms 211, 213, 215 and 217. Any robot arm of prior art may be used as a motion mechanism for our applications. Any motion mechanism of prior art may be used for our applications.

It should be possible to construct a combination motion mechanism from a rather arbitrary sequence of motion mechanisms, referred to as motion sub-mechanisms.

More examples of motion mechanisms are described in U.S. patent application Ser. Nos. 17/070,059 and 17/072,011. The entire contents of these applications are incorporated herein by reference.

Figure 3A:
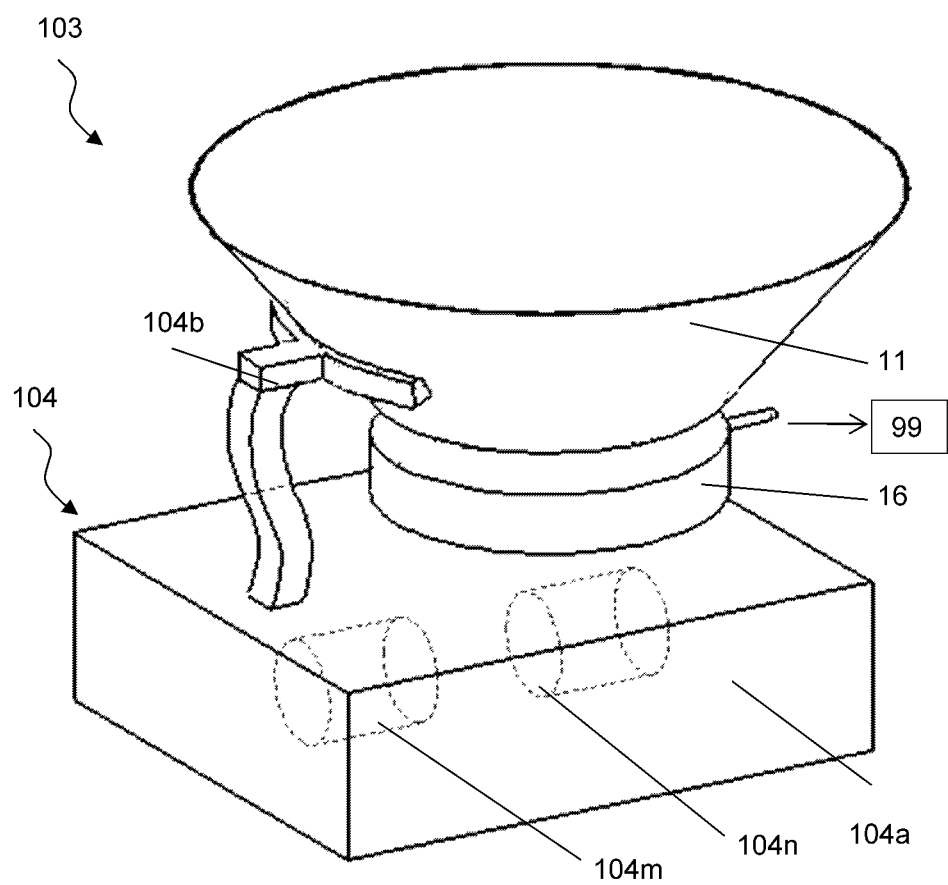
FIG. 3A shows an aerial view of parts of a cooking apparatus.

Referring to FIG. 3A, a cooking apparatus 103 comprises: a cookware 11; a heater (such as inductive stove, gas burner, electric burner, etc.) 16; and a motion mechanism 104 comprising a stationary member 104a and a moving member 104b. The moving member 104b is rigidly, fixedly, or otherwise connected to the cookware 11 at least during time of operation. The heater 16 is configured to heat the cookware 11 and hence the food or food ingredient held in the cookware. The motion mechanism 104 may produce a motion of the cookware to stir or mix the food or food ingredient in the cookware, using known techniques. The motion mechanism 104 may also be able to produce a motion (e.g., a rotation around a horizontal axis) of the cookware 11 to dispense a cooked food from the cookware 11, using known techniques. The motion mechanism 104 is driven by motors 104m and 104n, which are connected to the computer system 99 of FIG. 1 by wires or by wireless means. The stationary member 104a is referred to as the support component of the cooking apparatus 103.

As an example, the motion mechanism 104 may comprise a robot arm, wherein a moving part of the robot arm is connected to the cookware. The connection to the cookware may be temporary or permanent, depending on the particular application.

It should be noted that the heater may optionally be fixedly connected to the cookware. See, e.g., U.S. patent application Ser. No. 15/801,923, the disclosures of which are hereby incorporated herein by reference in its entirety. In other applications, the heater may optionally be fixedly connected to the floor of the building or the ground.

The motion mechanism 104 of the cooking apparatus 103 may be substituted by the stirring motion mechanism, the unloading motion mechanism (or unloading apparatus in the terms of some patent applications), the dispensing apparatus, or the combination of the above, as disclosed in U.S. patent application Ser. Nos. 16/997,196, 15/706,136, 15/801,923, 16/155,895, and 17/069,707. The entire contents of the applications are incorporated herein by reference.

Figure 3B:
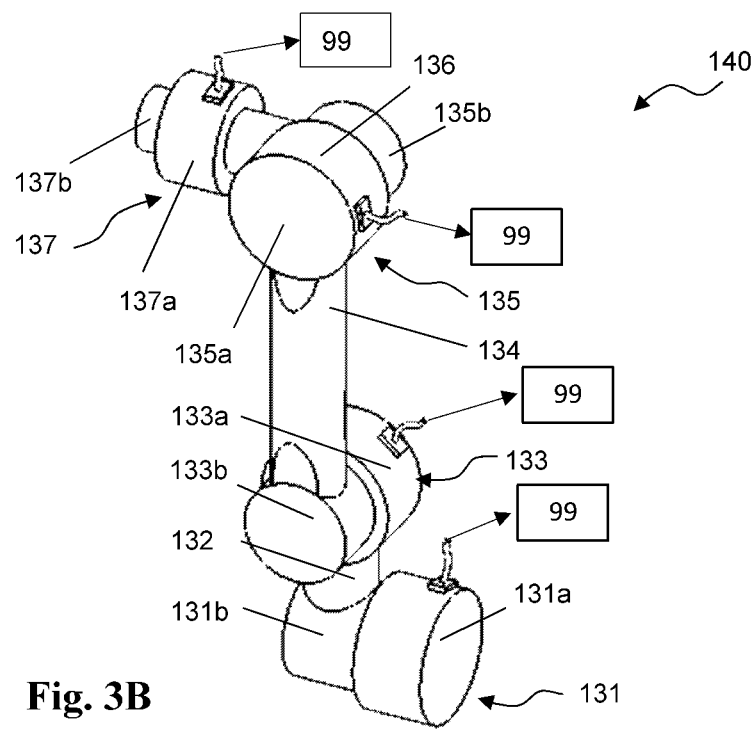
FIG. 3B shows an aerial view of a robot arm.

Referring to FIG. 3B, a robot arm 140 comprises a plurality of rotational motion mechanisms 131, 133, 135 and 137, referred to as motion sub-mechanisms. The rotational motion mechanism 131, 133, 135 or 137 comprises: a stationary member 131a, 133a, 135a, or respectively 137a; a moving member 131b, 133b, 135b, or respectively 137b which is constrained to rotate relative to the respective stationary member; and a driving member comprising a motor (not shown in figure) configured to drive a rotation of the respective moving member relative to the respective stationary member around a respective axis. The moving member 131b of the rotational motion mechanism 131 is rigidly connected to the stationary member 133a of the rotational motion mechanism 133 via a connector 132; wherein the axis of the rotational motion mechanism 131 may optionally be perpendicular to the axis of the rotational motion mechanism 133. Thus, the motion mechanism 131 can produce a rotation of the stationary member 133a relative to the stationary member 131a. The moving member 133b of the rotational motion mechanism 133 is rigidly connected to the stationary member 135a of the rotational motion mechanism 135 via a rigid connector 134; wherein the axis of the rotational motion mechanism 133 may optionally be parallel to the axis of the rotational motion mechanism 135. The rotational motion mechanism 133 can produce a rotation of the stationary member 135a relative to the stationary member 133a. The moving member 135b of the rotational motion mechanism 135 is rigidly connected to the stationary member 137a of the rotational motion mechanism 137 via a connector 136; wherein the axis of the rotational motion mechanism 135 may optionally be perpendicular to the axis of the rotational motion mechanism 137, and the rotational motion mechanism 135 can produce a rotation of the stationary member 137a relative to the stationary member 135a. The robot arm 140 may be connected to the computer system 99 of FIG. 1 in the sense that the motion sub-mechanisms 131, 133, 135 and 137 are connected to the computer system 99 via wires or by wireless means, and the computer system 99 may be configured to control the motions produced by the motion sub-mechanisms of the robot arm 140.

Figure 3C:
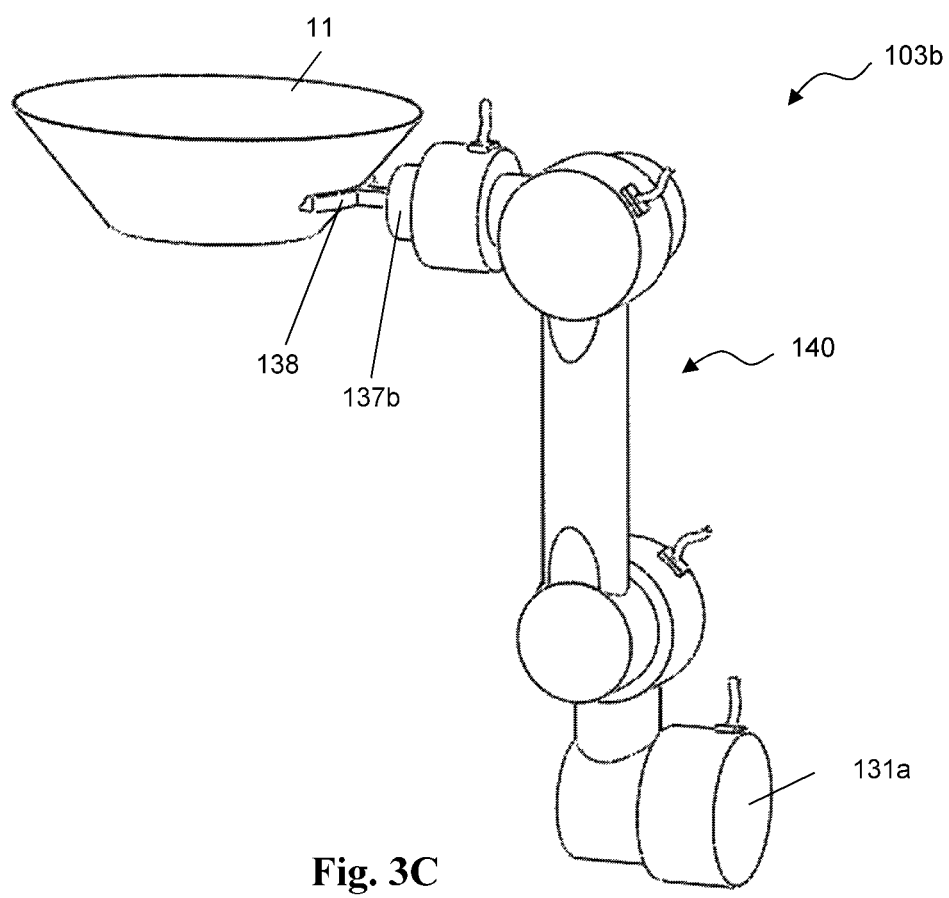
FIG. 3C shows a cooking apparatus comprising and the robot arm of FIG. 3B.

Referring to FIG. 3C, a cooking apparatus 103b comprises: a cookware 11 (as in FIG. 3A) configured to contain or hold a food or a food ingredient; and a robot arm 140 (as in FIG. 3B). The cookware 11 is fixedly or rigidly connected to the moving member 137b of the motion mechanism 137 of the robot arm 140 via a rigid component 138. The robot arm 140 can produce a cyclic and oscillatory motion (of the rigid component 138 and) of the cookware 11 as to stir and distribute a food or a food ingredient evenly in the cookware 11. The robot arm 140 can also produce a motion of (the rigid component 138 and) the cookware 11 wherein the cookware 11 may be turned by an angle in the motion so as to dispense a cooked food.

It should be noted that the robot arm 140 is capable of producing two types of motion of the cookware 11: a stirring motion of cyclic or oscillatory type to mix and distribute a cooked food or a food ingredient in the cookware 11; and an unloading motion to turn the cookware 11 in order to dispense a cooked food from the cookware 11.

The cooking apparatus 103b may substitute the cooking apparatus 103 in any cooking system, kitchen system, or automated restaurant described in the present patent application. This applies to the cooking system, kitchen system, or automated restaurant described in the following.

It should be further noted that the robot arm 140 in the cooking apparatus 103b may be substituted by other type of robot arm.

Figure 4A:
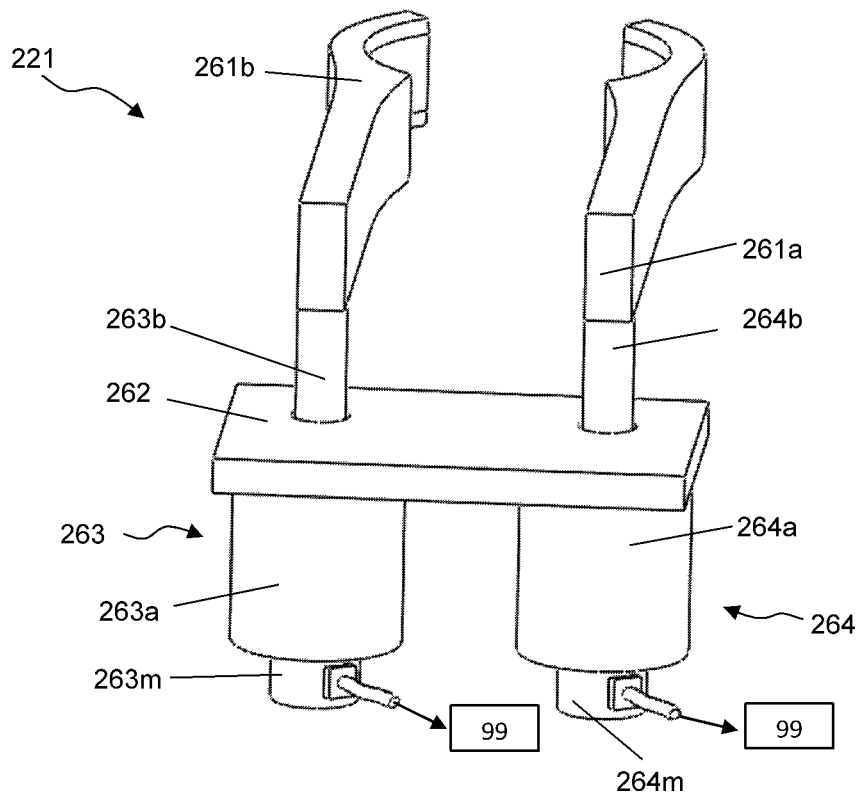
FIG. 4A shows an aerial view of a gripping mechanism.

Referring to FIG. 4A, a gripping mechanism 221 comprises: grippers 261a and 261b which can optionally be rigid or elastic components and rotational motion mechanisms 263 and 264. The rotational motion mechanism 263 comprises a stationary member 263a and a moving member 263b; and the rotational motion mechanism 263 is configured to produce a rotation of the moving member 263b relative to the stationary member 263a. The rotational motion mechanism 264 comprises a stationary member 264a and a moving member 264b; and the rotational motion mechanism 264 is configured to produce a rotation of the moving member 264b relative to the stationary member 264a. The stationary members 263a and 264a are fixedly connected to a support component 262. The gripper 261a is rigidly or fixedly connected to the moving member 264b. The rotational motion mechanism 264 can produce a rotation of the gripper 261a around the axis of the rotational motion mechanism 264 relative to the stationary member 264a. Similarly, the gripper 261b is rigidly or fixedly connected to the moving member 263b. The rotational motion mechanism 263 can produce a rotation of the gripper 261b around the axis of the rotational motion mechanism 263 relative to the stationary member 263a. As the gripper 261a or 261b is rigidly connected to the moving member 264b or respectively 263b, the rotational motion mechanism 264 or 263 can produce a rotation of the gripper 261a or respectively 261b. The axis of rotation of the rotational motion mechanism 264 is parallel to the axis of rotation of the rotational motion mechanism 263, and the rotational motion mechanisms 264 and 263 are configured to rotate the respective grippers 261a and 261b in opposite directions simultaneously. Thus, the grippers 261a and 261b can be rotated anti-synchronously around a pair of parallel axes. Each of the grippers 261a and 261b is rotated between a first end-position and a second end-position. When at the first end-positions, the grippers 261a and 261b may together grip a container or other object. When at the second end-positions, the grippers 261a and 261b can open up and release the container or object. The motion mechanism 263 or 264 is driven by a motor 263m or respectively 264m. The gripping mechanism 221 may be connected to the computer system 99 of FIG. 1 in the sense that the motors 263m and 264m are connected to the computer system 99 via wires or by wireless means, and the computer system 99 may be configured to control the motions of the grippers 261a and 261b produced by the motion mechanisms 263 and 264. Thus, the gripping mechanism 221 may be controlled by the computer system 99 to grip or release a container or other object.

Figure 4B:
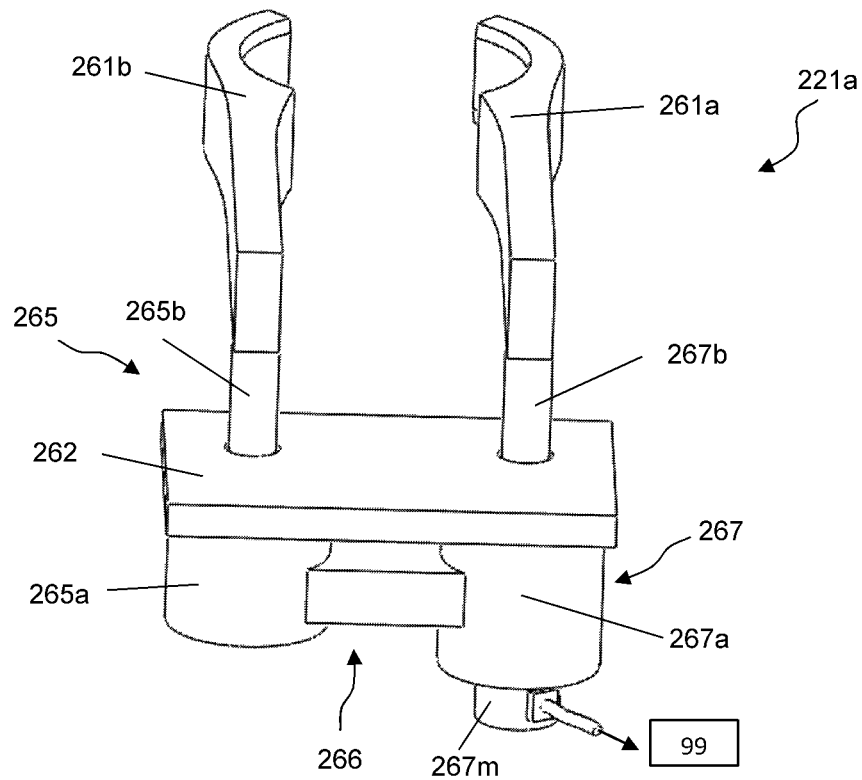
FIG. 4B shows an aerial view of a gripping mechanism.

Referring to FIG. 4B, a gripping mechanism 221a comprises: grippers 261a and 261b which are optionally rigid or elastic components; a rotational motion mechanism 267 comprising a stationary member 267a and a moving member (a shaft) 267b; a rotational mechanism 265 comprising a first mating part 265a and a second mating part (a shaft) 265b which is constrained to rotate relative to the first mating part 265a. The rotational motion mechanism 267 is configured to produce a rotational motion of the moving member 267b relative to the stationary member 267b. The stationary members 267a and the first mating part 265a are rigidly or fixedly connected to a support component 262. The gripper 261a is rigidly or fixedly connected to the moving member 267b. The gripper 261b is rigidly or fixedly connected to the second mating part (a shaft) 265b. The axis of rotation of the rotational motion mechanism 267 and the axis of rotation of the rotational mechanism 265 are configured to be parallel to each other. A transmission mechanism 266 is configured to connect the rotational motion mechanism 267 and the rotational mechanism 265, so that a rotation of the shaft 267b relative to the stationary member 267a is transmitted to an anti-synchronous rotation of the shaft 265b. Thus, the grippers 261a and 261b can be rotated anti-synchronously around a pair of parallel axes. Each of the grippers 261a and 261b is rotated between a first end-position and a second end-position. When at the first end-positions, the grippers 261a and 261b may together grip a container or other object. When at the second end-positions, the grippers 261a and 261b can open up and release the container or object. The motion mechanism 267 is driven by a motor 267m. The gripping mechanism 221a may be connected to the computer system 99 of FIG. 1 in the sense that the motor 267m is connected to the computer system 99 via wires or by wireless means, and the computer system 99 may be configured to control the motions of the grippers 261a and 261b produced by the motion mechanism 267. Thus, the gripping mechanism 221a may be controlled by the computer system 99 to grip or release a container or other object.

For examples of gripping mechanisms that may substitute the gripping mechanism 221a described above, see FIGS. 39A-39B ("gripping mechanism 701"), or FIGS. 47A-47C ("gripping mechanism 905"), of U.S. patent application Ser. No. 16/517,705. The entire content of the US patent application is hereby incorporated herein by reference.

Figure 4C:
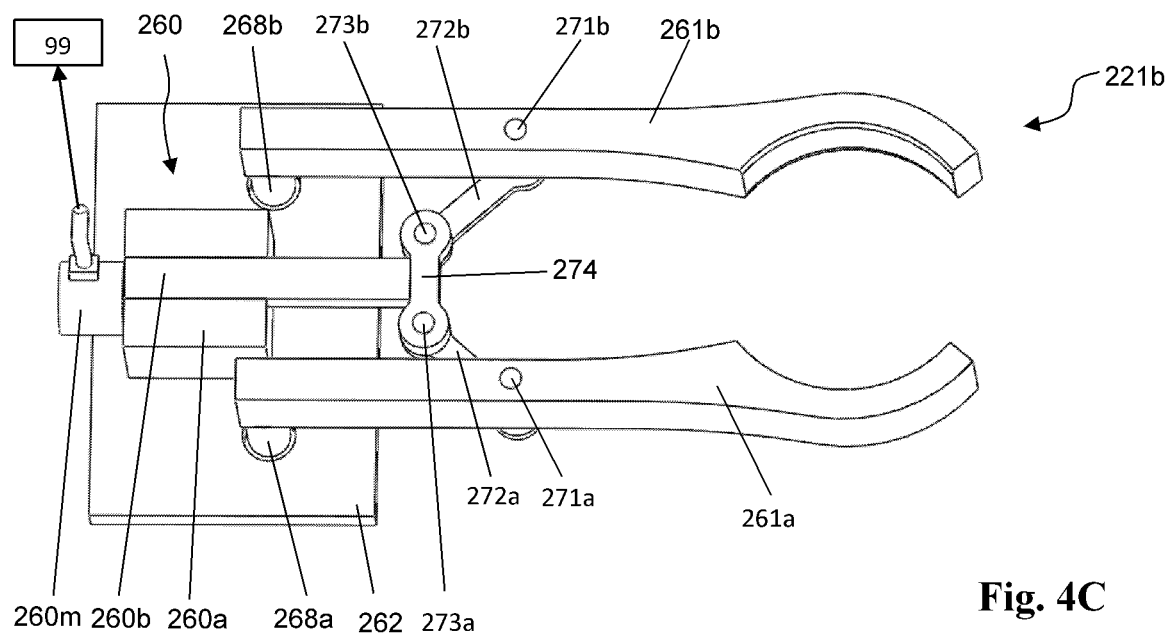
FIG. 4C shows an aerial view of a gripping mechanism.

Referring to FIG. 4C, a gripping mechanism 221b comprises: a support component 262 which is a rigid component; grippers 261a and 261b; a linear motion mechanism 260; a rigid component 274; shafts 273a and 273b; links 272a and 272b; and shafts 271a and 271b. The linear motion mechanism 260 comprises a stationary member 260a and a moving member 260b which is constrained to move linearly (along a horizontal direction) relative to the stationary member 260a. A pair of shafts 268a and 268b are constrained to rotate relative to the support component 262 respectively around a pair of vertical axes. The shaft 273a (or respectively 273b) connects the link 272a (or respectively 272b) to the rigid component 274 so that the link 272a (or respectively 272b) is constrained to rotate relative to the rigid component 274 around the axis of the shaft 273a (or respectively 273b). The shaft 271a (or 271b) connects the link 272a (or respectively 272b) to the gripper 261a (or respectively 261b) so that the gripper 261a (or respectively 261b) is rotatable relative to the link 272a (or respectively 272b). The gripper 261a (or 261b) is rigidly or fixedly connected to the shaft 268a (or respectively 268b). Thus, the gripper 261a (or respectively 261b) is constrained to rotate relative to the support component 262 around the axis of the shaft 268a (or respectively 268b). The parts 268a, 271a, 272a, and 273a are mirror images of the parts 268b, 271b, 272b, and 273b about a vertical plane which is parallel to the direction of the linear motion of the moving member 260b relative to the stationary member 260a; wherein the stationary member 260a is rigidly or fixedly connected to the support component 262. The rigid component 274 is rigidly or fixedly connected to the moving member 260b. Thus, the linear motion mechanism 260 may produce a horizontal motion of the rigid component 274 and hence anti-synchronous rotations in the grippers 261a and 261b. Each of the grippers 261a and 261b is rotated between a first end-position and a second end-position. When at the first end-positions, the grippers 261a and 261b may together grip a container or other object. When at the second end-positions, the grippers 261a and 261b can open up and release the container or object. The motion mechanism 260 is driven by a motor 260m. The gripping mechanism 221b may be connected to the computer system 99 of FIG. 1 in the sense that the motor 260m is connected to the computer system 99 via wires or by wireless means, and the computer system 99 may be configured to control the motions of the grippers 261a and 261b produced by the motion mechanism 260. Thus, the gripping mechanism 221b may be controlled by the computer system 99 to grip or release a container or other object.

A gripping mechanism may also be referred to as a gripper mechanism.

Figure 4D:
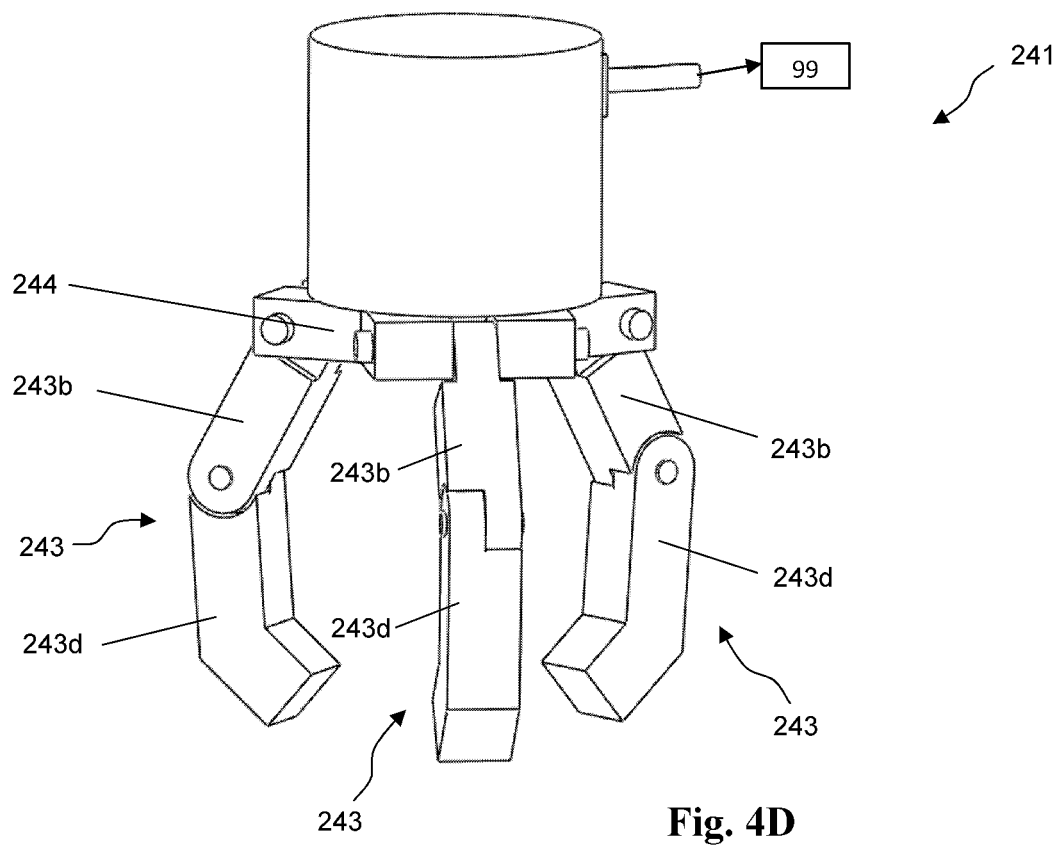
FIG. 4D shows an aerial view of a gripping mechanism.

Referring to FIG. 4D, a gripping mechanism 241 comprises a support component (or base component) 244 and a plurality of gripper sub-mechanisms 243 which are referred to as robotic fingers. Each gripper sub-mechanism 243 comprises: grippers 243d and 243b wherein the gripper 243d is rotatable relative to the gripper 243b and the gripper 243b is rotatable relative to the support component 244; a motion mechanism comprising a motor (hidden in figure) which drives a rotation of the gripper 243d relative to the gripper 243b; and a motion mechanism comprising a motor (hidden in figure) which drives a rotation of the gripper 243b relative to the support component 244. (It should be noted that an optional transmission mechanism may be used to link the rotation of the grippers 243d and 243b and then only one motor is needed to drive the rotations of both grippers.) The gripping mechanism 241 may be connected to the computer system 99 of FIG. 1 in the sense that all motors are connected to the computer system 99 via wires or by wireless means, and the computer system 99 may be configured to control the motions produced by the motors in the gripping mechanism 241. The gripping mechanism 241 may be controlled by the computer system 99 to grip or release a container or other object.

Figure 4E:
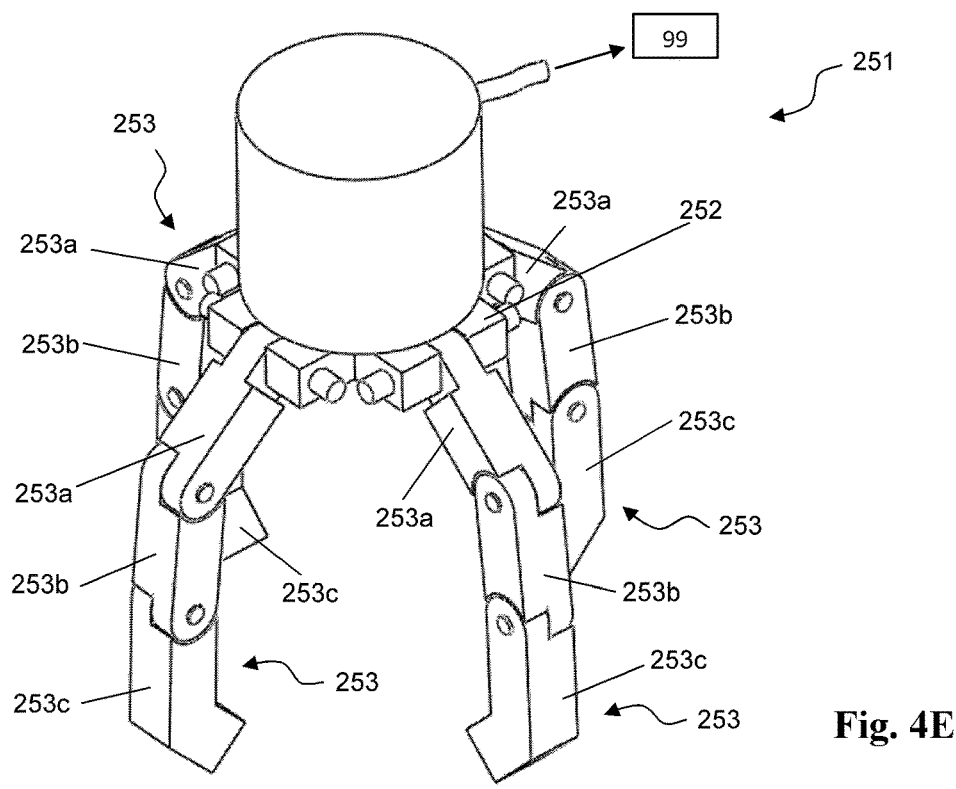
FIG. 4E shows an aerial view of a gripping mechanism

Referring to FIG. 4E, a gripping mechanism 251 comprises: a support component (or base component) 252 and a plurality of gripper sub-mechanisms 253 which are referred to as robotic fingers. Each gripper sub-mechanism 253 comprises: grippers 253a, 253b and 253c, wherein the gripper 253c is rotatable relative to the gripper 253b, the gripper 253b is rotatable relative to the gripper 253a, and the gripper 253a is rotatable relative to the support component 252; a motion mechanism comprising a motor (hidden in figure) which drives a rotation of the gripper 253c relative to the gripper 253b; a motion mechanism comprising a motor (hidden in figure) which drives a rotation of the gripper 253b relative to the gripper 253a; and a motion mechanism comprising a motor (hidden in figure) which drives a rotation of the gripper 253a relative to the support component 252. (It should be noted that an optional transmission mechanism may be used to link the rotation of the grippers 253a, 253b and 253c and then only one motor is needed to drive the rotations of the grippers). The gripping mechanism 251 may be connected to the computer system 99 of FIG. 1 in the sense that all motors are connected to the computer system 99 via wires or by wireless means, and the computer system 99 may be configured to control the motions produced by the motors in the gripping mechanism 251. The gripping mechanism 251 may be controlled by the computer system 99 to grip or release a container or other object.

The gripping mechanisms 241 (FIG. 4D) and 251 (FIG. 4E) are commonly referred to as robot hands. The gripper sub-mechanisms 243 and 253 are referred to as robot fingers. In fact, any robot hand may be used as a gripping mechanism for our purposes here. Robot hands may also be referred to as robot end effectors. Similarly, any robot arm may be used as a motion mechanism for our purpose.

Figure 4F:
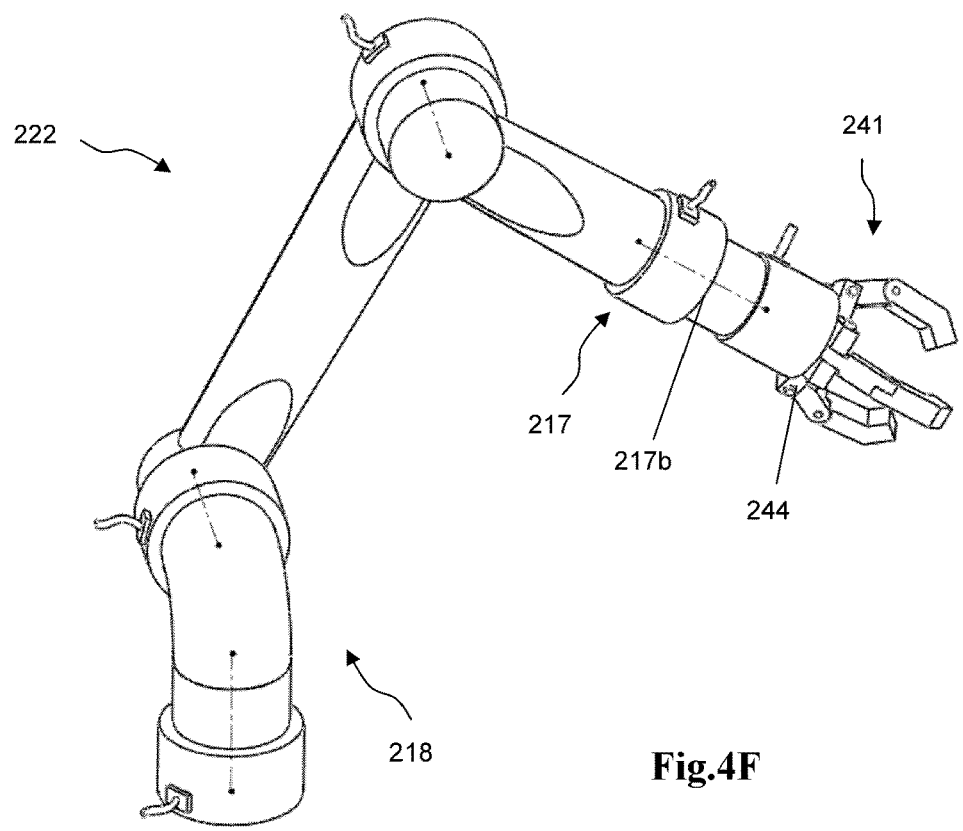
FIG. 4F shows an aerial view of a robotic apparatus.

Referring to FIG. 4F, a robotic apparatus 222 comprises a robot arm 218 and a gripping mechanism 241. The gripping mechanism 241 is configured to grip or release a container or other object. The support component 244 of the gripping mechanism 241 is fixedly connected to the moving member 217b of the rotational motion mechanism 217 of the robot arm 218, so that the robot arm can move the gripping mechanism 241. When the gripping mechanism 241 grips a container or other object, the robotic apparatus 222 can transfer the container or object to another position. The robot arm 218 and the gripping mechanism 241 may be connected to the computer system 99 of FIG. 1 via wires or by wireless means, and the computer system 99 may be configured to control the motions produced the motion mechanism in the robotic apparatus 222. The robotic apparatus 222 may be controlled by the computer system 99 to grip a container or other object, and then move the container or object, and then release the container or object at a different position. The robotic apparatus 222 may substitute a transfer apparatus to grip and move a container or other object. The robotic apparatus 222 may also substitute a dispensing apparatus to grip and move a container to dispense food or food ingredient(s) from the container.

It should be noted that the gripping mechanism 241 of the robotic apparatus 222 may be substituted by the gripping mechanism 221a (or 221b) or other gripping mechanism.

It should be noted that the gripping mechanisms 221, 221a, 221b, 241 and 251 are some realizations of gripping mechanisms. They may be substituted by other types of gripping mechanism such as an electric gripper, a pneumatic gripper, etc.

Figures 5, 6A:
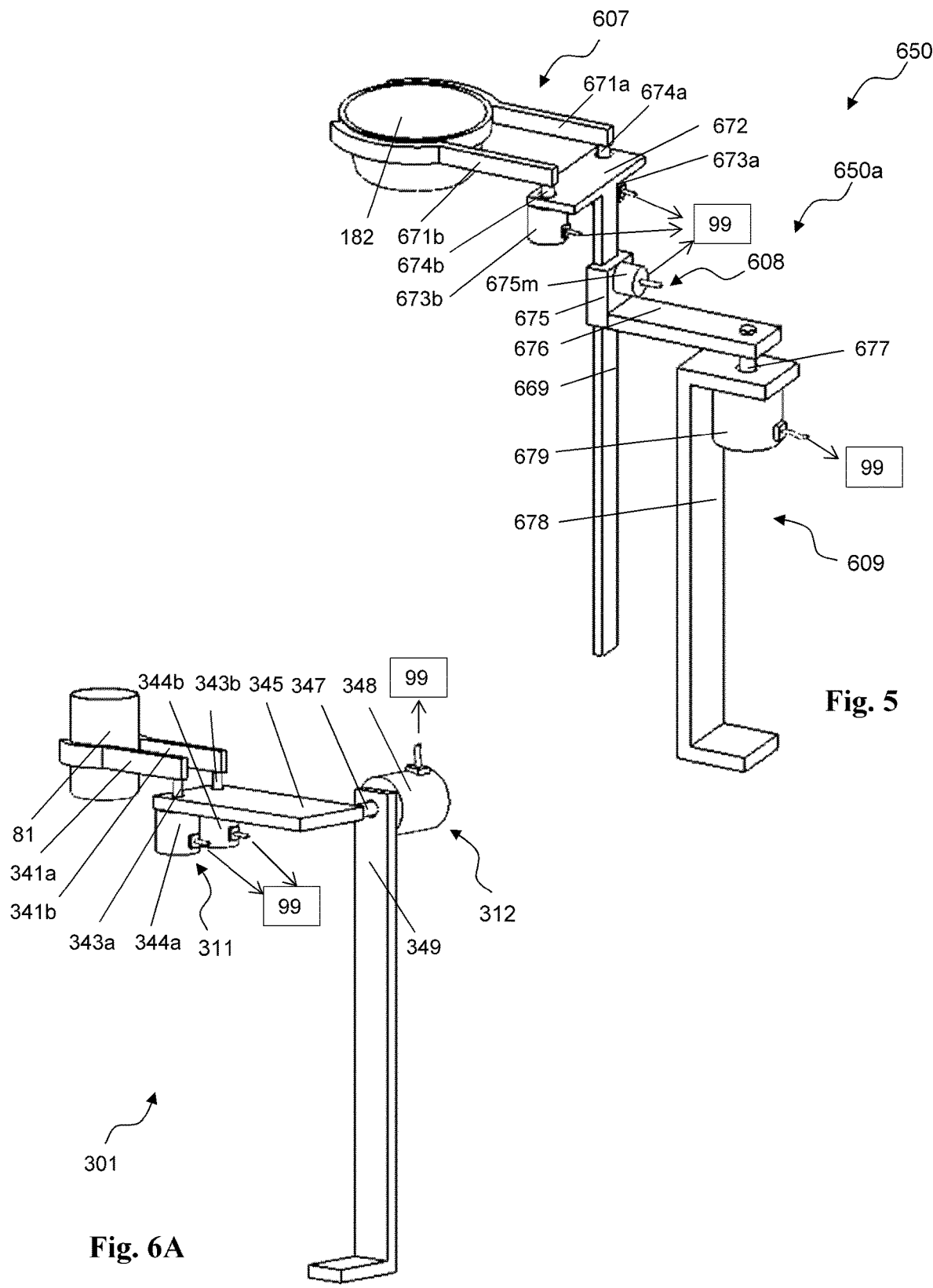
FIG. 5 shows an aerial view of a transfer apparatus.
FIG. 6A shows an aerial view of an ingredient dispensing apparatus.

Referring to FIG. 5, a transfer apparatus 650 comprises a gripping mechanism 607 comprising: a rigid component 672 referred to as a support component; grippers 671a and 671b which can optionally be rigid or elastic components; shafts 674a and 674b; and motors 673a and 673b. Each of the motors 673a and 673b comprises a base component which is fixedly connected to the rigid component 672. The gripper 671a is rigidly or fixedly connected to the shaft 674a. The motor 673a can produce a rotation of the shaft 674a, and hence of the gripper 671a, around the axis of the shaft 674a relative to the rigid component 672. Similarly, the gripper 671b is rigidly or fixedly connected to the shaft 674b. The motor 673b can produce a rotation of the shaft 674b, and hence of the gripper 671b, around the axis of the shaft 674b relative to the rigid component 672. The motors 673a and 673b are configured to rotate the respective grippers 671a and 671b anti-synchronously around a pair of parallel axes. The gripper 671a or 671b is rotated between two end-positions. At some first end-positions, the grippers 671a and 671b may grip a food container 182 under the condition that the food container is placed in a certain position relative to the rigid component 672. At some second end-positions, the grippers 671a and 671b can open and release the food container 182.

The transfer apparatus 650 further comprises a motion mechanism 650a comprising: a vertical motion mechanism 608 and a rotational motion mechanism 609. The vertical motion mechanism 608 comprises a stationary member 675; a moving member 669 which is constrained to move vertically relative to the stationary member 675; and a motor 675m configured to drive a motion of the moving member relative to the stationary member. The rotational motion mechanism 609 comprises: a stationary member 678; a shaft 677 referred to as a moving member which is constrained to rotate around the axis of the shaft 677 relative to the stationary member 678; and a motor 679 configured to drive a rotation of the moving member relative to the stationary member. The rigid component 672 of the gripping mechanism 607 is rigidly, fixedly, or otherwise connected to the moving member 669, so that the vertical motion mechanism 608 is configured to produce a vertical motion of the moving member 669 and the rigid component 672 between two end-positions. A connector 676 rigidly, fixedly, or otherwise connects the shaft 677 to the stationary member 675. The motor 679 comprises a base component which is fixedly connected to the stationary member 678. The motor 679 can produce a rotation of both the shaft 677 and the connector 676 between two end-positions. The transfer apparatus 650 may be configured to grip a food container 182 and transfer it combination of vertical motion, and rotational motion to another position. The motors 673a, 673b, and 679 are all connected to the computer system 99 of FIG. 1, so that the computer system 99 may control timings and speeds of their produced motions. The vertical motion mechanism 608 is driven by a motor 675m, which is connected to the computer system 99 by wires or by wireless means. The stationary member 678 may be referred to as the support component of the transfer apparatus 650.

Referring to FIG. 6A, an ingredient dispensing apparatus 301 comprises a gripping mechanism 311 comprising: a rigid component 345 referred to as a support component; grippers 341a and 341b which can optionally be rigid or elastic components; shafts 343a and 343b; and motors 344a and 344b. Each of the motors 344a and 344b comprises a base component which is fixedly connected to the rigid component 345. The gripper 341a is rigidly or fixedly connected to the shaft 343a. The motor 344a is configured to produce a rotation of the shaft 343a and hence of the gripper 341a around the axis of the shaft 343a relative to the rigid component 345. Similarly, the gripper 341b is rigidly or fixedly connected to the shaft 343b. The motor 344b is configured to produce a rotation of the shaft 343b and hence of the gripper 341b around the axis of the shaft 343b relative to the rigid component 345. The shafts 343a and 343b have parallel axes, and the motors 344a and 344b are configured to rotate the respective grippers 341a and 341b anti-synchronously around the parallel axes. The gripper 341a or 341b is rotated between two end-positions. At some first end-positions, the grippers 341a and 341b are configured to work together to grip an ingredient container 81 under the condition that the ingredient container is placed in a certain position relative to the rigid component 345; wherein the ingredient container 81 is configured to hold a food or a food ingredient. The ingredient container is not part of the ingredient dispensing apparatus 301.

The ingredient dispensing apparatus 301 further comprises a motion mechanism 312 comprising: a rigid connector 349 referred to as a stationary member; a shaft 347 referred to as a moving member which is constrained to rotate around the axis of the shaft 347 relative to the stationary member 349; and a motor 348 configured to drive a rotation of the moving member relative to the stationary member. The shaft 347 comprises a horizontal axis and the axis is perpendicular to the axes of the shafts 343a and 343b, although these are not strict requirements. The motor 348 comprises a base component which is fixedly connected to the rigid connector 349. The rigid connector 349 is referred to as the support component of the ingredient dispensing apparatus 301.

The shaft 347 is rigidly, fixedly, or otherwise connected to the rigid component 345 of the gripping mechanism 311, and the motor 348 can produce a rotation of the rigid component 345 between two end-positions. When the rigid component 345 is rotated to a first end-position such that the axes of the shafts 343a and 343b are vertical, and when the grippers 341a and 341b are rotated to their first end-positions relative to the rigid component 345, the grippers 341a and 341b are configured to grip an ingredient container 81 under the condition that the ingredient container is at a certain position relative to the support component 349. The position of the ingredient container is referred to as the dispensing position relative to the support component 349. Then, the rigid component 345 is rotated to the second end-position while the ingredient container is gripped by the grippers 341a and 341b, so that the ingredient container is turned to dispense the food or food ingredient into a cookware. Virtually the entire contents of the ingredient container are dispensed by the turning of the ingredient container. The angle between the first end-position and the second end-position in the rotation of the rigid component 345 is usually between 90 degrees and 180 degrees. The motors 344a, 344b and 348 are connected to the computer system 99 of FIG. 1 via wires, so that the computer system 99 may control the timing and speed of the motors.

Figure 6B:
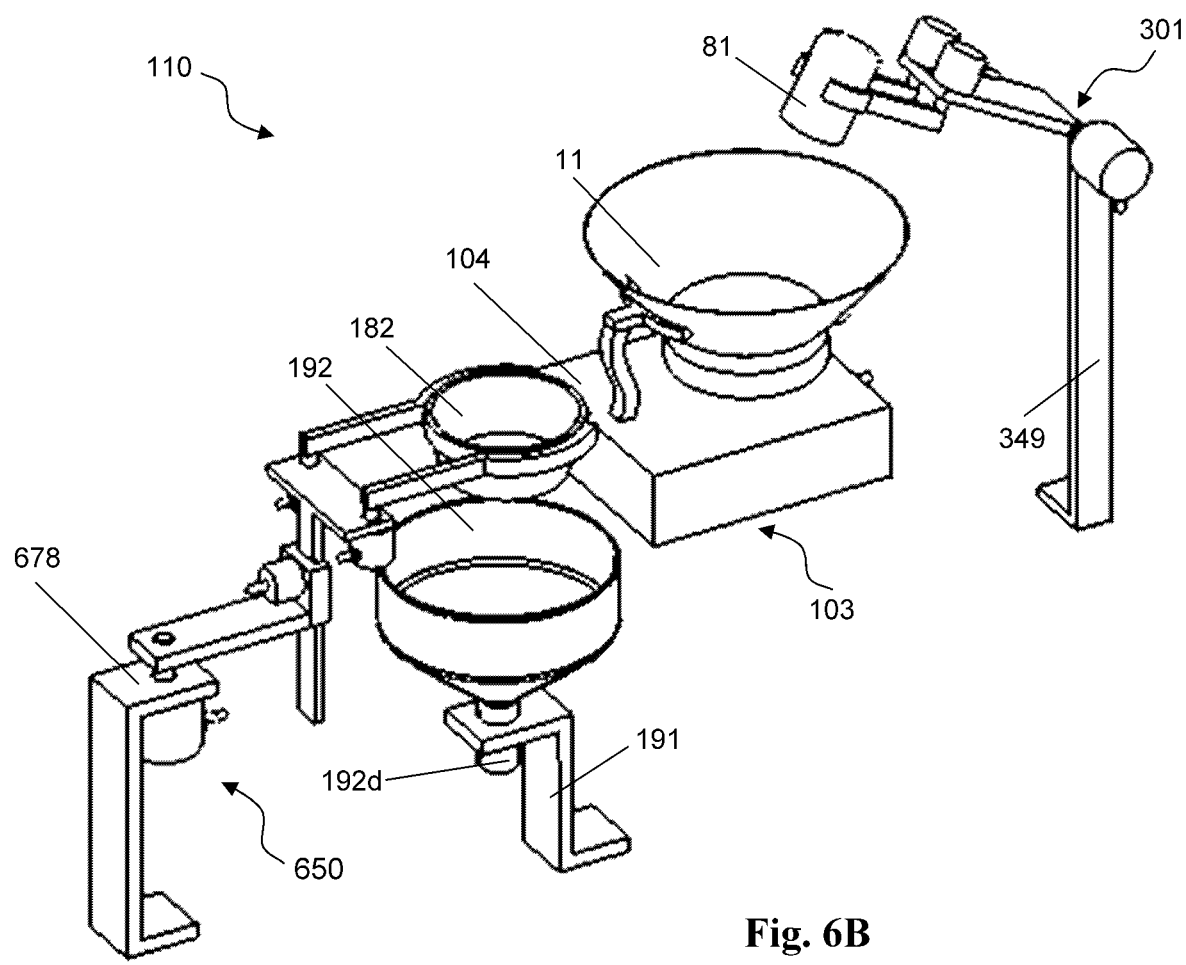
FIGS. 6B-6C show aerial views of a cooking apparatus comprising the cooking apparatus of FIG. 3A, the transfer apparatus of FIG. 5 and the ingredient dispensing apparatus of FIG. 6A.
Figure 6C:
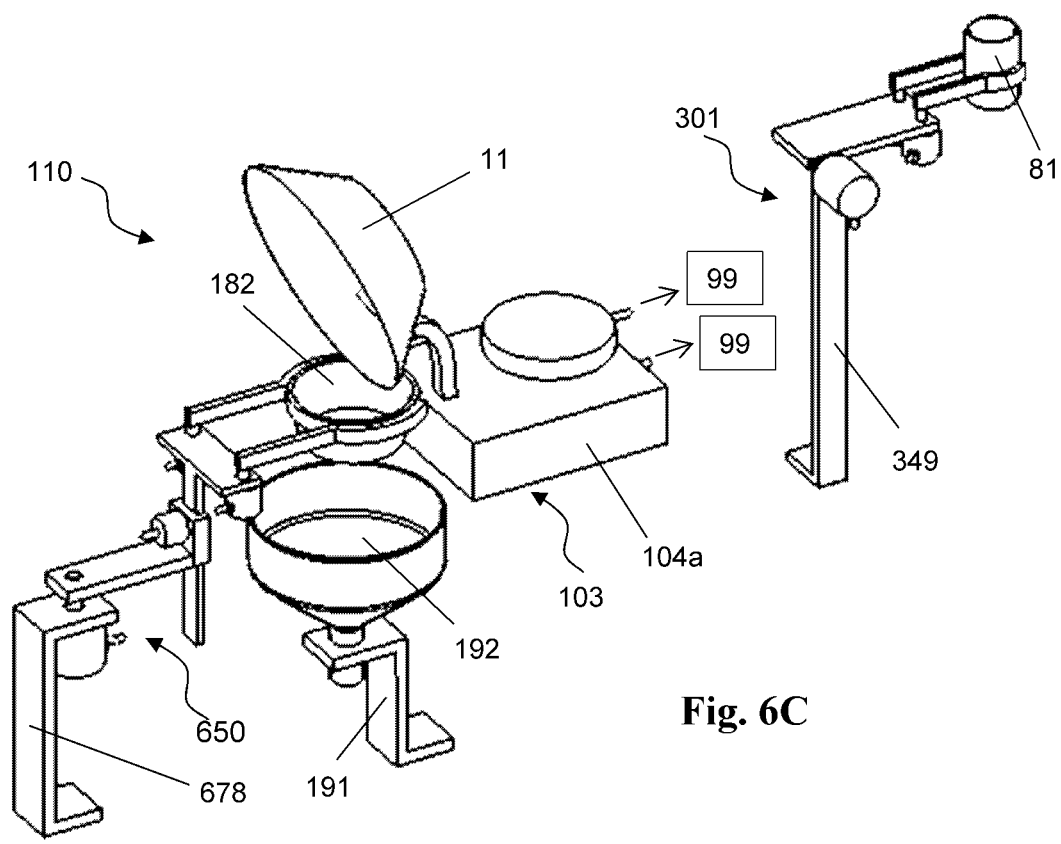

Referring to FIGS. 6B-6C, a cooking apparatus 110 (to be referred to as a second cooking apparatus) comprises: a cooking apparatus 103 (as in FIG. 3A); a transfer apparatus 650 (as in FIG. 5); a sink 192; a garbage disposal 192d connected to the sink wherein the garbage disposal is below the sink; and an ingredient dispensing apparatus 301 (as in FIG. 6A). The sink 192 and the garbage disposal 192d are fixedly connected to the floor of the building or the ground via a connector 191. A liquid pipe (not shown in figures) connects an exit of the garbage disposal 192d to a sewage or wastewater tank. The positions of the support component 678 of the transfer apparatus 650, the connector 191, the support component of the cooking apparatus 103 and the support component 349 of the dispensing apparatus 301 are fixed relative to each other. When the rigid component 345 of the ingredient dispensing apparatus 301 is rotated to the second end-position, the food or food ingredient in the ingredient container 81 gripped by the ingredient dispensing apparatus 301 can be dispensed into the cookware 11 of the cooking apparatus 103 (see FIG. 6B). When a food container 182 gripped by the gripping mechanism 607 is moved by the motion mechanism 650a to a receiving position relative to the support component of the cooking apparatus 103, the cookware 11 can be rotated to a certain "dispensing position" by the motion mechanism 104 of the cooking apparatus 103, so that a cooked food held in the cookware 11 can be dispensed into the food container 182 (optionally through a funnel) (see FIG. 6C). When the food container 182 gripped by the gripping mechanism 607 is moved away from the receiving position, if the cookware 11 contains wastewater (say, from a cleaning after a dish is cooked), the cookware 11 of the cooking apparatus 103 can be rotated to the dispensing position by the motion mechanism 104, to dispense the wastewater held in the cookware 11 into the sink 192.

The shaft 347 is rigidly, fixedly, or otherwise connected to the rigid component 345 of the gripping mechanism 311, so the motor 348 can produce a rotation of the rigid component 345 between two end-positions. When the rigid component 345 is rotated to a first end-position such that the axes of the shafts 343a and 343b are vertical, and when the grippers 341a and 341b are rotated to their first end-positions relative to the rigid component 345, the grippers 341a and 341b are configured to grip an ingredient container under the condition that the ingredient container is at a certain position relative to the support component 349. The position of the ingredient container is referred to as the dispensing position relative to the support component 349. Then, the rigid component 345 is rotated to the second end-position while the ingredient container is gripped by the grippers 341a and 341b, so that the ingredient container is turned to dispense the food or food ingredient into a cookware. Virtually the entire contents of the ingredient container are dispensed by the turning of the ingredient container. The angle between the first end-position and the second end-position in the rotation of the rigid component 345 is usually between 90 degrees and 180 degrees. The motors 344a, 344b and 348 are connected to the computer system 99 of FIG. 1 via wires, so that the computer system 99 may control the timing and speed of the motors.

Referring to FIGS. 6B-6C, a cooking apparatus 110 (to be referred to as a second cooking apparatus) comprises: a cooking apparatus 103 (as in FIG. 3A); a transfer apparatus 650 (as in FIG. 5); a sink 192; a garbage disposal 192d connected to the sink wherein the garbage disposal is below the sink; and an ingredient dispensing apparatus 301 (as in FIG. 6A). The sink 192 and the garbage disposal 192d are fixedly connected to the floor of the building or the ground via a connector 191. A liquid pipe (not shown in figures) connects an exit of the garbage disposal 192d to a sewage or wastewater tank. The positions of the support component 678 of the transfer apparatus 650, the connector 191, the support component of the cooking apparatus 103 and the support component 349 of the dispensing apparatus 301 are fixed relative to each other. When the rigid component 345 of the ingredient dispensing apparatus 301 is rotated to the second end-position, the food or food ingredient in the ingredient container 81 gripped by the ingredient dispensing apparatus 301 can be dispensed into the cookware 11 of the cooking apparatus 103 (see FIG. 6B). When a food container 182 gripped by the gripping mechanism 607 is moved by the motion mechanism 650a to a receiving position relative to the support component of the cooking apparatus 103, the cookware 11 can be rotated to a certain "dispensing position" by the motion mechanism 104 of the cooking apparatus 103, so that a cooked food held in the cookware 11 can be dispensed into the food container 182 (optionally through a funnel) (see FIG. 6C). When the food container 182 gripped by the gripping mechanism 607 is moved away from the receiving position, if the cookware 11 contains wastewater (say, from a cleaning after a dish is cooked), the cookware 11 of the cooking apparatus 103 can be rotated to the dispensing position by the motion mechanism 104 to dispense the wastewater held in the cookware 11 into the sink 192.

Figure 6D:
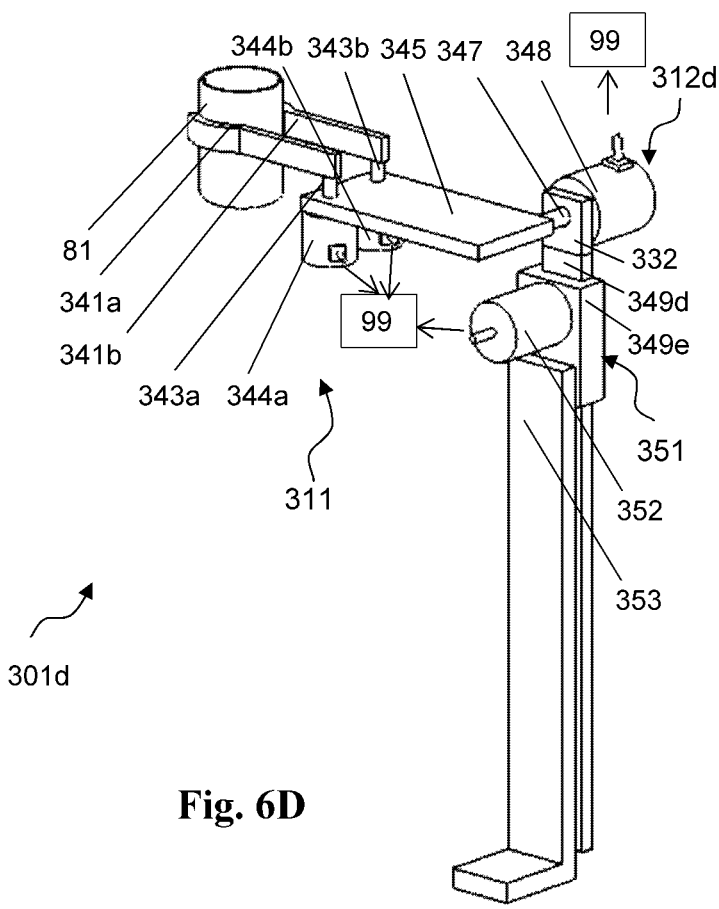
FIG. 6D shows an aerial view of another ingredient dispensing apparatus.

Referring to FIG. 6D, an ingredient dispensing apparatus 301d comprises a gripping mechanism 311 (as in FIG. 6A) and a motion mechanism 312d. As explained earlier, the grippers 341a and 341b of the gripping mechanism 311 may be rotated between two end-positions (a first end-position and a second end-position) to grip or release an ingredient container 81. The motion mechanism 312d comprises: a support component 332; a shaft 347 which is constrained to rotate relative to the support component 332; and a motor 348 configured to drive the rotation of the shaft 347 relative to the support component 332. The shaft 347 comprises a horizontal axis, which is perpendicular to the axes of the shafts 343a and 343b of the gripping mechanism 311, although these are not strict requirements. The shaft 347 is rigidly, fixedly, or otherwise connected to the rigid component 345 of the gripping mechanism 311 so that the motor 348 can produce a rotation of the rigid component 345 between two end-positions. When the rigid component 345 is rotated to a first end-position, the axes of the shafts 343a and 343b are vertical so that the gripping mechanism 311 may grip an ingredient container which is at upright position. When the rigid component 345 is rotated to the second end-position, the gripped ingredient container can be turned to dispense the food or food ingredient (into a cookware). Virtually the entire contents of the ingredient container are dispensed by the turning of the ingredient container. The angle between the first end-position and the second end-position in the rotation of the rigid component 345 is usually between 90 degrees and 180 degrees. The ingredient container is not part of the ingredient dispensing apparatus 301d.

The ingredient dispensing apparatus 301d further comprises a vertical motion mechanism 351 comprising: a stationary member 349e; a moving member 349d which is constrained to move vertically relative to the stationary member 349e wherein the direction of motion is vertical; and a motor 351 configured to drive the motion of the moving member 349d relative to the stationary member 349e. The support component 332 of the motion mechanism 312d is fixedly or rigidly connected to the moving member 349d, so that the vertical motion mechanism 351 can drive a vertical linear motion of the support component 332 between two end-positions. The motor 352 is referred to as a driving member. The ingredient dispensing apparatus 301d further comprises a support component 353 which is rigidly or fixedly connected to the stationary member 349e. The support component 353 may be referred to as the support component of the dispensing apparatus 301d. The dispensing apparatus 301d is configured to grip an ingredient container 81 and transfer it via a combination of vertical motion and rotational motion to dispense the food or food ingredient in the ingredient container 81 into a cookware.

The motors 344a, 344b, 348 and 352 of the ingredient dispensing apparatus 301d are all connected to the computer system 99 of FIG. 1, so that the computer system 99 may control timings and speeds of their produced motions.

Figure 7A:
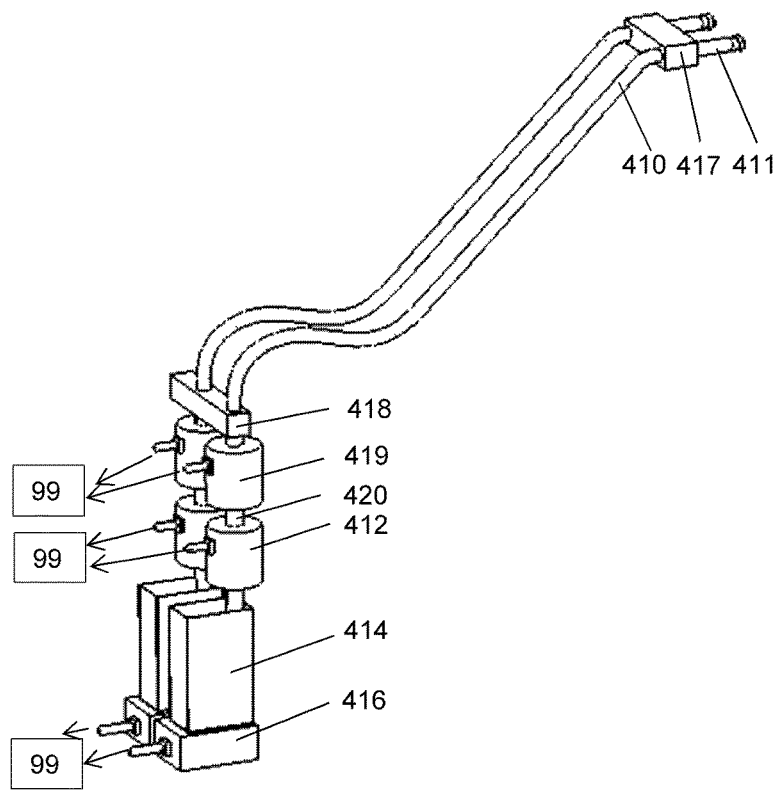
FIG. 7A shows an aerial view of parts of a liquid dispensing mechanism.
Figure 7B:
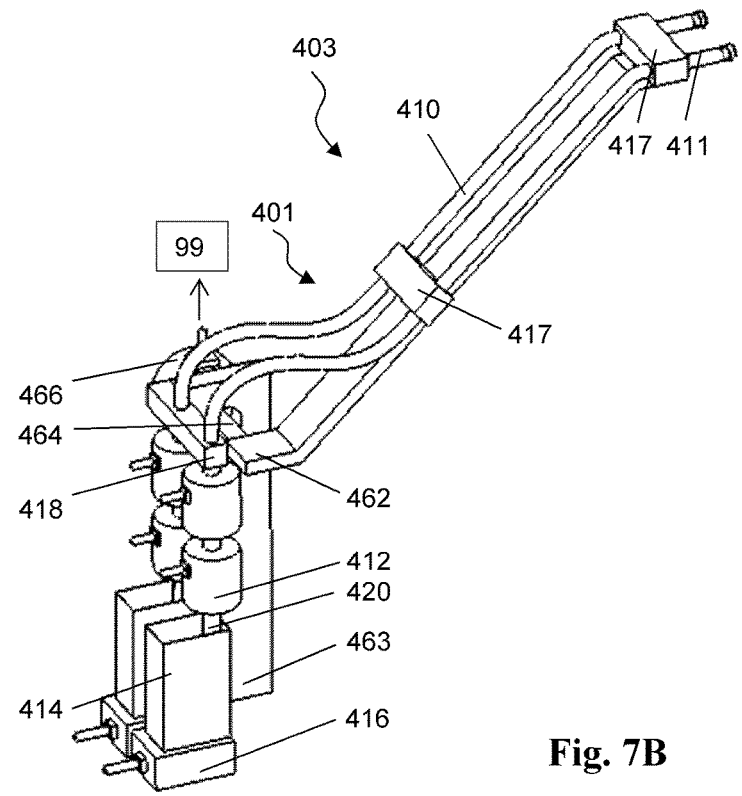
FIG. 7B shows an aerial view of the liquid dispensing apparatus.

Referring to FIGS. 7A-7B, a liquid dispensing mechanism 403 comprises a rotational motion mechanism 401 comprising: a support component 463 referred to as a stationary member; a shaft 464 referred to as a moving member which is constrained to rotate around the axis of the shaft 464 relative to the stationary member 463; and a motor 466 configured to drive a rotation of the moving member relative to the stationary member. The axis of the shaft 464 is configured to be horizontal. A rotatable component 462 is rigidly or fixedly connected the shaft 464. The motor 466 comprises a base component which is fixedly connected to the support component 463. The motor 466 can produce a rotation of the shaft 464 and the rotatable component 462 between two end-positions relative to the support component 463. The motor 466 is connected to the computer system 99 of FIG. 1 via wires, so that the computer system 99 may control the timing and speed of the motor 466.

The liquid dispensing mechanism 403 further comprises: a plurality of sprayers 411; a plurality of liquid pipes 420; a plurality of flexible pipes 410; and a plurality of liquid containers 414. Each liquid container 414 is configured to contain a liquid ingredient, e.g., cooking oil, vinegar, soy sauce, or water. Each flexible pipe 410 connects a sprayer 411 to a corresponding liquid pipe 420 and each liquid pipe 420 is inserted into a corresponding liquid container 414, and a pump 412 can pump liquid contained in the liquid container 414 to the outlet of the sprayer 411 wherein the flow may be measured by a flowmeter 419. Each liquid container 414 is positioned on an electronic scale 416 and the electronic scale 416 can weigh the corresponding liquid container 414. A plurality of connectors 417 are configured to fixedly connect the flexible pipes 410 to improve stability of the pipes. The connectors 417 are fixedly or rigidly connected to the rotatable component 462, so that the rotational motion mechanism can produce a rotation of the shaft, the connectors 417, the flexible pipes 410 and the sprayers 411 between two end-positions relative to the support component 463 around the axis of the shaft 464. A connector 418 fixedly connects the flexible pipes 410 to the support component 463. The pumps 412, flowmeters 419, and electronic scales 416 are connected by wired or wireless means to the computer system 99 of FIG. 1, so that the computer system may control the timing and amount of liquid to be drawn from the corresponding liquid container.

It should be noted that the electronic scale 416 may be substituted by other types of scale, such as electronic balances.

It should be noted the flowmeters 419, the pumps 412, and the electronic scale 416 may be fixedly connected to the floor of the building or the ground.

Figure 8A:
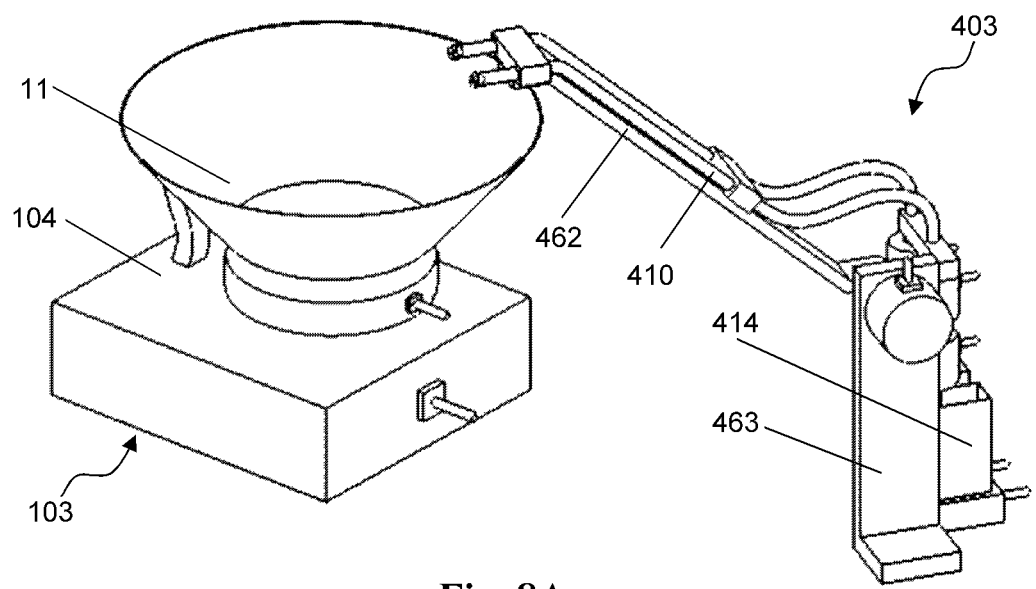
FIGS. 8A-8B show aerial views of the relative positions of the cooking apparatus of FIG. 3A and the liquid dispensing apparatus.
Figure 8B:
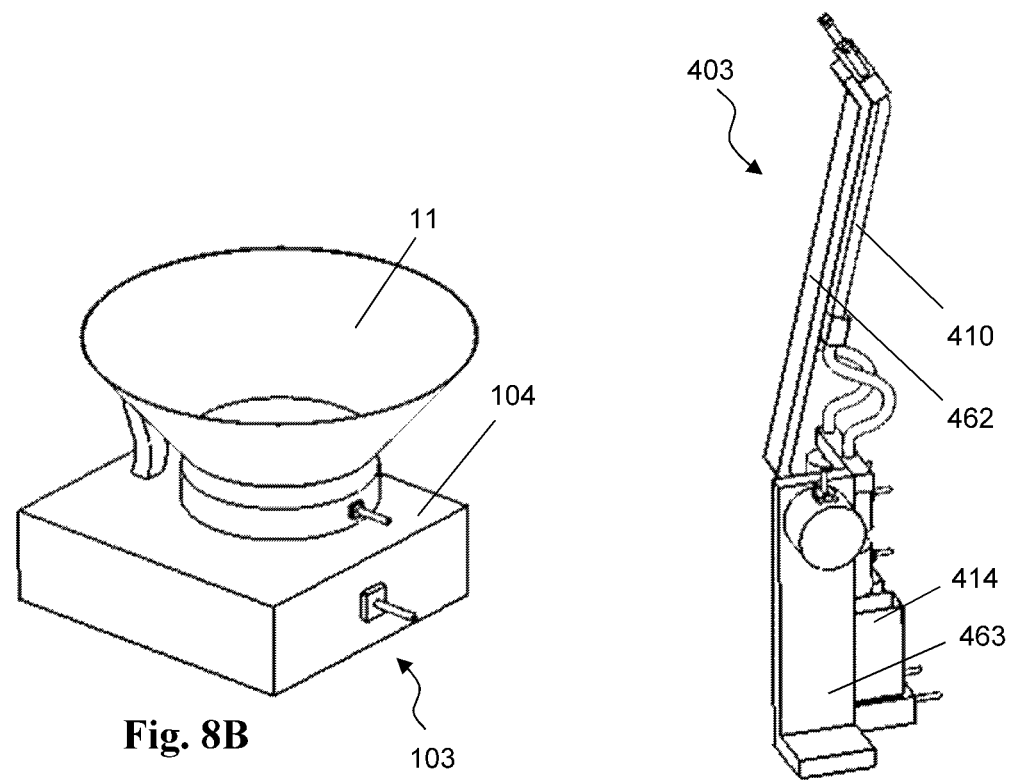

FIGS. 8A-8B show two end-positions of the rotatable component 462 of the liquid dispensing mechanism 403 relative to the cookware 11 of a cooking apparatus 103. When the rotatable component 462 is rotated to a first end-position, the open end of the sprayers 411 is to be positioned above the cookware 11 when the cookware 11 is at the upright position (see FIG. 8A), so that the liquid may flow to and be dispensed into the cookware 11. The liquid dispensing mechanism 403 is used to dispense a plurality of liquid ingredients into the cookware 11 of a cooking apparatus 103 when the rotatable component 462 is at the first end-position and the cookware 11 is at the upright position.

When the rotatable component 462 is rotated to the second end-position, the rotatable component 462 and the sprayers 411 are all away from the cookware 11. The angle between the first end-position and the second end-position may be about 90 degrees, although this is not a strict requirement.

Figure 9A:
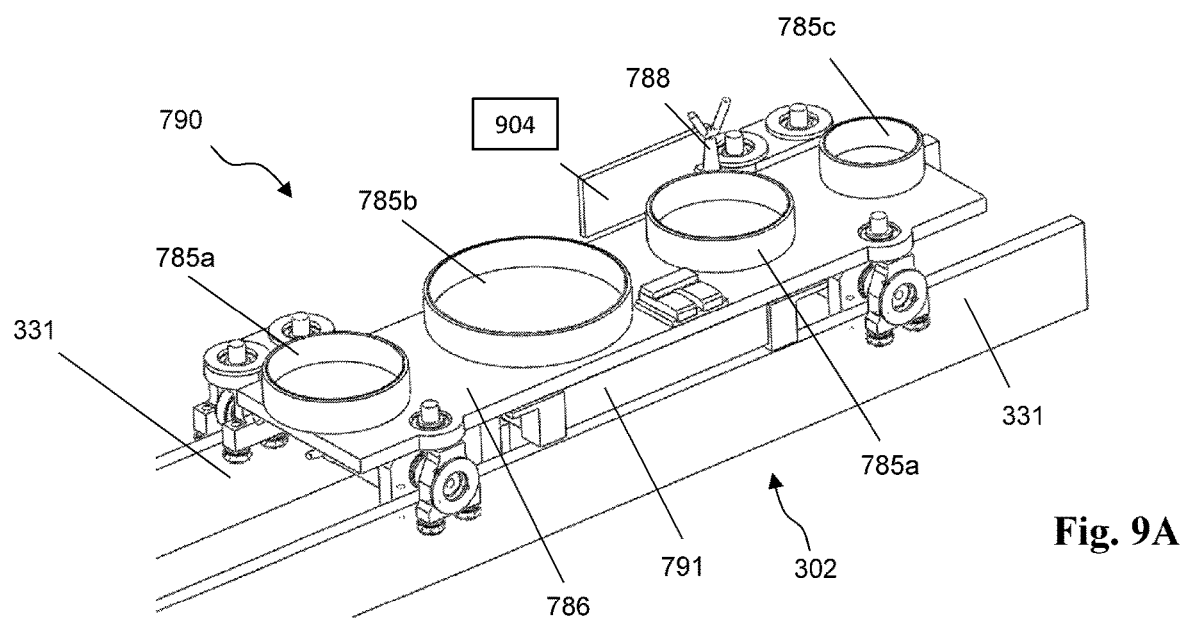
FIG. 9A shows an aerial view of a transport system which includes a vehicle on tracks.

Referring to FIG. 9A, a vehicle 790 comprises: a support component 786; a computer 904; a plurality of wheels; motors configured to drive rotations of some of the wheels; a rechargeable battery 791; and a plurality of container holders 785a, 785b and 785c wherein each container holder 785a, 785b or 785c is rotationally symmetric with a vertical axis. Each container holder 785a, 785b or 785c is configured to hold an ingredient container of a specific diameter. Each container holder 785a on a vehicle 790 may hold an ingredient container 81 so that the movement of the ingredient container may be restricted or limited when the vehicle 790 is moving.

It should be noted that the vehicle 790 may move on a pair of curved rail tracks whose widths are smaller than the widths of straight rail tracks. The vehicle 790 can carry and transport a plurality of ingredient containers. When the vehicle 790 moves, then the vehicle 790 can transport the ingredient containers held by the container holders of the vehicle.

It should be noted that the any of container holders in the vehicle 790 may be substituted by a solid that is shaped to position or hold an ingredient container.

Referring to FIG. 9A, a transport system 302 comprises tracks each comprising pairs of mini-rails 331 and a plurality of vehicles 790. Each mini-rail 331 of the transport system 302 is fixedly connected to the floor of the building or the ground. The vehicle 790 and the container holders 785a on the vehicle 790 may move along the mini-rails 331. The transport system 302 is configured to transfer ingredient containers. The computer 904 is connected to the computer system 99 of FIG. 1 via wireless means, and the computer system 99 is configured to control the timing and speed of the vehicles 790.

See U.S. patent application Ser. Nos. 16/517,705 and 16/997,933 for more details of the vehicle 790. The entire contents of these applications are hereby incorporated herein.

Figure 9B:
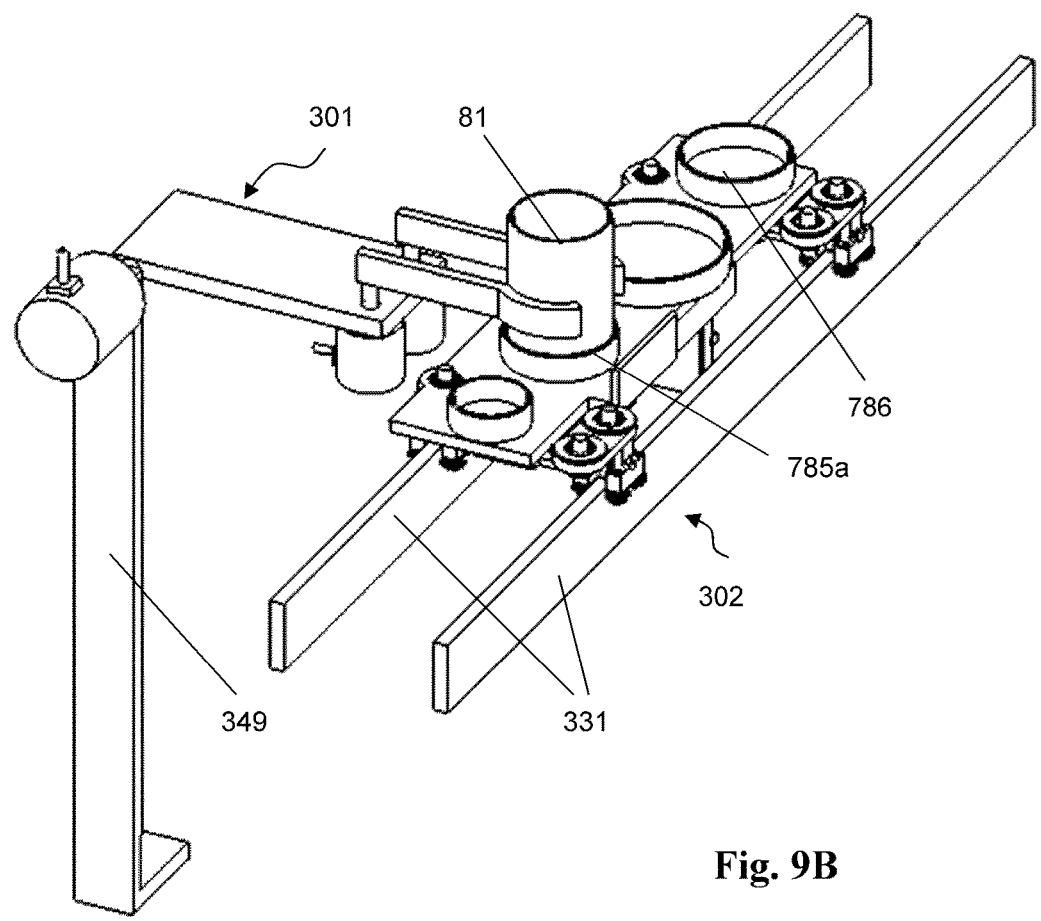
FIG. 9B shows an aerial view of some tracks, a vehicle on the tracks and the ingredient dispensing apparatus of FIG. 6A.

Referring to FIG. 9B, a vehicle 790 in the transport system 302 may move an ingredient container 81 to a dispensing position relative to the support component 349 of the ingredient dispensing apparatus 301. Then the support component 345 of the gripping mechanism 311 may be rotated to the first end-position relative to the support component 349 while the grippers 341a and 341b are kept at their second end-positions, and then the grippers 341a and 341b are rotated to their first end-position to grip the ingredient container 81.

Figure 10:
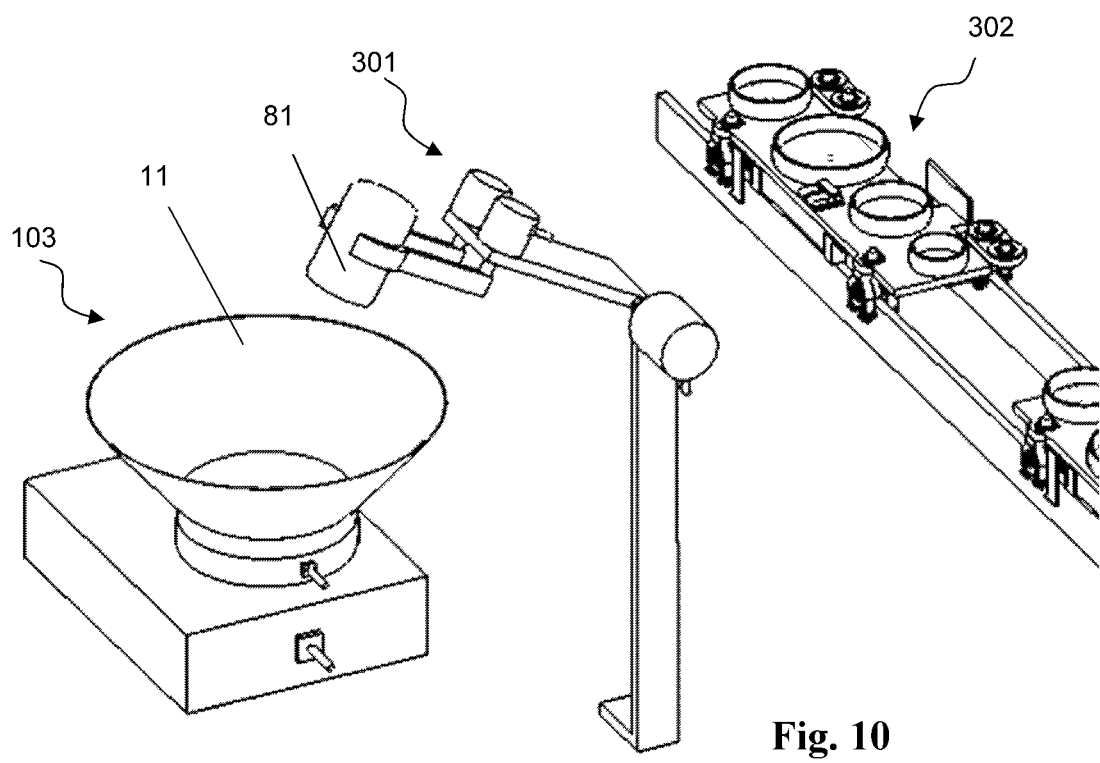
FIG. 10 shows an aerial view of the relative positions of the cooking apparatus of FIG. 3A, the ingredient dispensing apparatus of FIG. 6A and the transport system of FIG. 9A.

FIG. 10 shows the relative positions of the cooking apparatus 103, the ingredient dispensing apparatus 301 and the transport system 302. A vehicle 790 of the transport system 302 moves an ingredient container 81, which contains a food or a food ingredient, to a dispensing position relative to the support component 349 of the ingredient dispensing apparatus 301. The rigid component 345 of the ingredient dispensing apparatus 301 may be rotated to the first end-position, and then the grippers 341a and 341b can move to their first end-positions to grip the ingredient container 81. Then the rigid component 345 is rotated to the second end-position so that the ingredient container 81 is moved to dispense the food or food ingredient from the ingredient container 81 into the cookware 11 of the cooking apparatus 103. The ingredient dispensing apparatus 301 is configured to dispense virtually the entire contents held in the ingredient container 81 into the cookware 11; wherein exception (to the "virtually entire contents") may be a very small quantity of ingredients which are undesirably stubbornly sticking to a surface of the ingredient container 81 and this small quantity of ingredients will be waste. Afterwards, the rigid component 345 is rotated back to the first end-position, and after that, the grippers 341a and 341b can move to their second end-positions to release the emptied container 81 on the container holders 785a of the vehicle 790. It should be noted that the vehicle 790 is braked during the time of the above procedures.

Figure 11:
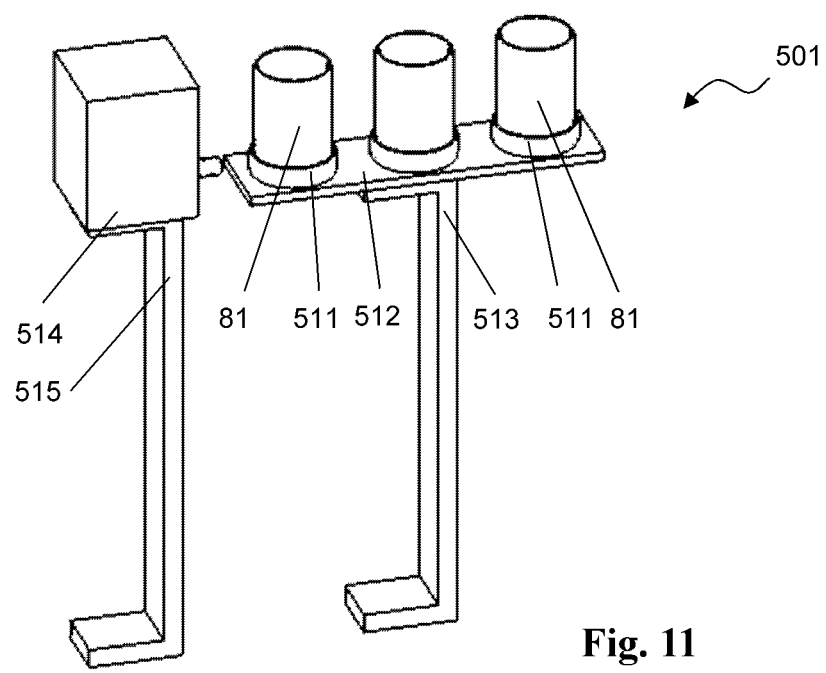
FIG. 11 shows an aerial view of a storage which can store ingredient containers.

Referring to FIG. 11, a storage 501 comprises: a plurality of container holders 511; and a support component 512; wherein each container holder 511 is configured to position or otherwise hold one or more ingredient containers 81. Each container holder 511 is fixedly connected to the support component 512. The support component 512 is fixedly connected to the floor of the building or the ground by a rigid connector 513. The storage 501 also comprises a refrigeration mechanism 514 configured to refrigerate the ingredient containers 81 to keep the food ingredient in the ingredient containers fresh. The refrigeration mechanism 514 is fixedly connected to the floor of the building or the ground by a rigid connector 515.

Note that the storage 501 may be substituted by the storage system 560 of FIGS. 20A-24 of U.S. patent application Ser. No. 16/517,705 and similar storage system disclosed in U.S. patent application Ser. No. 16/997,933. The entire contents of the application are incorporated herein by reference.

Figure 12:
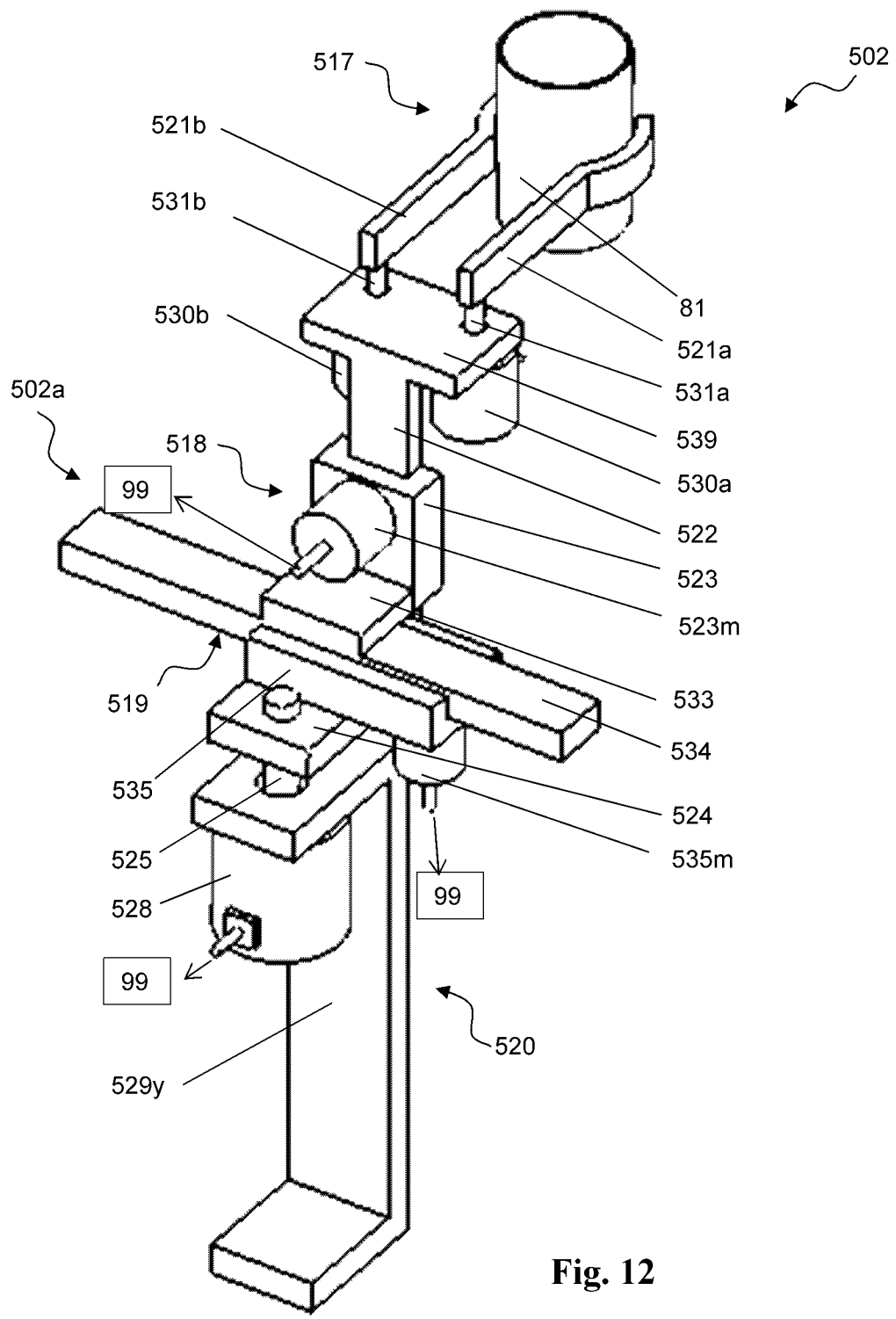
FIG. 12 shows an aerial view of a transfer apparatus.
Figure 13A:
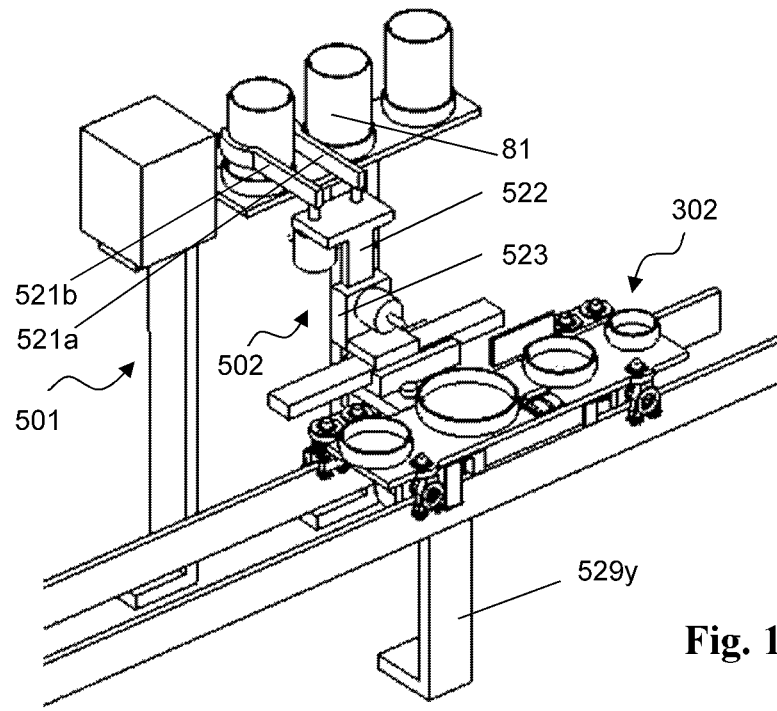
FIGS. 13A-13D show aerial views of the relative positions of the storage apparatus of FIG. 11, the transfer apparatus of FIG. 12, and the transport system of FIG. 9A.
Figure 13B:
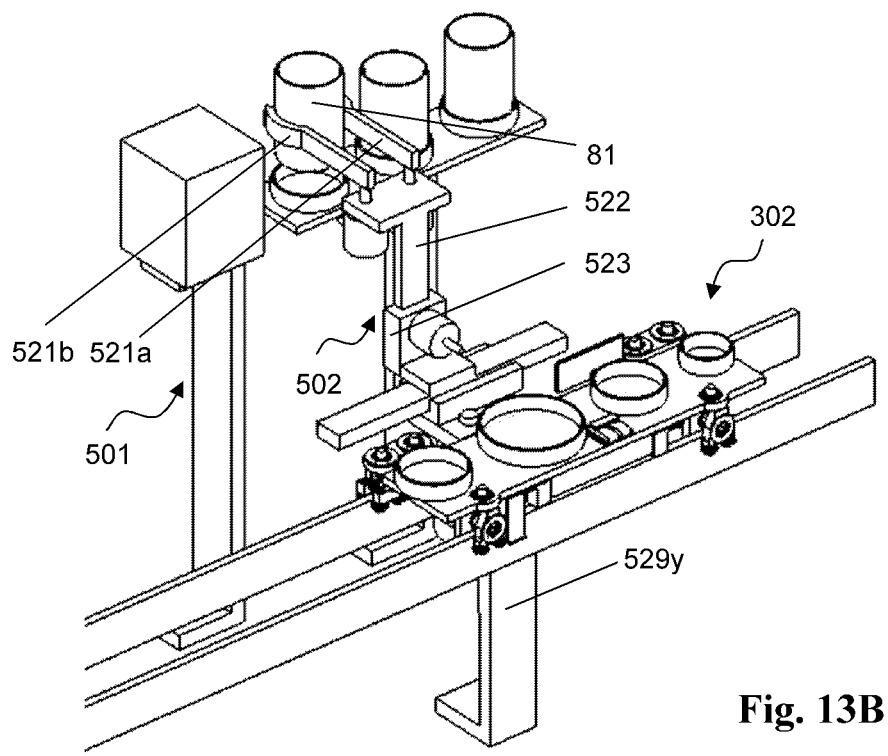
Figure 13C:
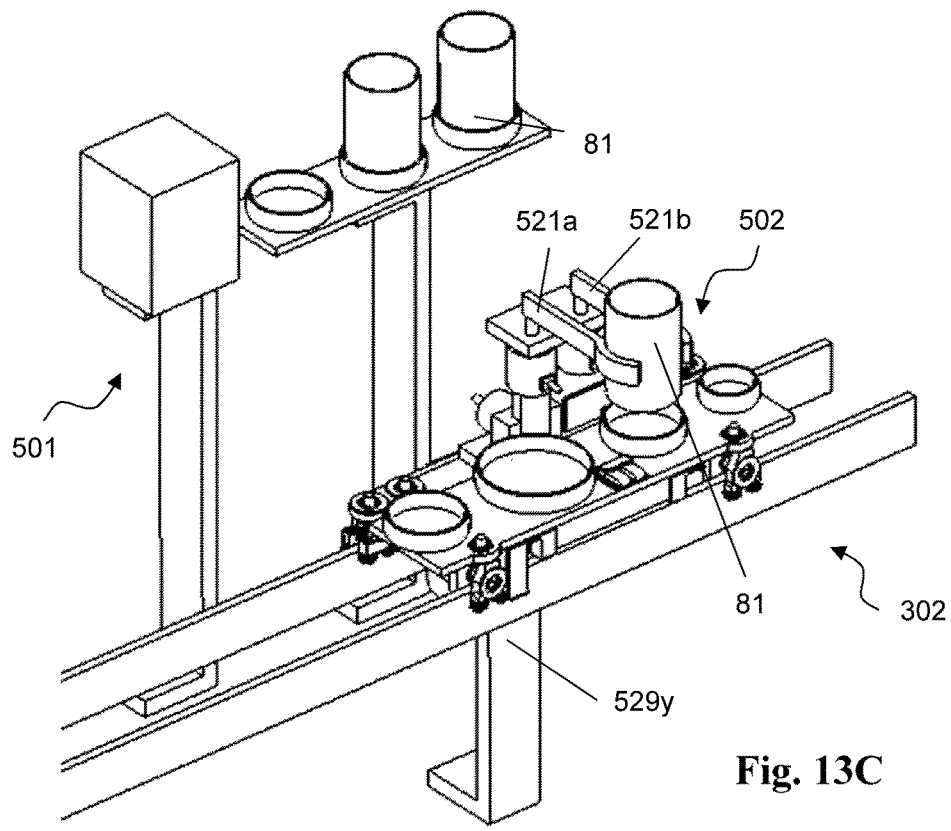
Figure 13D:
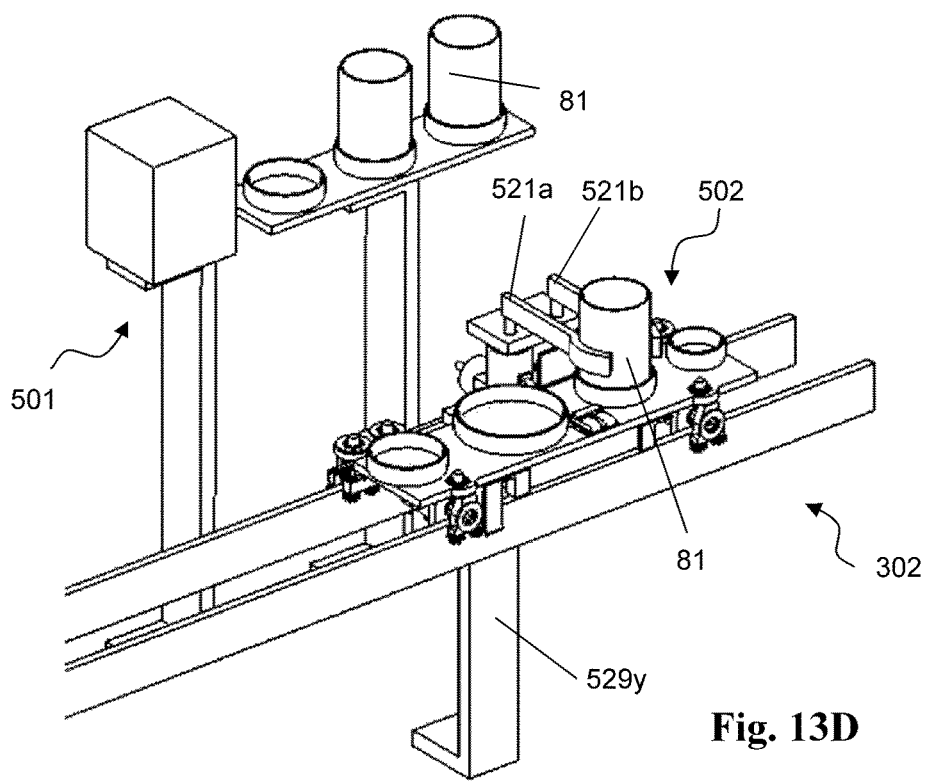

Referring to FIG. 12, a transfer apparatus 502 comprises a gripping mechanism 517 comprising: a rigid component 539 referred to as a support component; grippers 521a and 521b which can optionally be rigid or elastic components; shafts 531a and 531b; and motors 530a and 530b. Each of the motors 530a and 530b comprises a base component which is fixedly connected to the rigid component 539. The gripper 521a is rigidly or fixedly connected to the shaft 531a. The motor 530a can produce a rotation of the shaft 531a and hence of the gripper 521a around the axis of the shaft 531a relative to the rigid component 539. Similarly, the gripper 521b is rigidly or fixedly connected to the shaft 531b. The motor 530b can produce a rotation of the shaft 531b and hence of the gripper 521b around the axis of the shaft 531b relative to the rigid component 539. The motors 530a and 530b are configured to rotate the respective grippers 521a and 521b anti-synchronously around a pair of anti-parallel axes. The gripper 521a or 521b is rotated between two end-positions. At some first end-positions, the grippers 521a and 521b may grip an ingredient container 81 under the condition that the food container is placed in a certain position relative to the rigid component 539. At some second end-positions, the grippers 521a and 521b can open and release the ingredient container 81.

The transfer apparatus 502 further comprises a motion mechanism 502a comprising: a vertical motion mechanism 518; a linear motion mechanism 519; and a rotational motion mechanism 520. The vertical motion mechanism 518 comprises a stationary member 523; a moving member 522 which is constrained to move vertically relative to the stationary member 523; and a motor 523m configured to drive a motion of the moving member relative to the stationary member. The linear motion mechanism 519 comprises a stationary member 535; a moving member 534 which is constrained to move linearly relative to the stationary member 535; and a motor 535m configured to drive a motion of the moving member relative to the stationary member. The rotational motion mechanism 520 comprises: a rigid component 529y referred to as a stationary member; a shaft 525 referred to as a moving member which is constrained to rotate relative to the stationary member 529y; and a motor 528 configured to drive a rotation of the moving member relative to the stationary member. The rigid component 539 of the gripping mechanism 517 is fixedly or rigidly connected to the moving member 522, so that the vertical motion mechanism 518 is configured to produce a vertical motion of the moving member 522 and the rigid component 539 between two end-positions. A connector 533 fixedly or rigidly connects the stationary member 523 and the moving member 534, so that the linear motion mechanism 519 is configured to produce a linear motion of the moving member 534 and the stationary member 523 between two end-positions. A connector 524 fixedly or rigidly connects the shaft 525 and the stationary member 535 so that the rotational motion mechanism 520 can produce a rotation of the shaft 525 and the stationary member 535 between two end-positions. The transfer apparatus 502 can grip one or more ingredient containers 81, move them to another position, and then release them to place them at the "another position." The motors 530a, 530b, 523m, 535m, and 528 are all connected to the computer system 99 of FIG. 1, so that the computer system 99 may control timings and speeds of their produced motions.

FIGS. 13A-13D show the relative positions of the storage 501, the transfer apparatus 502 and the transport system 302. If a vehicle 790 of the transport system 302 moves to a certain position relative to the support component 529y of the transfer apparatus 502, if the shaft 525 (or the horizontal motion mechanism 519) is rotated to a first end-position by the motor 528, if the moving member 522 is at the lower end-position in the vertically linear sliding produced by the vertical motion mechanism 518, if the moving member 534 is moved to a certain position by the horizontal motion mechanism 519, and if an ingredient container 81 (which contains a food or a food ingredient and which is at an upright position) is at a certain position relative to the support component 529y, the grippers 521a and 521b can be moved to their first end-positions to grip the ingredient container (see FIG. 13A). Then, the moving member 522 is moved to the upper end-position while the ingredient container is being gripped by the grippers 521a and 521b (see FIG. 13B). Then, the shaft 525 and the stationary member 535 of the horizontal motion mechanism 519 are rotated by the motor 528 to the second end-position while the ingredient container is being gripped by the grippers 521a and 521b (see FIG. 13C). Then, the moving member 522 is moved to the lower end-position and then, the grippers 521a and 521b, when rotated to their second end-positions, may release the ingredient container to a container holder 785a of a vehicle 790 (see FIG. 13D). The computer system 99 may control the timing and speed of the motor 528, the horizontal motion mechanism 519 and the vertical motion mechanism 518. It should be noted that the vehicle 790 is braked during the time of the above procedures.

Referring to FIG. 14, a food dispensing apparatus 620 comprises a gripping mechanism 603 comprising: a rigid component 652 referred to as a support component; grippers 651a and 651b which can optionally be rigid or elastic components; shafts 665a and 665b; motors 653a and 653b. Each of the motors 653a and 653b comprises a base component which is fixedly connected to the rigid component 652. The gripper 651a is rigidly or fixedly connected to the shaft 665a. The motor 653a can produce a rotation of the shaft 665a and hence of the gripper 651a around the axis of the shaft 665a relative to the rigid component 652. Similarly, the gripper 651b is rigidly or fixedly connected to the shaft 665b. The motor 653b can produce a rotation of the shaft 665b and hence of the gripper 651b around the axis of the shaft 665b relative to the rigid component 652. The motors 653a and 653b are configured to rotate the respective grippers 651a and 651b anti-synchronously around a pair of parallel axes. The gripper 651a or 651b is rotated between two end-positions. At some first end-positions, the grippers 651a and 651b may grip a cooking container 190 under the condition that the cooking container is placed in a certain position relative to the rigid component 652, wherein the cooking container 190 is configured to contain or hold a food or a food ingredient. At some second end-positions, the grippers 651a and 651b can open and release the cooking container.

The food dispensing apparatus 620 further comprises a motion mechanism 602 comprising: a rotational motion mechanism 604 referred to as a first motion sub-mechanism; a vertical motion mechanism 605 referred to as a second motion sub-mechanism; and a rotational motion mechanism 606 referred to as a third motion sub-mechanism. The rotational motion mechanism 604 comprises: a shaft 645 referred to as a moving member, wherein the shaft 645 comprises a horizontal axis; and a motor 654 configured to drive a rotation of the shaft 645, wherein the motor 654 comprises a base component. The vertical motion mechanism 605 comprises a stationary member 655; a moving member 656 which is constrained to move vertically relative to the stationary member 655; and a motor 655m configured to drive a motion of the moving member relative to the stationary member. The rotational motion mechanism 606 comprises: a rigid component 659 referred to as a stationary member; a shaft 658 referred to as a moving member which is constrained to rotate relative to the stationary member around the axis of the shaft 658, wherein the shaft 658 comprises a vertical axis; and a motor 661 configured to drive a rotation of the moving member relative to the stationary member. The rigid component 652 of the gripping mechanism 603 is rigidly, fixedly, or otherwise connected to the shaft 645 so that the rotational motion mechanism 604 can produce a rotation of the shaft 645 and the rigid component 652 between two end-positions relative to the base component of the motor 654. When the rigid component 652 is at the first end-position, the cooking container 190 gripped by the gripping mechanism 603 is in the upright position. When the rigid component 652 is at the second end-position, the cooking container 190 gripped by the gripping mechanism 603 is turned by about 180 degrees to dispense the food or food ingredient into the cookware 11. The base component of the motor 654 is rigidly, fixedly, or otherwise connected to the moving member 656 so that the vertical motion mechanism 605 can produce a vertical motion of the moving member 656 and components attached on it between two end-positions. A connector 657 is rigidly, fixedly, or otherwise connected to the shaft 658 of the rotational motion mechanism 606 and the stationary member 655 so that the rotational motion mechanism 606 can produce a rotation of the connector 657 and components attached on it between two end-positions. The rigid component 659 is fixedly connected to the base component of the motor 661 and the floor of the building or the ground. The food dispensing apparatus 620 is configured to grip a cooking container 190 and transfer it via a combination of vertical motion, linear motion and rotational motion to another position. The motors 653a, 653b, 654, 655m and 661 are all connected to the computer system 99 of FIG. 1, so that the computer system 99 may control timings and speeds of their produced motions. The rigid component 659 may be referred to as the support component of the food dispensing apparatus 620.

Referring to FIG. 15, a liquid dispensing apparatus 660 comprises: a plurality of sprayers 428; a plurality of liquid pipes 410b, 420b; a plurality of liquid containers 414b; and a rigid component 429 referred to as a support component. Each liquid container 414b is configured to hold a liquid ingredient, e.g., cooking oil, vinegar, or water. Each liquid pipe 410b connects a sprayer 428 to a corresponding liquid pipe 420b and each liquid pipe 420b is inserted into a corresponding liquid container 414b, and a pump 412b can pump liquid contained in the liquid container 414b to the outlet of the sprayer 428 wherein the flow may be measured by a flowmeter 419b. Each liquid container 414b is positioned on an electronic scale 416b and the electronic scale 416b can weigh the corresponding liquid container 414b. Connectors 417b and 418b are configured to fixedly connect the liquid pipes 410b to improve stability of the liquid pipes. The connectors 417b, 418b and the base component of each electronic scale 416b are all fixedly connected to the rigid component 429. The pumps 412b, flowmeters 419b, and electronic scales 416b are connected by wired or wireless means to the computer system 99 of FIG. 1, so that the computer system may control the timing and amount of liquid to be drawn from the corresponding liquid container. The liquid dispensing apparatus 660 can be used to dispense a liquid ingredient contained in a liquid container 414b into a cookware or cooking container.

Figure 16A:
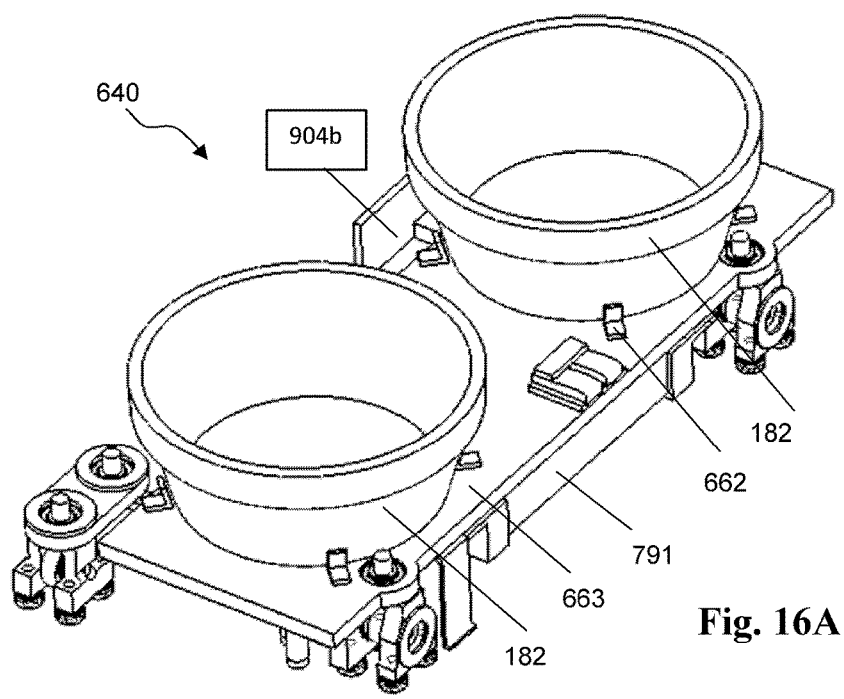
FIG. 16A shows an aerial view of a vehicle.

Referring to FIG. 16A, a vehicle 640 is similarly configured to the vehicle 790 except that: the support component 786 is substituted by a support component 663; the container holders 785a, 785b and 785c are substituted by a plurality of container holders 662; and the computer 904 is substituted by a computer 904b. The other part numbers in the vehicle 640 are the same as the corresponding part numbers in the vehicle 790. The container holders 662 are configured to hold a food container 182 so that the movement of the food container 182 may be restricted or limited when the vehicle is moving. The computer 904b may control the operations of the electrical or electronic devices of the vehicle 640 by sending signals to the electrical or electronic device. The computer 904b may communicate with the computer system 99 of FIG. 1 via a wireless communication device.

Figure 16B:
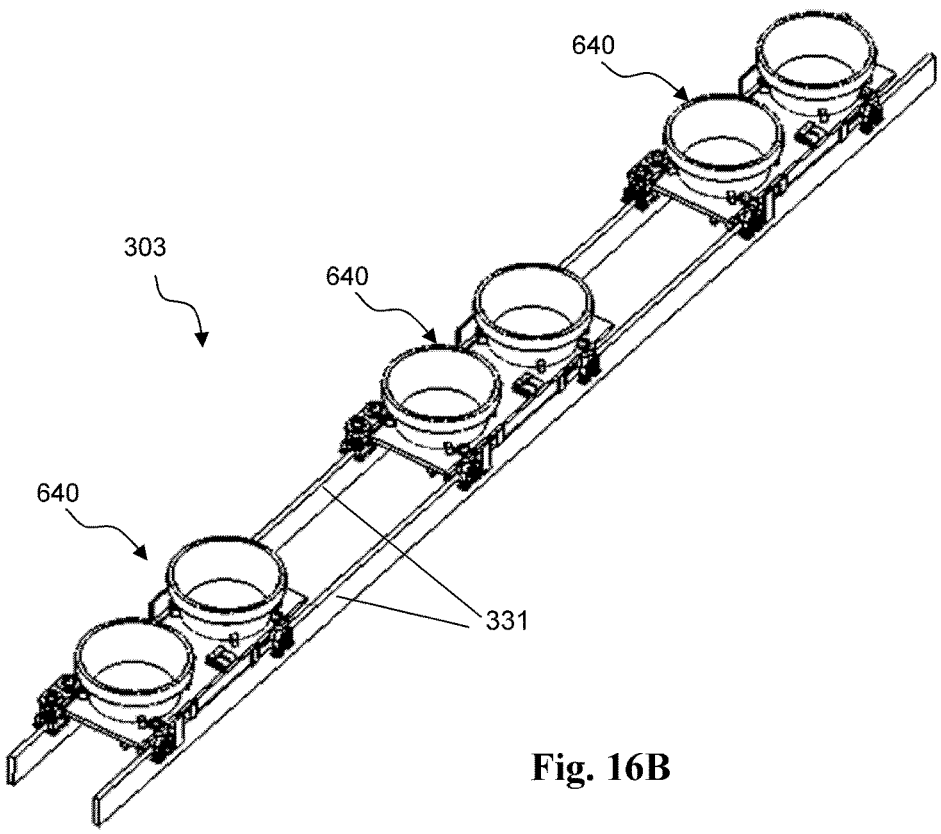
FIG. 16B shows an aerial view of a transport system comprising the vehicle of FIG. 16A.

Referring to FIG. 16B, a transport system 303 comprises tracks each comprising pairs of mini-rails 331 and a plurality of vehicles 640. Each mini-rail 331 is fixedly connected to the floor of the building or the ground. The vehicles 640 and the food containers 182 held by the container holders 662 on the vehicles 640 may move along the mini-rails 331. The transport system 303 can transfer food containers 182. The computer 904b is connected to the computer system 99 of FIG. 1 via wireless means, so that the computer system 99 may control the timing and speed of the vehicles 640.

It should be noted that the vehicle 640 may comprise additional components for the purpose of staying on track.

It should be noted that the transport system 303 may comprise track switch mechanisms. The vehicles 640 or 790 may move on different mini rails by means of a track switch mechanism.

Figure 17A:
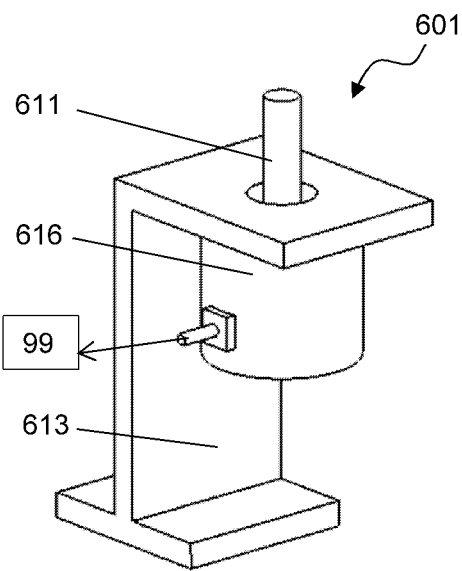
FIG. 17A shows an aerial view of a rotational motion mechanism

Referring to FIG. 17A, a rotational motion mechanism 601 comprises: a support component 613; a shaft 611 (as a moving member) which is constrained to rotate relative to the support component 613 around the axis of the shaft 611; and a motor 616 which drives the rotation of the shaft 611 relative to the support component 613. The shaft 611 may be moved from one angular position to another among a plurality of angular positions. The motor 616 is connected to the computer system 99 of FIG. 1 via wires, and the computer system 99 is configured to control the timing and speed of the motion of the motor 616. The axis of the shaft 611 is configured to be vertical or nearly vertical. The support component 613 is optionally fixedly connected to a building floor or to the ground. The axis of the rotation (i.e., the axis of the shaft 611) is configured to be vertical.

The rotation of the shaft 611 is an intermittent rotation, as it is rotated from one angular position to another among a plurality of angular positions. Thus, the rotational motion mechanism 601 may be referred to as an intermittent motion mechanism.

Figure 17B:
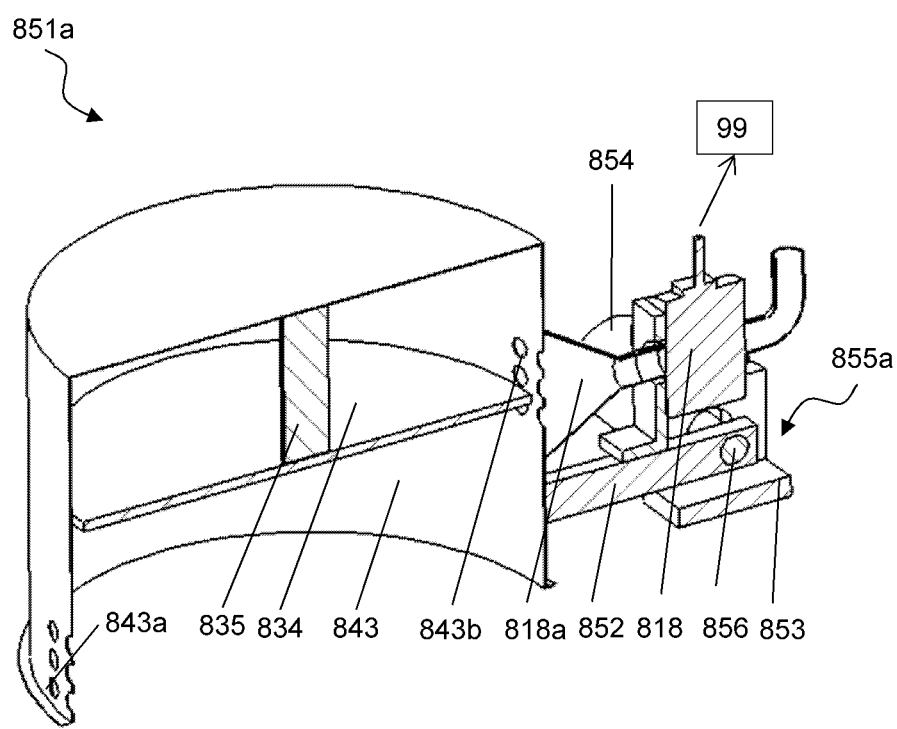
FIGS. 17B-17C show views of an enclosure mechanism.
Figure 17C:
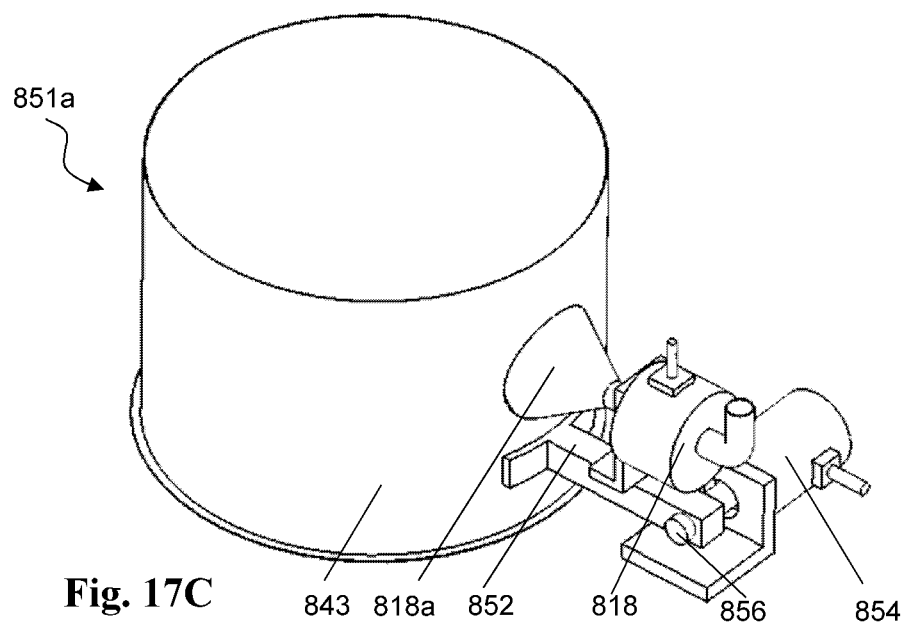

Referring to FIGS. 17B-17C, an enclosure mechanism 851a comprises: an enclosure device 843, referred to as a second enclosure component; and a motion mechanism 855a as follows. The motion mechanism 855a comprises: a support component 853; a shaft 856 which is constrained to rotate relative to the support component 853 between two end-positions; and a motor 854 configured to drive a rotation of the shaft 856 relative to the support component 853. The enclosure device 843 optionally has metal surfaces (e.g., stainless steel) and the enclosure device 843 optionally has the shape of a cap. These surfaces are smooth so they can efficiently reflect electromagnetic waves. The enclosure device 843 comprises a plurality of holes 843a and 843b, wherein the holes 843b are above the holes 843a. The enclosure device 843 is rigidly or fixedly connected to the shaft 856 via a connector 852. Thus, the motion mechanism 855a can produce a rotation of the enclosure device 843 between two end-positions: a first end-position; and a second end-position. The motor 854 is connected to the computer system 99 of FIG. 1 via wired or wireless means, and the computer system 99 may control timings and speeds of its produced motion.

The enclosure mechanism 851a further comprises: an air pump 818; and a pipe connector 818a, wherein the air pump 818 is fixedly connected to the connector 852, wherein the pipe connector 818a is fixedly connected to the inlet of the air pump 818. The other end of the pipe connector 818a is connected to the exterior side of the enclosure device 843 and the interior of the pipe connector 818a may draw air through the holes 843b. Thus, the pump 818 can draw air through the holes 843b from the cooking chamber enclosed by the enclosure device 843 (and another enclosure component, see below). At the same time, fresh air can flow from outside into the cooking chamber through the holes 843a. The enclosure mechanism 851a further comprises a cover 834 which may optionally be a round plate of non-metallic material. The cover 834 is configured to be rigidly, elastically, or fixedly connected to the enclosure device 843 via a connector 835.

It should be noted that the enclosure device 843 may have other shape. The enclosure device 843 may consist of a lid.

Figure 17D:
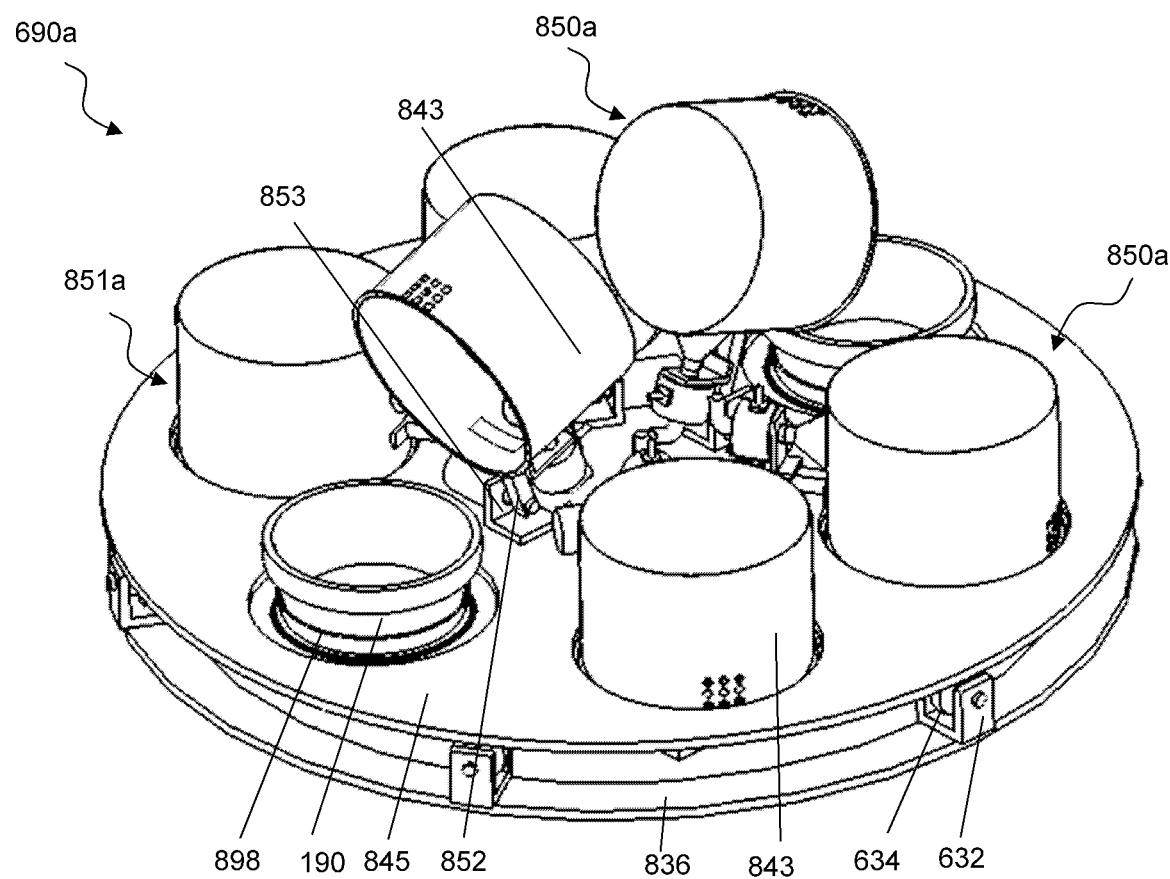
FIGS. 17D-17E show aerial views of a cooking apparatus comprising a plurality of enclosure mechanisms of FIGS. 17B-17C.
Figure 17E:
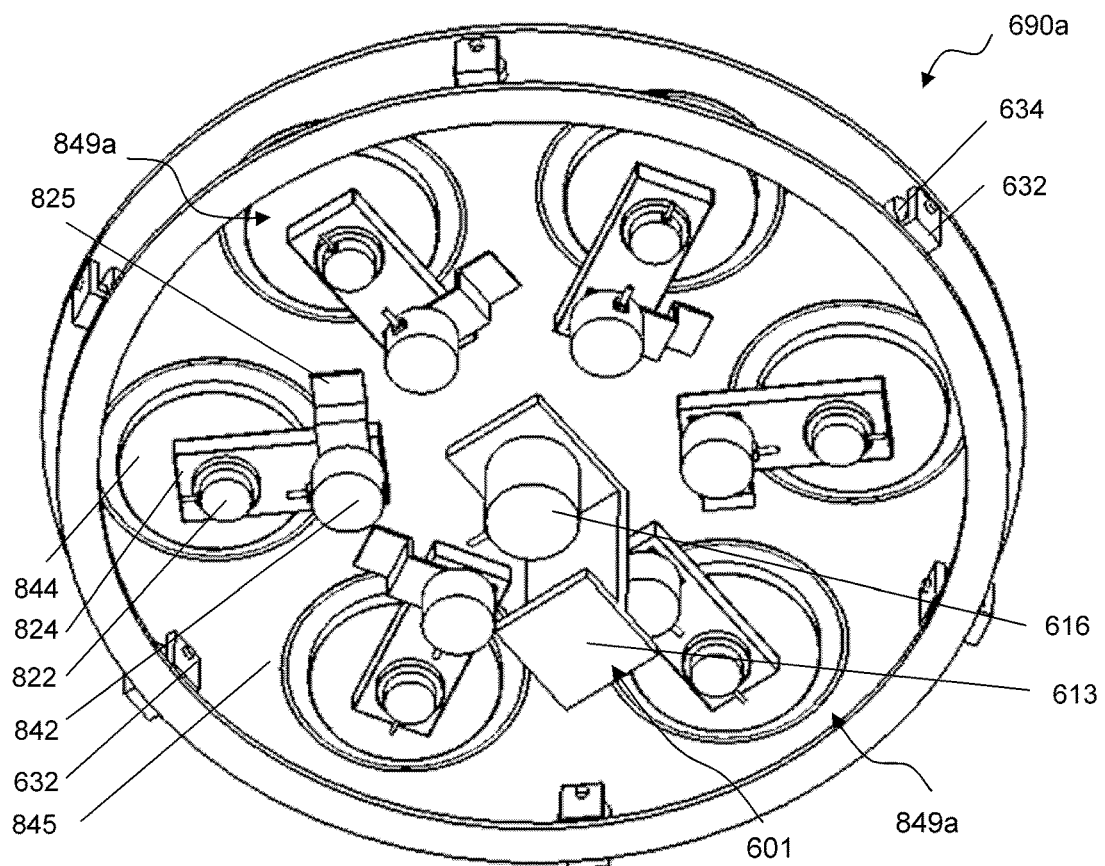
Figure 17F:
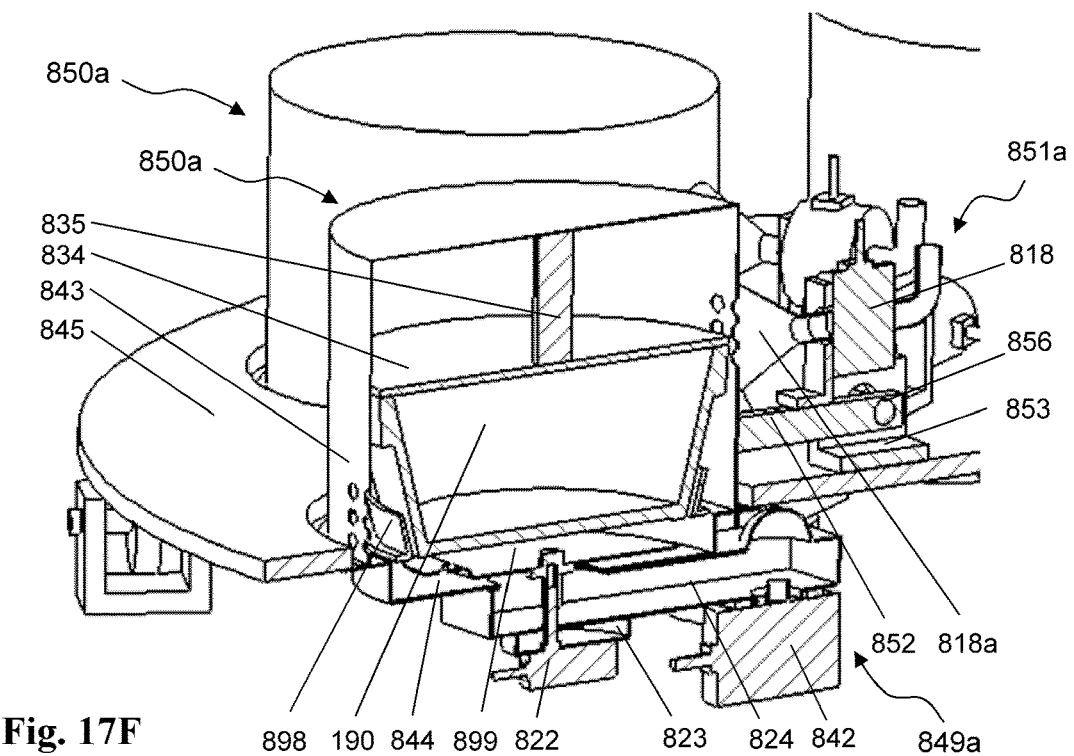
FIG. 17F shows a cutaway view of parts of the cooking apparatus.

Referring to FIGS. 17D-17F, a cooking apparatus 690a comprises: a rotatable component 845 comprising a rigid component; and a rotational motion mechanism 601 (as in FIG. 17A). The shaft 611 of the rotational motion mechanism 601 is fixedly connected to the rotatable component 845 so that the rotational motion mechanism 601 may produce a rotational motion of the rotatable component 845 around the axis of the shaft 611 wherein the axis of the shaft 611 is vertical. The rotatable component 845 may comprise a turntable but this is not a requirement.

A plurality of wheels 634 are mounted on a plurality of support components 632, which are rigidly or fixedly connected to a support component 836; and the support component 836 is optionally rigidly or fixedly connected to the floor of the building or the ground (the connection is not shown in figures but is easy to construct). The wheels 634 are used to touch and provide support to the rotatable component 845.

The cooking apparatus 690a further comprises a plurality of microwave ovens 850a which are mounted on the rotatable component 845. Each microwave oven 850a comprises a microwave generator 849a comprising: a magnetron 842; a waveguide 824; a stirrer 899 comprising fan blades which are rotatable relative to a base component 823; and a motor 822 configured to drive the rotation of the stirrer 899. The microwave oven 850a further comprises a first enclosure component 844 which is fixedly connected to the rotatable component 845. The magnetron 842, the waveguide 824, the base component 823, and a stationary member of the motor 822 are all fixedly connected to first enclosure component 844. A container holder 898 is fixedly connected to the first enclosure component 844 wherein the container holder 898 is configured to hold a cooking container 190 so that the movement of the cooking container 190 relative to the rotatable component 845 may be restricted or limited when the rotatable component 845 is moved. The container holder 898 is located inside a cooking chamber (see below).

The microwave oven 850a further comprises an enclosure mechanism 851a (as in FIGS. 17B-17C), wherein the support component 853 of the enclosure mechanism 851a is fixedly connected to the rotatable component 845. A motor 854 can produce a rotation of the enclosure device 843 between two end-positions: a first end-position; and a second end-position. When the enclosure device 843 is rotated to the first end-position, the enclosure device 843 is configured to touch on the first enclosure component 844. At this time, the enclosure device 843 (as the second enclosure component), the first enclosure component 844 can enclose a cooking chamber; the cover 834 can cover the cooking container 190 (if any) which is positioned or held by the container holder 898; and the cover 834, the container holder 898, and the cooking container 190 are all inside the cooking chamber, and the microwave oven may cook the food or food ingredient contained within or otherwise held by the cooking container 190. It should be noted that the cover 834 is used to prevent the food or food ingredient in the cooking container 190 from splashing out during the cooking process (as in FIG. 17F). When the enclosure device 843 is rotated to the second end-position, the cooking chamber is opened. The magnetron 842 comprises an emitter which is inserted into a corresponding waveguide 824, so that electromagnetic waves produced by the magnetron 842 can pass through the interior of the waveguide 824.

The waveguide 824 is rigidly connected to the first enclosure component 844, and electromagnetic waves can transfer from the waveguide 824 to the cooking chamber enclosed by the first enclosure component 844 and the enclosure device 843. The motor 822 is configured to rotate the blades of the stirrer 899. The magnetron 842 can produce an electromagnetic wave of fixed or variable frequencies; and via the waveguide and the stirrer, the electromagnetic waves are directed into the cooking chamber to heat the food or food ingredient contained in a cooking container 190 positioned inside the cooking chamber.

Figure 17G:
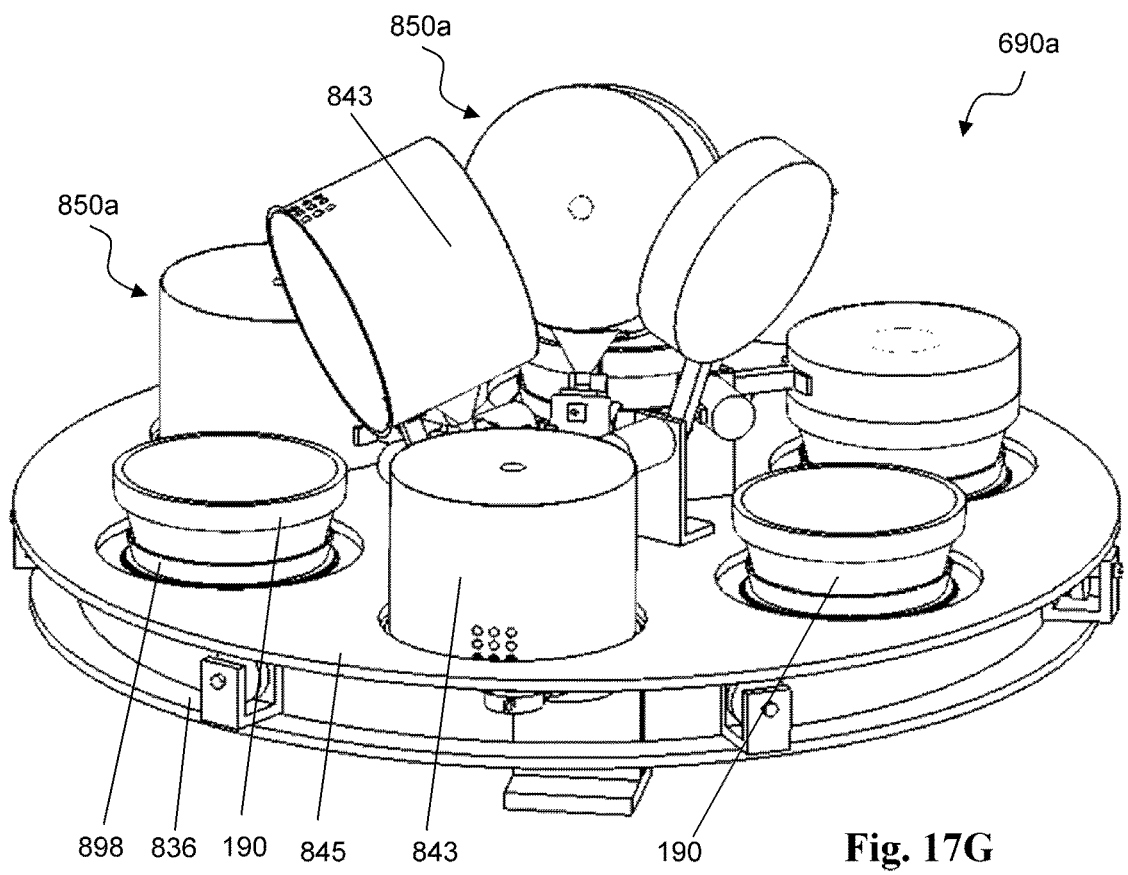
FIG. 17G shows an aerial view of a cooking apparatus.

The microwave ovens 850a are optionally configured to be cyclically and symmetrically positioned around the rotational axis of the rotatable component 845, wherein the rotational axis is vertical. This is not a strict requirement. It is possible that some microwave ovens are bigger than others. It is also possible that some microwave ovens are substituted by other ovens (see FIG. 17G).

It should be noted that the support component 613 of the rotational motion mechanism 601 is referred to the base support component of the cooking apparatus 690a.

It should be noted that the holes 843b may be drilled through the top of the enclosure device 843 and the air pump may be mounted on the top of the cap.

Figure 17H:
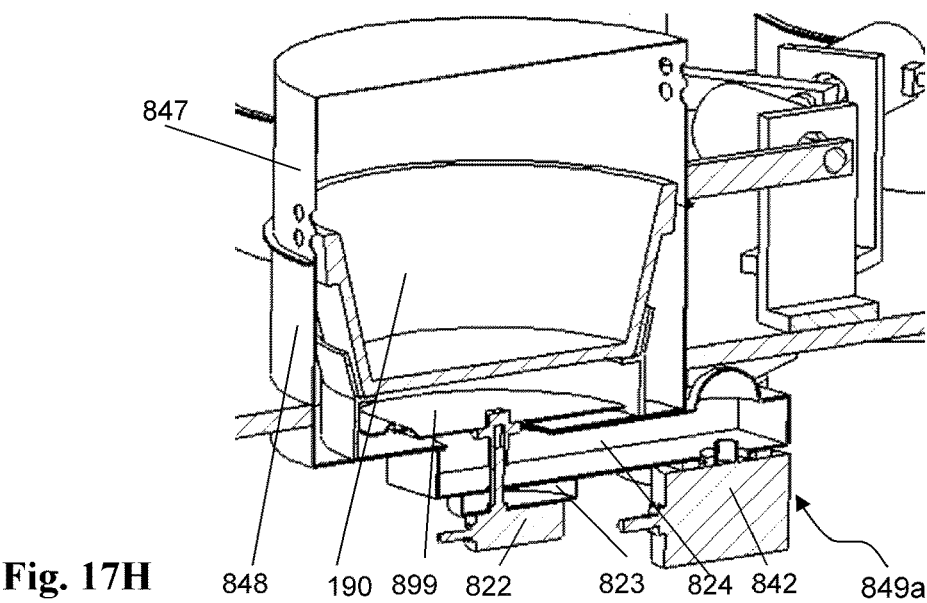
FIG. 17H a cutaway view of parts of the cooking apparatus.

It should be noted that the first enclosure component 844 and the enclosure device 843 (as the second enclosure component) may be substituted by other shapes of solids, as long as they are structured to enclose a cooking chamber. For example, the first enclosure component 844 may comprise a flat bottom and a cylindrical wall, and the second enclosure component is a solid flat lower surface. As another example, the first enclosure component 844 may be substituted by a solid 848 comprising a flat bottom and a cylindrical wall, and the second enclosure component 843 may be substituted by a solid 847 comprising a flat bottom and a cylindrical wall, wherein both cylindrical walls comprise the same sectional shapes, see FIG. 17H. The interior side of the enclosure device 843 (or the first enclosure component) comprises a metal (e.g., stainless steel) surface.

It should be noted that each microwave generator 849a may be substituted by another type of generator of electromagnetic waves. Generators of electromagnetic waves may be constructed by known techniques.

Figure 18A:
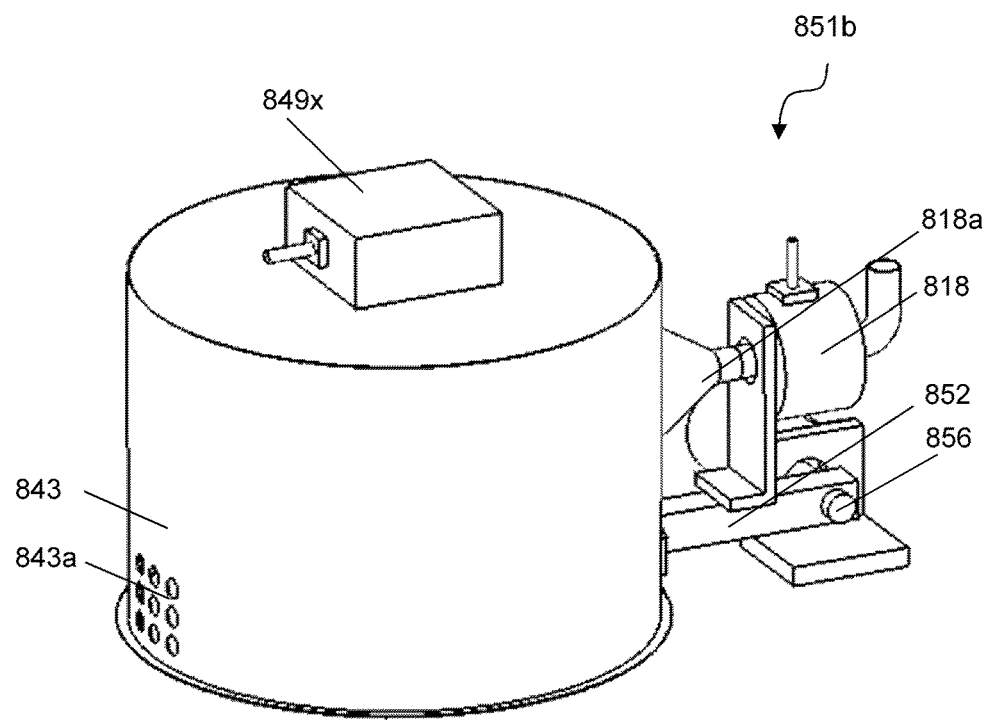
FIG. 18A shows an aerial view of an enclosure mechanism
Figure 18B:
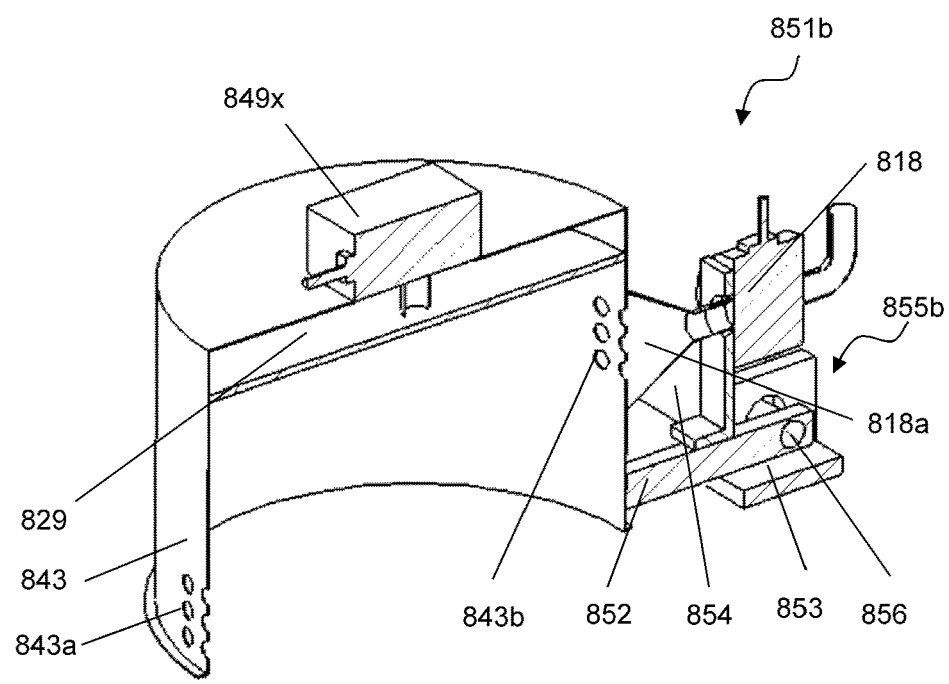
FIG. 18B shows a cutaway aerial view of the enclosure mechanism

Referring to FIGS. 18A-18B, an enclosure mechanism 851b comprises: an enclosure device (referred to as a second enclosure component) 843 (as described above); and a motion mechanism 855b as follows. The motion mechanism 855b comprises: a support component 853; a shaft 856 which is constrained to rotate relative to the support component 853 between two end-positions; and a motor 854 configured to drive a rotation of the shaft 856 relative to the support component 853. The enclosure device 843 is rigidly or fixedly connected to the shaft 856 via a connector 852. Thus, the motion mechanism 855b can produce a rotation of the enclosure device 843 between two end-positions: a first end-position; and a second end-position. The motor 854 is connected to the computer system 99 of FIG. 1 via wires or wireless means, and the computer system 99 may control timings and speeds of its produced motion.

The enclosure mechanism 851b further comprises an air pump 818 and a pipe connector 818a, wherein the air pump 818 is fixedly connected to the connector 852, wherein the pipe connector 818a is fixedly connected to the inlet of the air pump 818. Another end of the pipe connector 818a is connected to the exterior side of the enclosure device 843 and the interior of the pipe connector 818a may draw air through the holes 843b. Thus, the pump 818 can draw air from the cooking chamber enclosed by the enclosure device 843 and other components through the holes 843b. At the same time, fresh air can flow from outside into the cooking chamber through the holes 843a.

The enclosure mechanism 851b further comprises a solid component 829 of non-metallic material. The component 829 optionally has the shape of a round board. The component 829 is fixedly mounted inside the enclosure device 843, above the holes 843a and 843b. The component 829 can prevent or limit steam and air to pass through it.

Figure 18C:
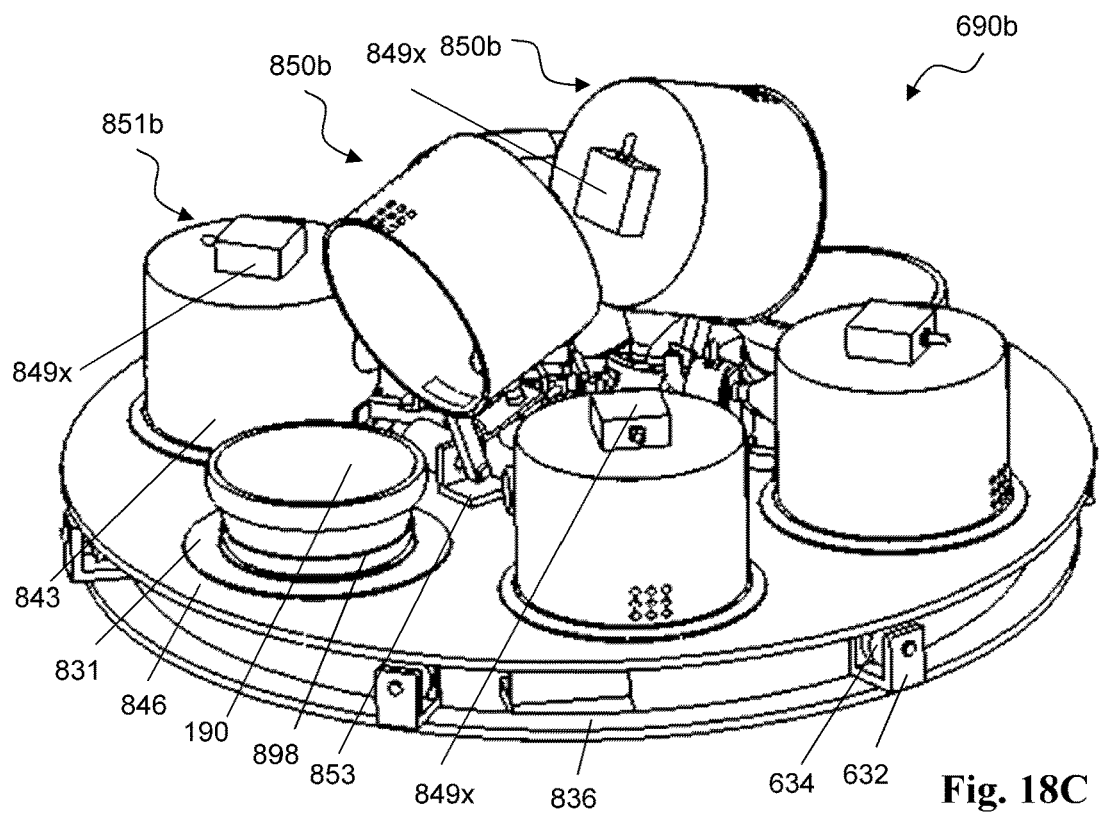
FIGS. 18C-18D show aerial views of a cooking apparatus comprising a plurality of enclosure mechanisms of FIG. 18A.
Figure 18D:
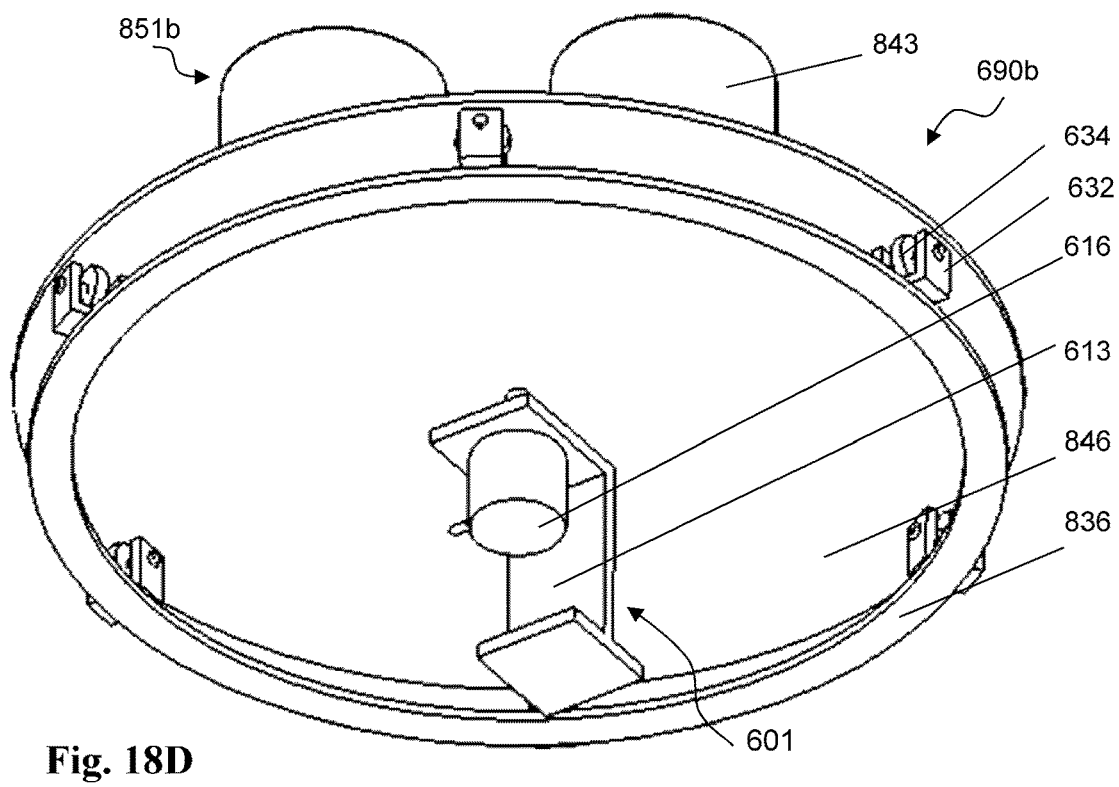

Referring to FIGS. 18C-18D, a cooking apparatus 690b (which may be referred to as a first cooking apparatus) comprises: a rotatable component 846; and a rotational motion mechanism 601 (as in FIG. 17A). The shaft 611 of the rotational motion mechanism 601 is fixedly connected to the rotatable component 846 so that the rotational motion mechanism 601 may produce a rotational motion of the rotatable component 846 around the axis of the shaft 611 wherein the axis of the shaft 611 is vertical. (The rotatable component 846 may comprise a turntable but this is not a requirement.)

A plurality of wheels 634 are mounted on a plurality of support components 632, which are rigidly or fixedly connected to the support component 836; and the support component 836 is optionally rigidly or fixedly connected to the floor of the building or the ground (the connection is not shown in figures but is easy to construct). The wheels 634 are used to touch and provide support to the rotatable component 846.

The cooking apparatus 690b further comprises a plurality of microwave ovens 850b which are mounted on the rotatable component 846. Each microwave oven 850b comprises a microwave generator 849x. The microwave generator 849x is configured the same way as the microwave generator 849a. Thus, the microwave generator 849x comprises: a magnetron 842; a waveguide 824; a stirrer 899 comprising fan blades which are rotatable relative to a base component 823; and a motor 822 configured to drive the rotation of the stirrer 899.

The microwave oven 850b further comprises an enclosure mechanism 851b (as in FIGS. 18A-18B) and a first enclosure component 831, wherein the support component 853 and the first enclosure component 831 are all fixedly connected to the rotatable component 846. The microwave generator 849x is fixedly or rigidly connected to the enclosure device 843 of the enclosure mechanism 851b. The motor 854 of the enclosure mechanism 851b can produce a rotation of the enclosure device 843 between two end-positions: a first end-position; and a second end-position. When the enclosure device 843 is rotated to the first end-position, the enclosure device 843 is configured to touch on the first enclosure component 831. At this time, the enclosure device 843 and the first enclosure component 831 are configured to enclose a cooking chamber. When the enclosure device 843 is rotated to the second end-position, the cooking chamber is opened. A container holder 898 is fixedly connected to the first enclosure component 831 and is located inside the cooking chamber. The container holder 898 is configured to hold a cooking container 190 in the cooking chamber so that the movement of the cooking container 190 relative to the rotatable component 846 may be restricted or limited when the rotatable component 846 is moved.

In the microwave oven 850b, the electromagnetic waves produced by the magnetron 842 of the microwave generator 849x can pass through (with help of the stirrer 899) the interior of the waveguide 824 and then transfer into the cooking chamber enclosed by the first enclosure component 831 and the enclosure device 843. The electromagnetic waves in the cooking chamber can heat the food or food ingredient contained in a cooking container 190 positioned inside the cooking chamber.

The microwave ovens 850b are optionally configured to be cyclically and symmetrically positioned around the rotational axis of the rotatable component 846, wherein the rotational axis is vertical. This is not a strict requirement. It is possible that some microwave ovens are bigger than others. It is also possible that some microwave ovens are substituted by other ovens.

It should be noted that the support component 613 of the rotational motion mechanism 601 is referred to the base support component of the cooking apparatus 690b.

Figure 19A:
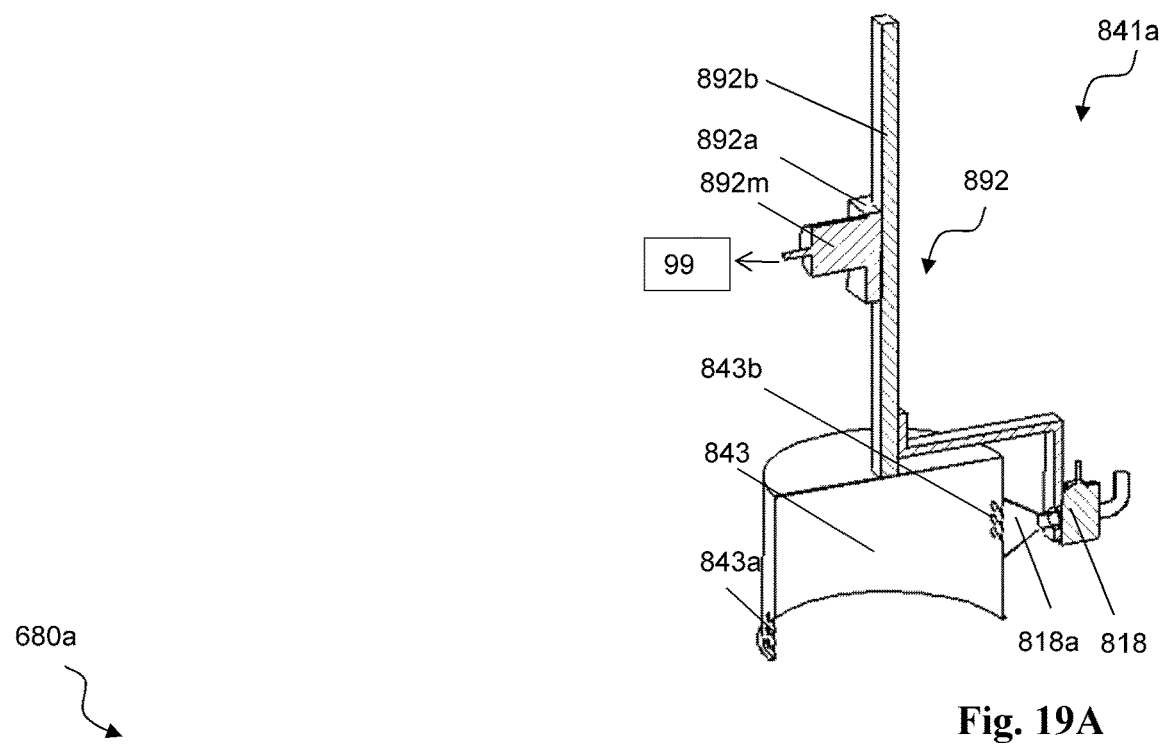
FIG. 19A shows a cutaway view of an enclosure mechanism.

Referring to FIG. 19A, an enclosure mechanism 841a comprises: an enclosure device (referred to as a second enclosure component) 843 (as described above); and a linear actuator 892. The linear actuator 892 comprises: a base component 892a (as a stationary member); a rod 892b (as a moving member) which is constrained to move vertical relative to the base component 892a between two end-positions; and a motor 892m configured to drive a motion of the rod 892b relative to the base component 892a. The end of the rod 892b is fixedly connected to the enclosure device 843, so that the linear actuator 892 can move the enclosure device 843 vertically relative to the base component 892a between two end-positions. The motor 892m is connected to the computer system 99 of FIG. 1 by wires or by wireless means and the computer system 99 may control timings and speeds of its produced motion.

The enclosure mechanism 841a further comprises: an air pump 818; and a pipe connector 818a, wherein the air pump 818 is fixedly connected to the moving member 892b, wherein the pipe connector 818a is fixedly connected to the inlet of the air pump 818. The other end of the pipe connector 818*a* is connected to the exterior side of the enclosure device 843 and the interior of the pipe connector 818*a* may draw air through the holes 843*b*. Thus, the pump 818 can draw air through the holes 843*b* from the cooking chamber enclosed by the enclosure device 843 and other components. At the same time, fresh air can flow from outside into the cooking chamber through the holes 843*a*.

Figure 19B:
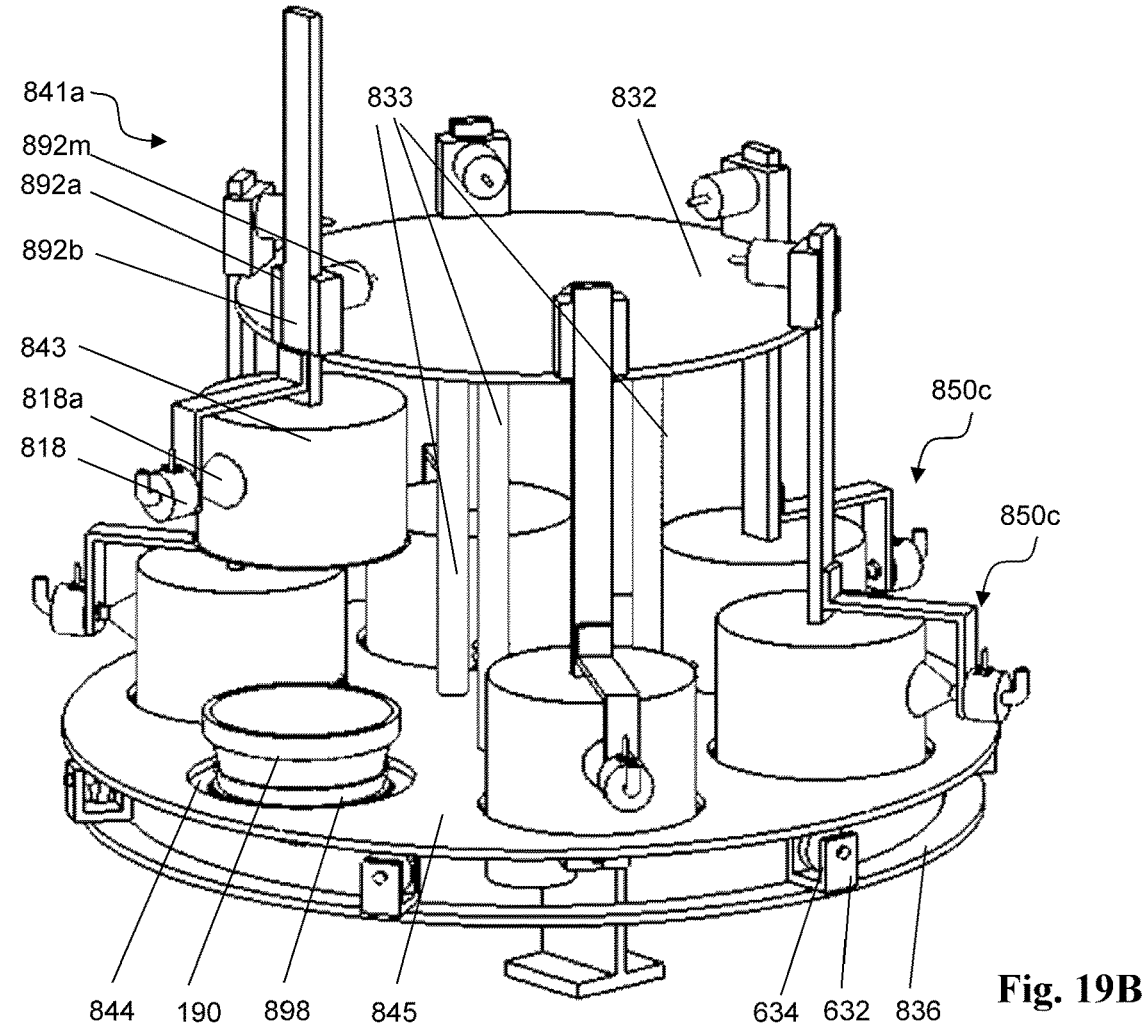
FIGS. 19B-19C show aerial views of a cooking apparatus comprising a plurality of enclosure mechanisms of FIG. 19A.
Figure 19C:
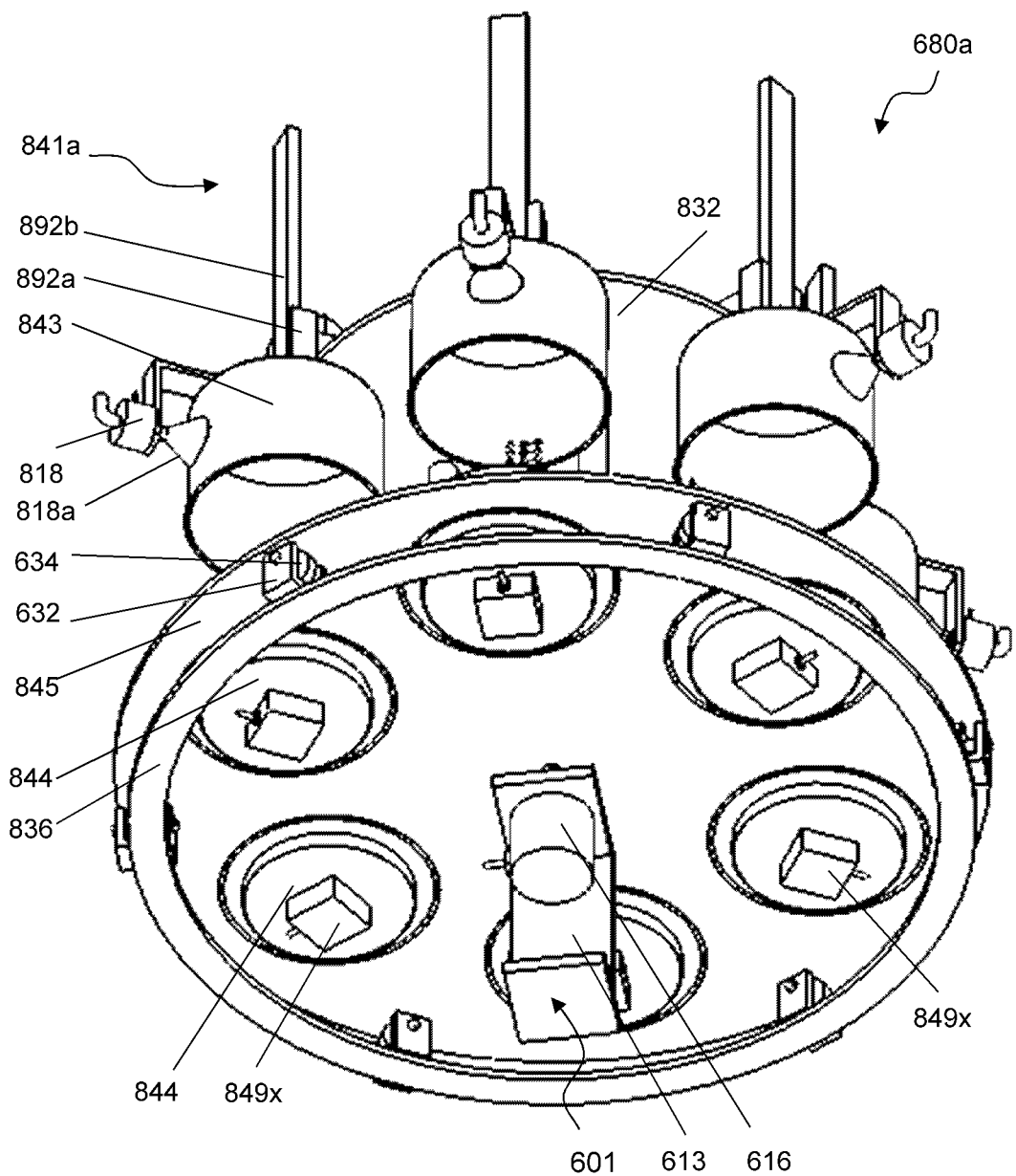

Referring to FIGS. 19B-19C, a cooking apparatus 680*a* (which may be referred to as a first cooking apparatus) comprises: a rotatable component 845; a support component 832; and a rotational motion mechanism 601 (as in FIG. 17A). The support component 832 is fixedly connected to the rotatable component 845 via a plurality of connectors 823. The shaft 611 of the rotational motion mechanism 601 is fixedly connected to the rotatable component 845 so that the rotational motion mechanism 601 may produce a rotational motion of the rotatable component 845 and the support component 832 around the axis of the shaft 611 wherein the axis of the shaft 611 is vertical. The rotatable component 845 may comprise a turntable but this is not a requirement.

A plurality of wheels 634 are mounted on a plurality of support components 632, which are rigidly or fixedly connected to the support component 836; and the support component 836 is optionally rigidly or fixedly connected to the floor of the building or the ground (the connection is not shown in figures but is easy to construct). The wheels 634 are used to touch and provide support to the rotatable component 845.

The cooking apparatus 680*a* further comprises a plurality of microwave ovens 850*c* which are mounted on the rotatable component 845. Each microwave oven 850*c* comprises: a first enclosure component 844 which is fixedly connected to the rotatable component 845; a microwave generator 849*x* fixedly connected to first enclosure component 844; and an enclosure mechanism 841*a* (as in FIG. 19A), wherein the base component 892*a* of the enclosure mechanism 841*a* is fixedly connected to the support component 832. The linear actuator 892 of the enclosure mechanisms 841*a* can produce a vertical motion of the enclosure device 843 between two end-positions: a first end-position which is lower; and a second end-position which is higher. When the enclosure device 843 is moved to the lower position (i.e., the first end-position), the enclosure device 843 is configured to touch on the first enclosure component 844. At this time, the enclosure device 843 and the first enclosure component 844 are configured to enclose a cooking chamber. When the enclosure device 843 is moved to the higher position (the second end-position), the cooking chamber is opened.

A container holder 898 is fixedly connected to the first enclosure component 844 and is located inside the cooking chamber. The container holder 898 is configured to hold a cooking container 190 in the cooking chamber so that the movement of the cooking container 190 relative to the rotatable component 845 may be restricted or limited when the rotatable component is moved.

In the microwave oven 850*c*, the electromagnetic waves produced by the magnetron 842 can pass through (with help of the stirrer 899) the interior of the waveguide 824 and then transfer into the cooking chamber enclosed by the first enclosure component 844 and the enclosure device 843. The electromagnetic waves in the cooking chamber can heat the food or food ingredient contained in a cooking container 190 positioned inside the cooking chamber.

The microwave ovens 850*c* are optionally configured to be cyclically and symmetrically positioned around the rotational axis of the rotatable component 845, wherein the rotational axis is vertical. This is not a strict requirement. It is possible that some microwave ovens are bigger than others. It is also possible that some microwave ovens are substituted by other ovens (e.g., light wave ovens).

It should be noted that the support component 613 of the rotational motion mechanism 601 is referred to the base support component of the cooking apparatus 680*a*.

Figure 20A:
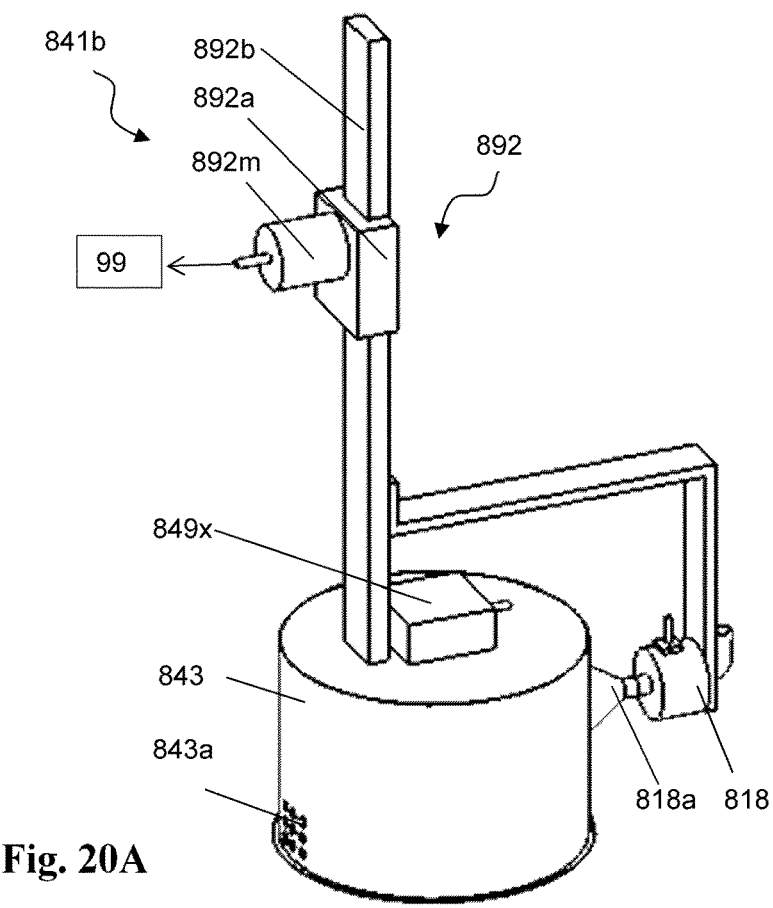
FIG. 20A shows an aerial view of an enclosure mechanism
Figure 20B:
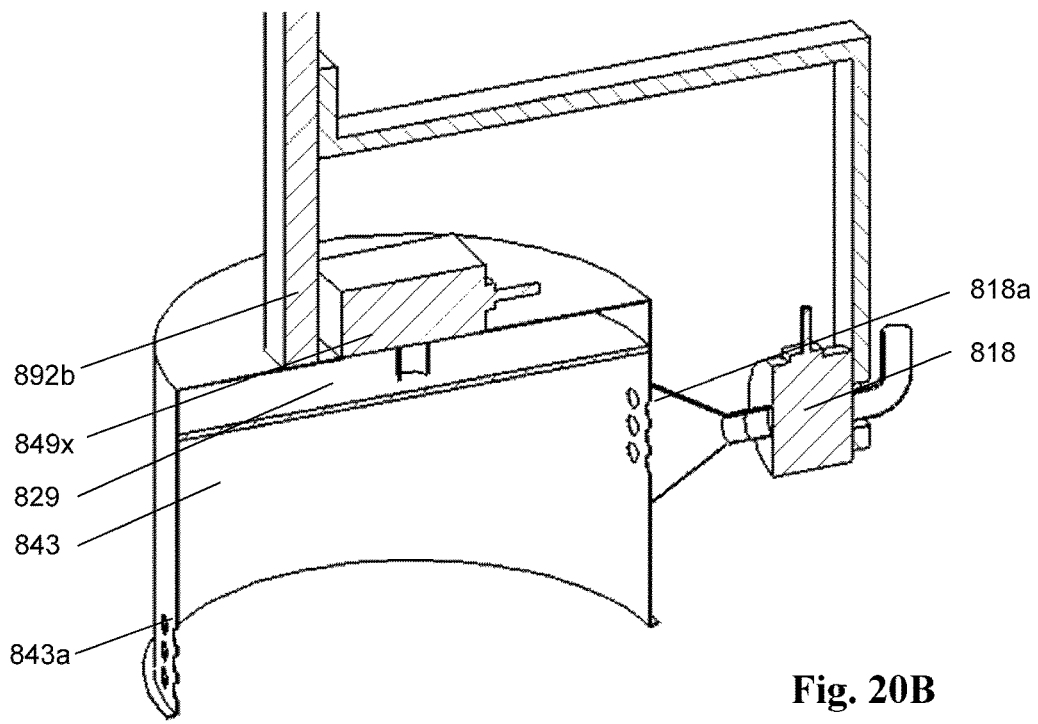
FIG. 20B shows a cutaway aerial view of the enclosure mechanism.

Referring to FIGS. 20A-20B, an enclosure mechanism 841*b* comprises: a linear actuator 892; and an enclosure device (referred to as a second enclosure component) 843 (as described above). The enclosure device 843 is fixedly connected to the moving member 892*b*, so that the linear actuator 892 can move the enclosure device 843 vertically relative to the base component 892*a* between two end-positions.

The enclosure mechanism 841*b* further comprises: an air pump 818; and a pipe connector 818*a*, wherein the air pump 818 is fixedly connected to the moving member 892*b*, wherein the pipe connector 818*a* is fixedly connected to the inlet of the air pump 818. The other end of the pipe connector 818*a* is connected to the exterior side of the enclosure device 843 and the interior of the pipe connector 818*a* may draw air through the holes 843*b*. Thus, the pump 818 can draw air from the cooking chamber enclosed by the enclosure device 843 and other components through the holes 843*b*. At the same time, fresh air can flow from outside into the cooking chamber through the holes 843*a*.

The enclosure mechanism 841*b* further comprises a solid component 829 of non-metallic material (configured the same way as the one described in FIG. 18B). The component 829 is fixedly mounted inside the enclosure device 843, above the holes 843*a* and 843*b*. The component 829 is used to prevent or limit steam and air to pass through it.

Figure 20C:
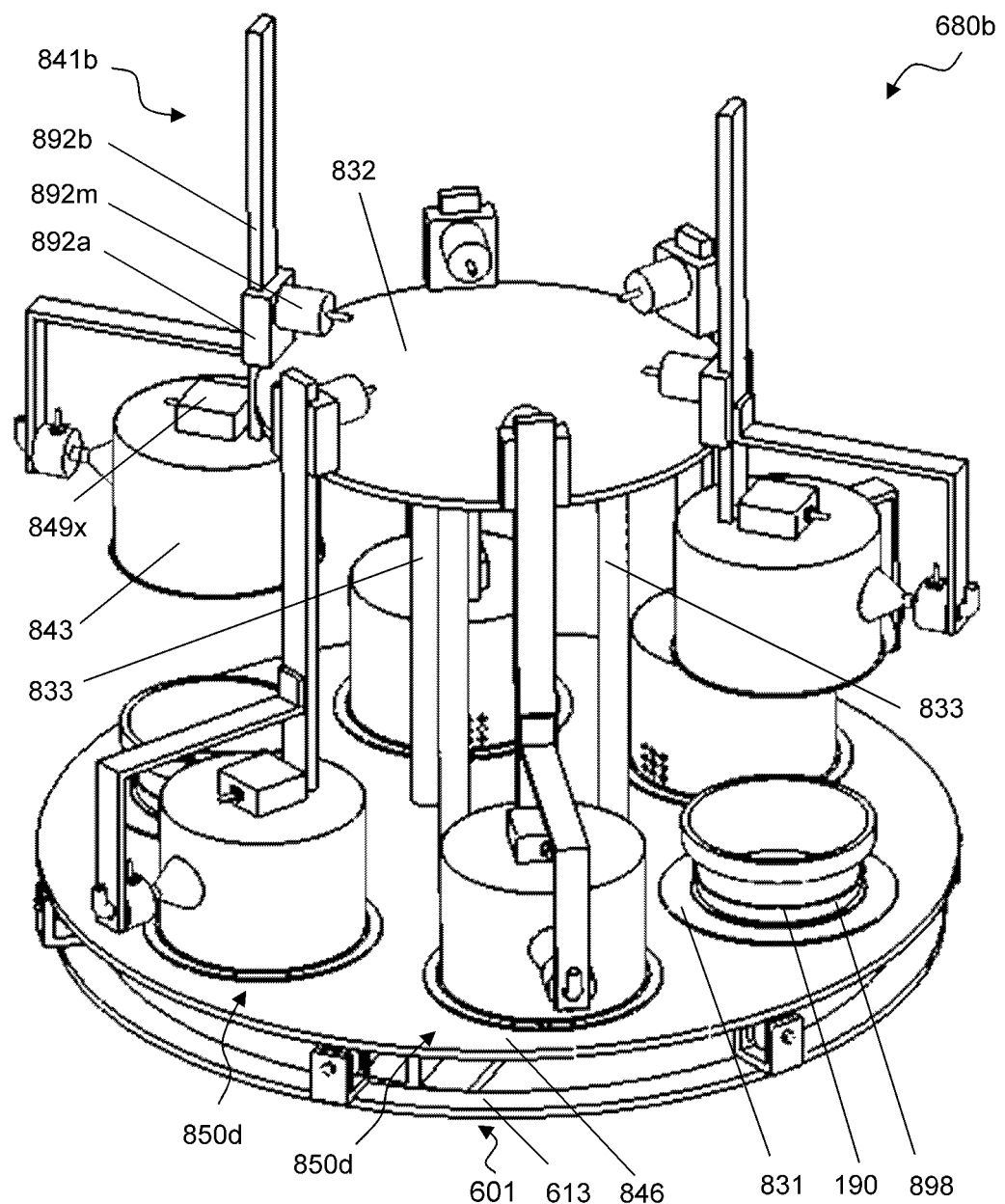
FIGS. 20C-20D show aerial views of a cooking apparatus comprising a plurality of enclosure mechanisms of FIG. 20A.
Figure 20D:
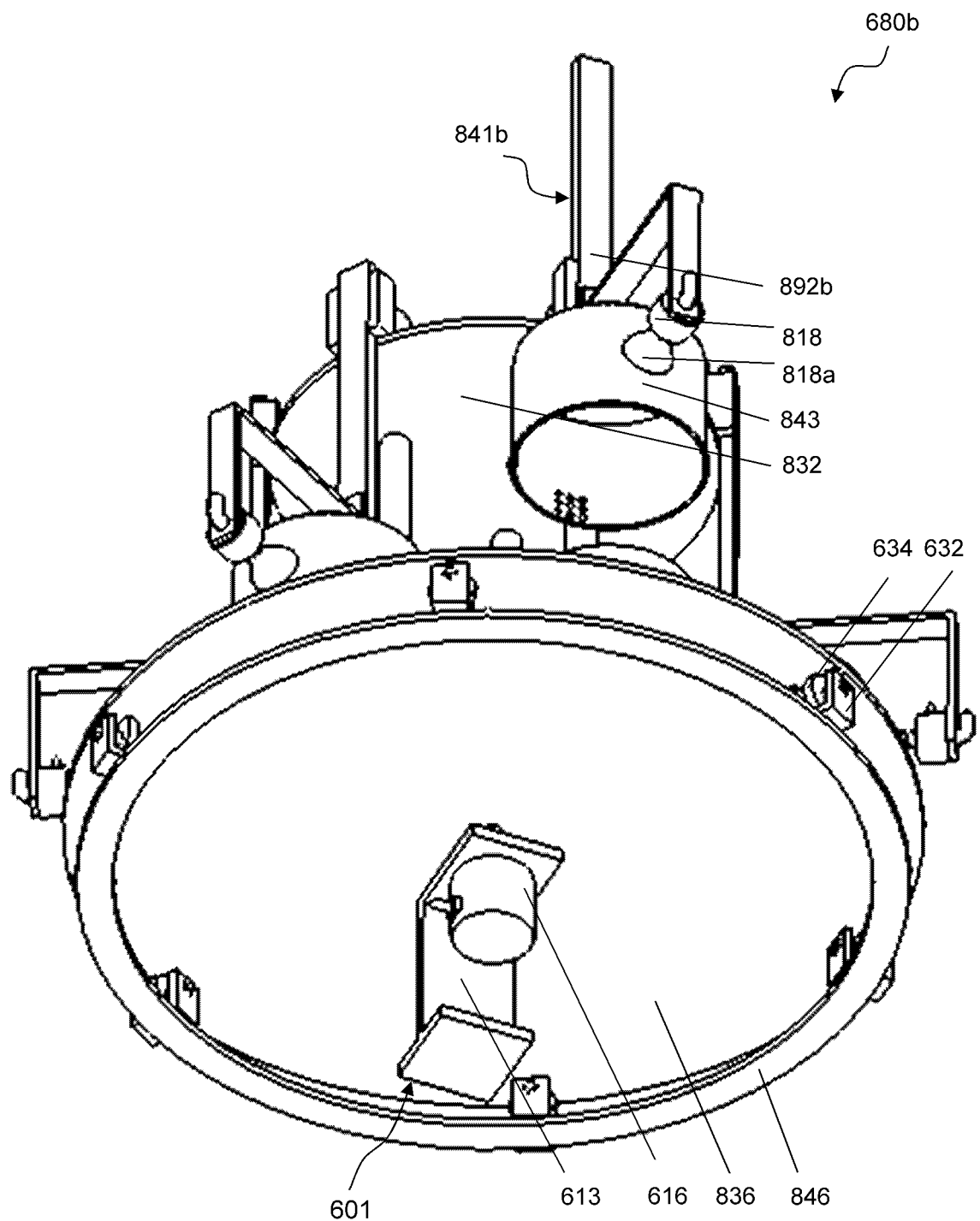

Referring to FIGS. 20C-20D, a cooking apparatus 680*b* (which may be referred to as a first cooking apparatus) comprises: a rotatable component 846; a support component 832; and a rotational motion mechanism 601 (as in FIG. 17A). The shaft 611 of the rotational motion mechanism 601 is fixedly connected to the rotatable component 846 so that the rotational motion mechanism 601 may produce a rotational motion of the rotatable component 846 around the axis of the shaft 611 wherein the axis of the shaft 611 is vertical. The rotatable component 846 may comprise a turntable but this is not a requirement. The support component 832 is fixedly connected to the rotatable component 846 via a plurality of connectors 833.

A plurality of wheels 634 are mounted on a plurality of support components 632, which are rigidly or fixedly connected to the support component 836; and the support component 836 is optionally rigidly or fixedly connected to the floor of the building or the ground (the connection is not shown in figures but is easy to construct). The wheels 634 are used to touch and provide support to the rotatable component 846.

The cooking apparatus 680*b* comprises a plurality of microwave ovens 850*d* which are mounted on the rotatable component 846. Each microwave oven 850*d* comprises: a first enclosure component 831 which is fixedly connected to the rotatable component 846; and an enclosure mechanism 841*b* (as in FIGS. 20A-20B), wherein the base component 892*a* of the enclosure mechanism 841*b* is fixedly connected to the support component 832; and a microwave generator 849*x* fixedly connected to the enclosure device 843 of the enclosure mechanism 841*b*. The linear actuator 892 of the enclosure mechanisms 841*b* can produce a vertical motion of the enclosure device 843 between two end-positions: a first end-position which is lower; and a second end-position which is higher. When the enclosure device 843 is moved to the lower position (i.e., the first end-position), the enclosure device 843 is configured to touch on the first enclosure component 831. At this time, the enclosure device 843 and the first enclosure component 831 are configured to enclose a cooking chamber. When the enclosure device 843 is moved to the higher position (the second end-position), the cooking chamber is opened. A container holder 898 is fixedly connected to the first enclosure component 831 and is located inside the cooking chamber. The container holder 898 is configured to hold a cooking container 190 in the cooking chamber so that the movement of the cooking container 190 relative to the rotatable component 846 may be restricted or limited when the rotatable component 846 is moved.

In the microwave oven 850*d*, the electromagnetic waves produced by the magnetron 842 of the microwave generator 849*x* can pass through (with help of the stirrer 899 of the microwave generator 849*x*) the interior of the waveguide 824 and then transfer into the cooking chamber enclosed by the first enclosure component 831 and the enclosure device 843 to heat the food or food ingredient contained in the cooking container 190 positioned inside the cooking chamber. The electromagnetic waves in the cooking chamber can heat the food or food ingredient contained in a cooking container 190 positioned inside the cooking chamber.

The microwave ovens 850*d* are optionally configured to be cyclically and symmetrically positioned around the rotational axis of the rotatable component 846, wherein the rotational axis is vertical. This is not a strict requirement. It is possible that some microwave ovens are bigger than others. It is also possible that some microwave ovens can be substituted by other ovens.

It should be noted that the support component 613 of the rotational motion mechanism 601 is referred to the base support component of the cooking apparatus 680*b*.

Figure 21A:
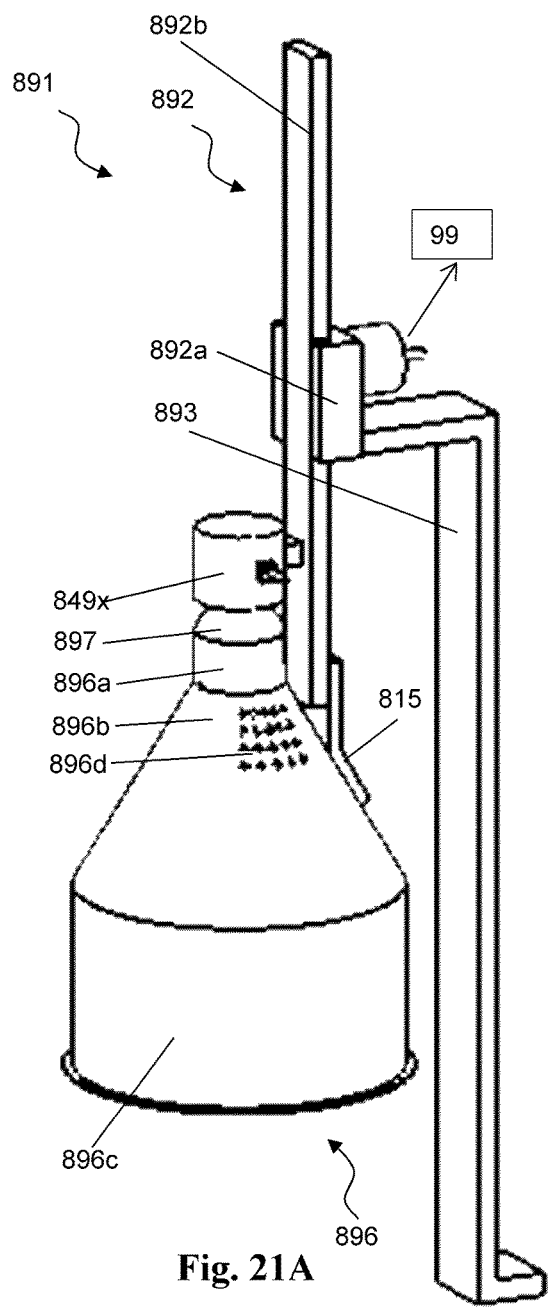
FIG. 21A shows an aerial view of an enclosure mechanism
Figure 21B:
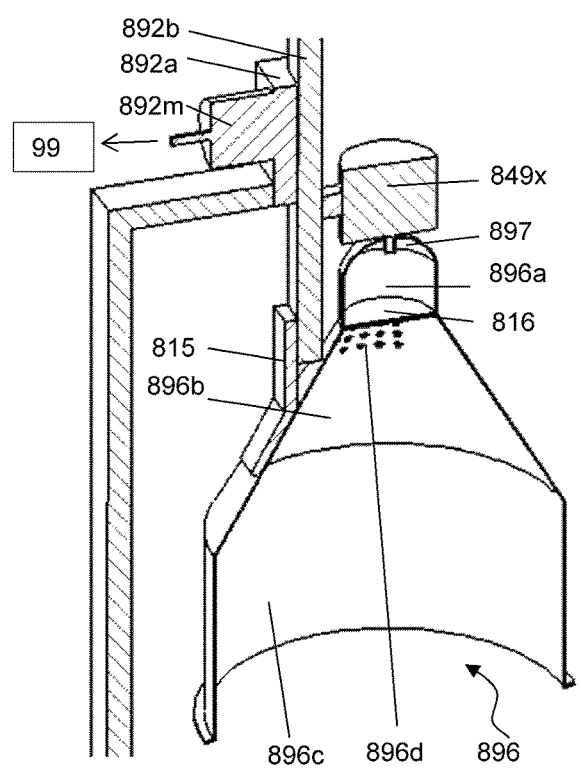
FIG. 21B shows a cutaway view of parts of the enclosure mechanism

Referring to FIGS. 21A-21B, an enclosure mechanism 891 comprises: a linear actuator 892; a support component 893; and an enclosure device (referred to as a second enclosure component) 896 in the shape of a cap. The enclosure device 896 comprises cylindrical surfaces 896*a* and 896*c* which are joined to a cone surface 896*b*; wherein the radius of the cylindrical surface 896*c* is larger than that of the cylindrical surface 896*a*. The enclosure device 896 comprises a paraboloidal surface 897 at the top. The enclosure device 896 may be configured to be a rigid component. All surfaces 896*a*, 896*b*, 896*c* and 897 of the enclosure device 896 are configured to be metal surfaces preferably made of stainless-steel sheets. These surfaces need to be smooth so they can efficiently reflect electromagnetic waves. The enclosure device 896 comprises a plurality of holes 896*d* (through the cone surface 896*b*) so air can flow through the holes. A round component 816 of non-metallic material is fixedly mounted inside the cap, above the holes 896*d*. The component 816 can prevent or limit steam and air to pass through it. The enclosure device 896 is fixedly or rigidly connected to the moving member 892*b* of the linear actuator 892 by a connector 815 and the base component 892*a* of the linear actuator 892 is fixedly or rigidly connected to the support component 893. Thus, the linear actuator 892 can produce a vertical linear motion of the enclosure device 896 relative to the support component 893 between two end-positions.

It should be noted that the paraboloidal surface 897 may be substituted by another type of curved surface or a flat surface.

Figure 21C:
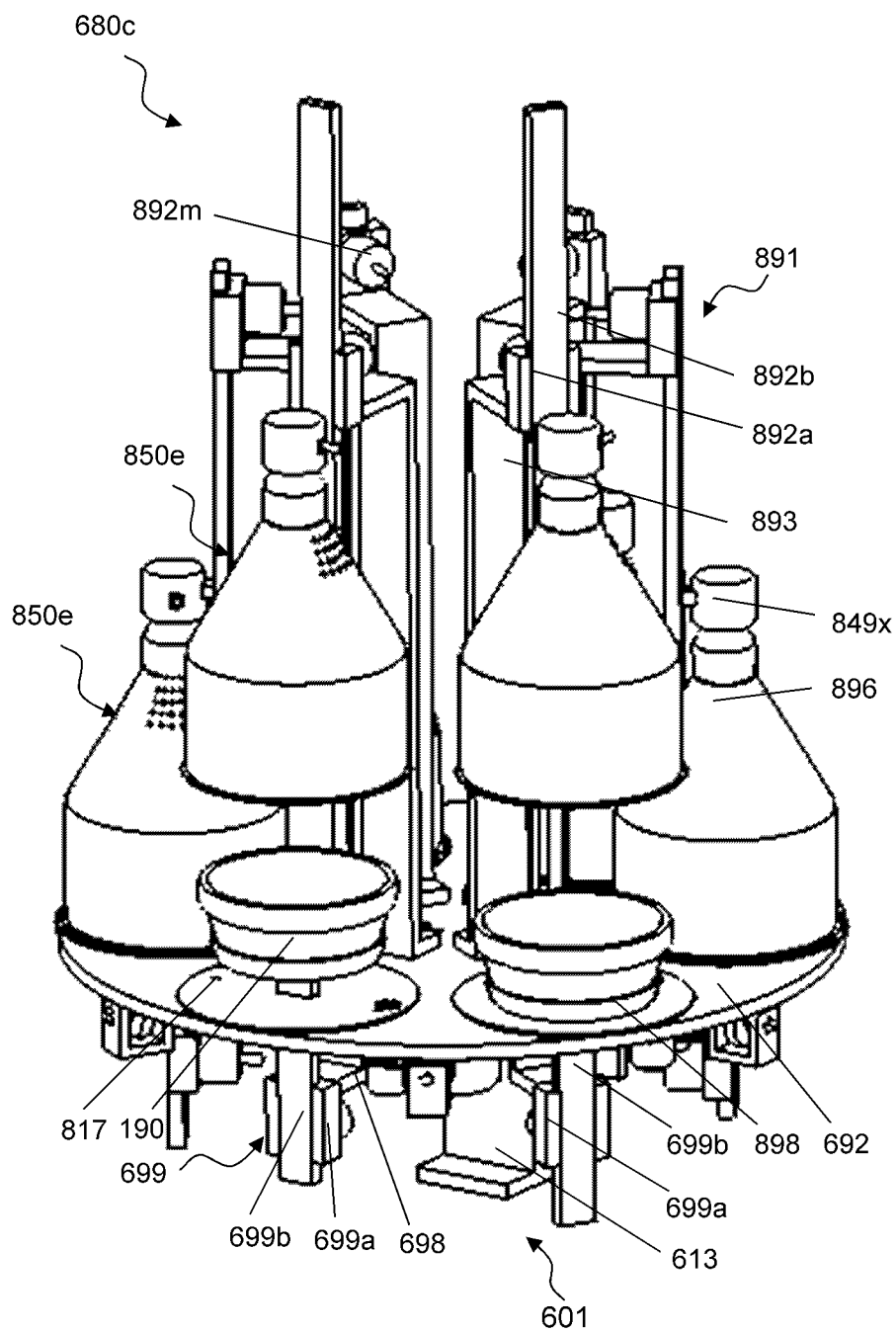
FIG. 21C shows an aerial view of a cooking apparatus comprising a plurality of enclosure mechanisms of FIG. 21A.
Figure 21D:
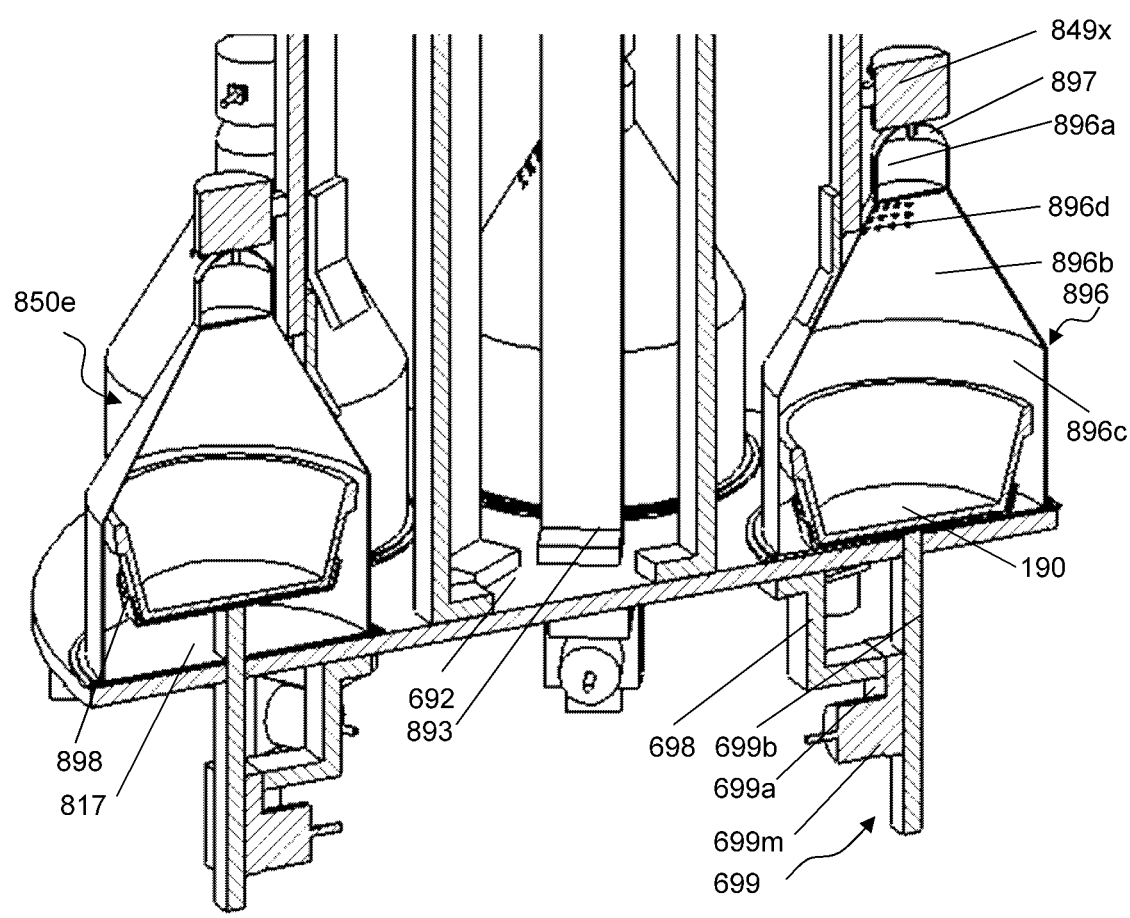
FIG. 21D shows a cutaway view of parts of the cooking apparatus.
Figure 21E:
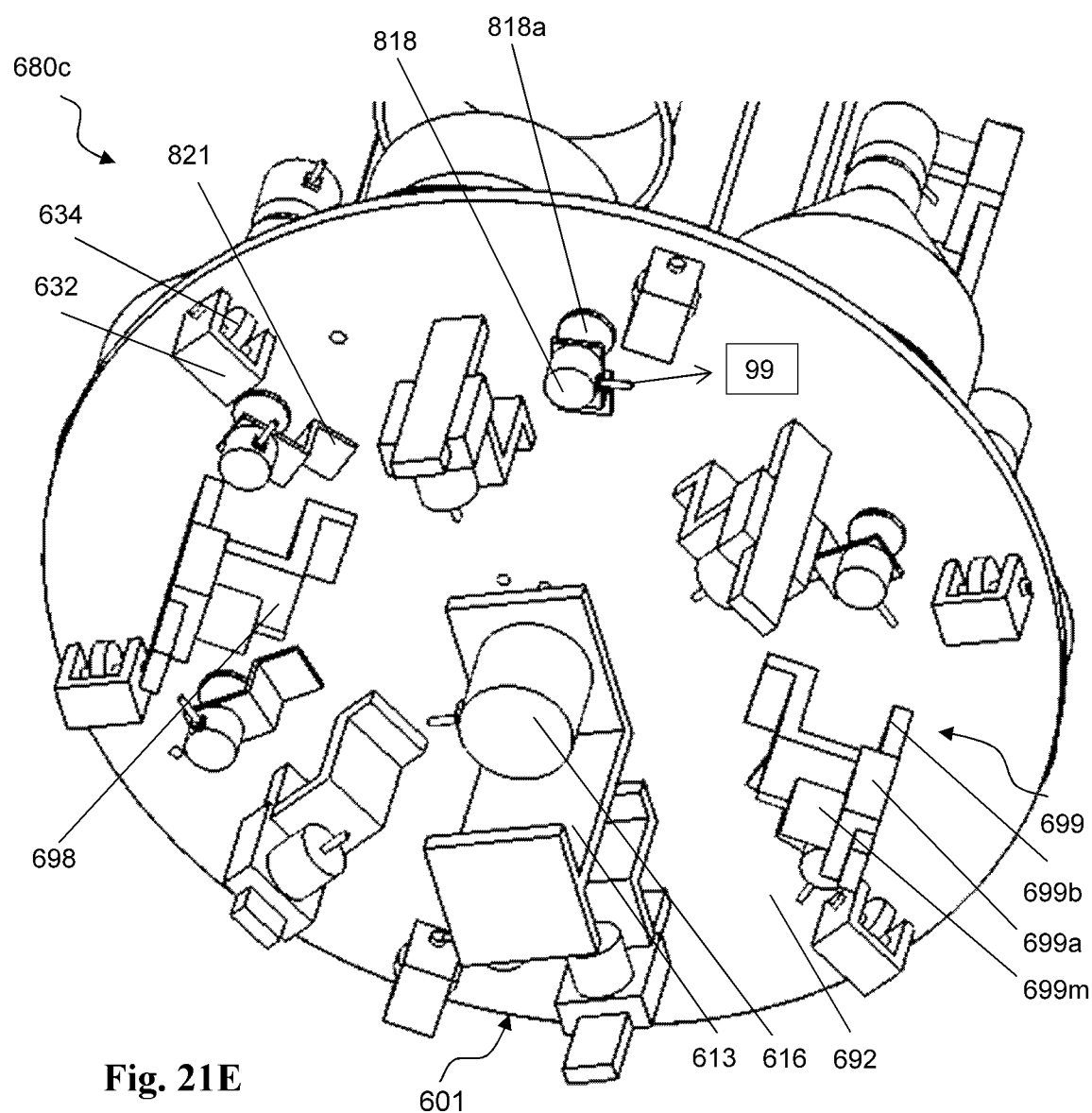
FIG. 21E shows an aerial view of parts of the cooking apparatus.

Referring to FIGS. 21C-21E, a cooking apparatus 680*c* comprises: a rotatable component 692; and a rotational motion mechanism 601 (as in FIG. 17A). The shaft 611 of the rotational motion mechanism 601 is fixedly connected to the rotatable component 692 so that the rotational motion mechanism 601 may produce a rotational motion of the rotatable component 692 around the axis of the shaft 611 wherein the axis of the shaft 611 is vertical. The rotatable component 692 may comprise a turntable but this is not a requirement.

A plurality of wheels 634 are mounted on a plurality of support components 632, which are rigidly or fixedly connected to the support component 836; and the support component 836 is optionally rigidly or fixedly connected to the floor of the building or the ground (the connection is not shown in figures but is easy to construct). The wheels 634 are used to touch and provide support to the rotatable component 692.

The cooking apparatus 680*c* comprises a plurality of microwave ovens 850*e* which are mounted on the rotatable component 692. Each microwave oven 850*e* comprises: a first enclosure component 817; and an enclosure mechanism 891 (as in FIG. 21A) wherein the support component 893 of the enclosure mechanism 891 is fixedly connected to the rotatable component 692. The first enclosure component 817 is rigidly or fixedly connected to the rotatable component 692. In the microwave oven 850*e*, the linear actuator 892 of the enclosure mechanism 891 can produce a vertical motion of the enclosure device 896 between two end-positions: a first end-position which is lower; and a second end-position which is higher. When the enclosure device 896 is moved to the lower position (i.e., the first end-position), the enclosure device 896 is configured to touch on the first enclosure component 817. The enclosure device 896 and the first enclosure component 817 are configured to enclose a cooking chamber. When the enclosure device 896 is moved to the higher position (the second end-position), the cooking chamber is opened.

The microwave oven 850*e* further comprises a linear actuator 699. The linear actuator 699 comprises: a base component 699*a* referred to as a stationary member; a moving member 699*b* which is constrained to move vertically relative to the base component 699*a* between two end-positions; and a motor 699*m* configured to drive a motion of the moving member relative to the stationary member. The base component 699*a* is fixedly connected to the rotatable component 692 via a connector 698. A container holder 898 is fixedly connected to (the top end of) the moving member 699*b* (see FIG. 21D) and is located inside the cooking chamber. The container holder 898 is configured to position or otherwise hold a cooking container 190 so that the movement of the cooking container 190 relative to the moving member 699*b* may be restricted or limited. The linear actuator 699 is configured to produce a vertical movement in the corresponding container holder 898 and the cooking container 190. The motor 699*m* is connected to the computer system 99 of FIG. 1 by wires or by wireless means and the computer system 99 may control timings and speeds of its produced motion.

The microwave oven 850*e* further comprises a microwave generator 849*x* fixedly connected to the moving member 892*b*. Microwaves produced by the corresponding magnetron 842 of the microwave generator 849*x* can heat the food or food ingredient in the corresponding cooking container in the cooking chamber and during this period of time, the linear actuator 699 can produce a motion in the container holder 898 so that the food or food ingredient(s) in a cooking container 190 can be evenly exposed to the electromagnetic waves. When the enclosure device 896 is moved to the higher position (the second end-position), the enclosure device 896 is away from the cooking container 190 so that a cooking container 190 can be moved to or from the container holder 898.

An air pump 818 is fixedly connected to the rotatable component 692 via a connector 821, and a pipe connector 818*a* is fixedly connected to the outlet of the air pump 818. The other end of the pipe connector 818*a* is joined with the exterior side of the first enclosure component 817 and the pump 818 is configured to pump air into a corresponding cooking chamber, wherein the first enclosure component 817 comprises holes to let air flow through. Air in the cooking chamber can escape to the outside through the holes 896*d* of the enclosure device 896.

It should be noted that the support component 613 of the rotational motion mechanism 601 is referred to the base support component of the cooking apparatus 680*c*.

Figure 22:
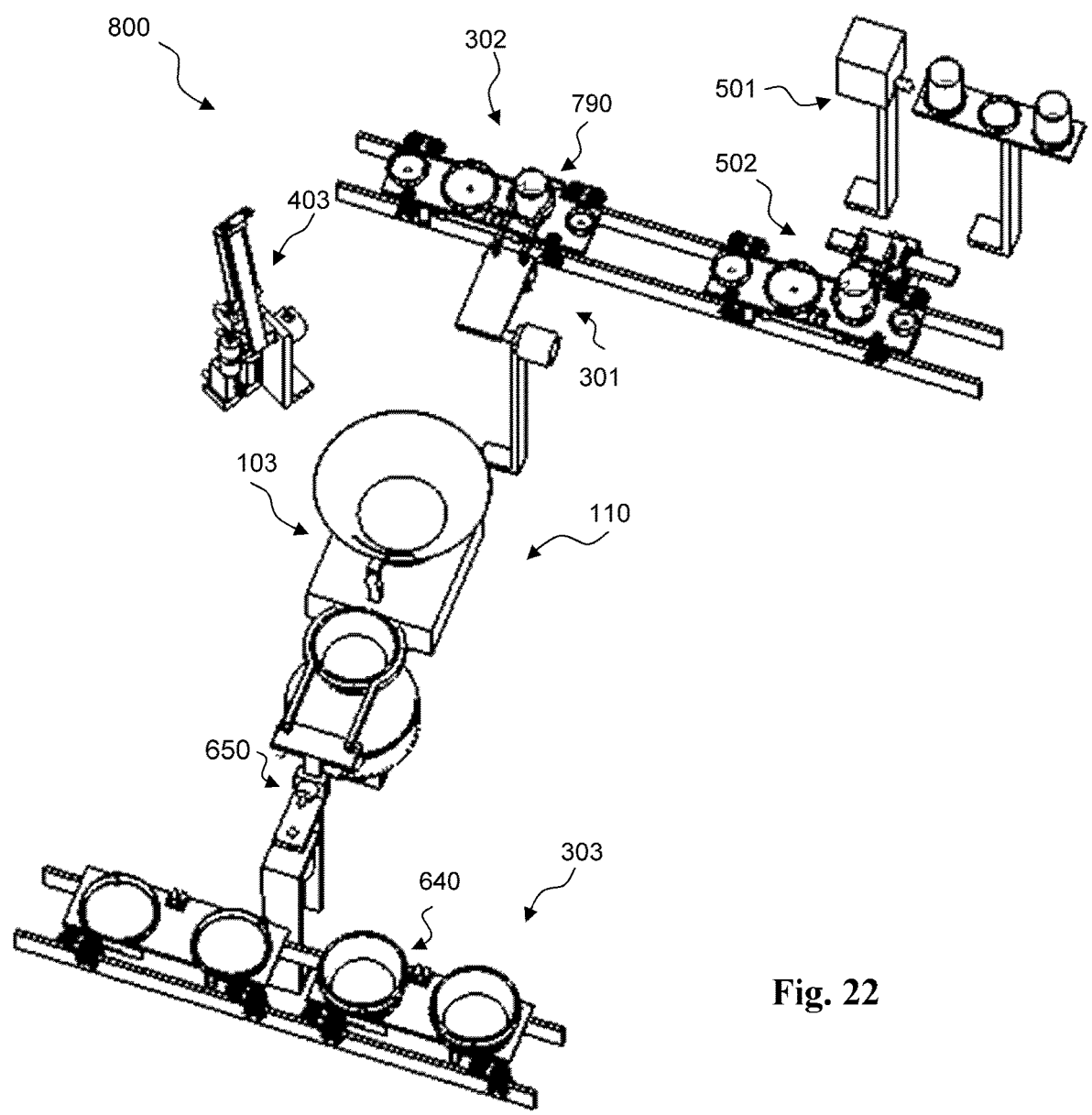
FIG. 22 shows an aerial view of a cooking sub-system.
Figure 23:
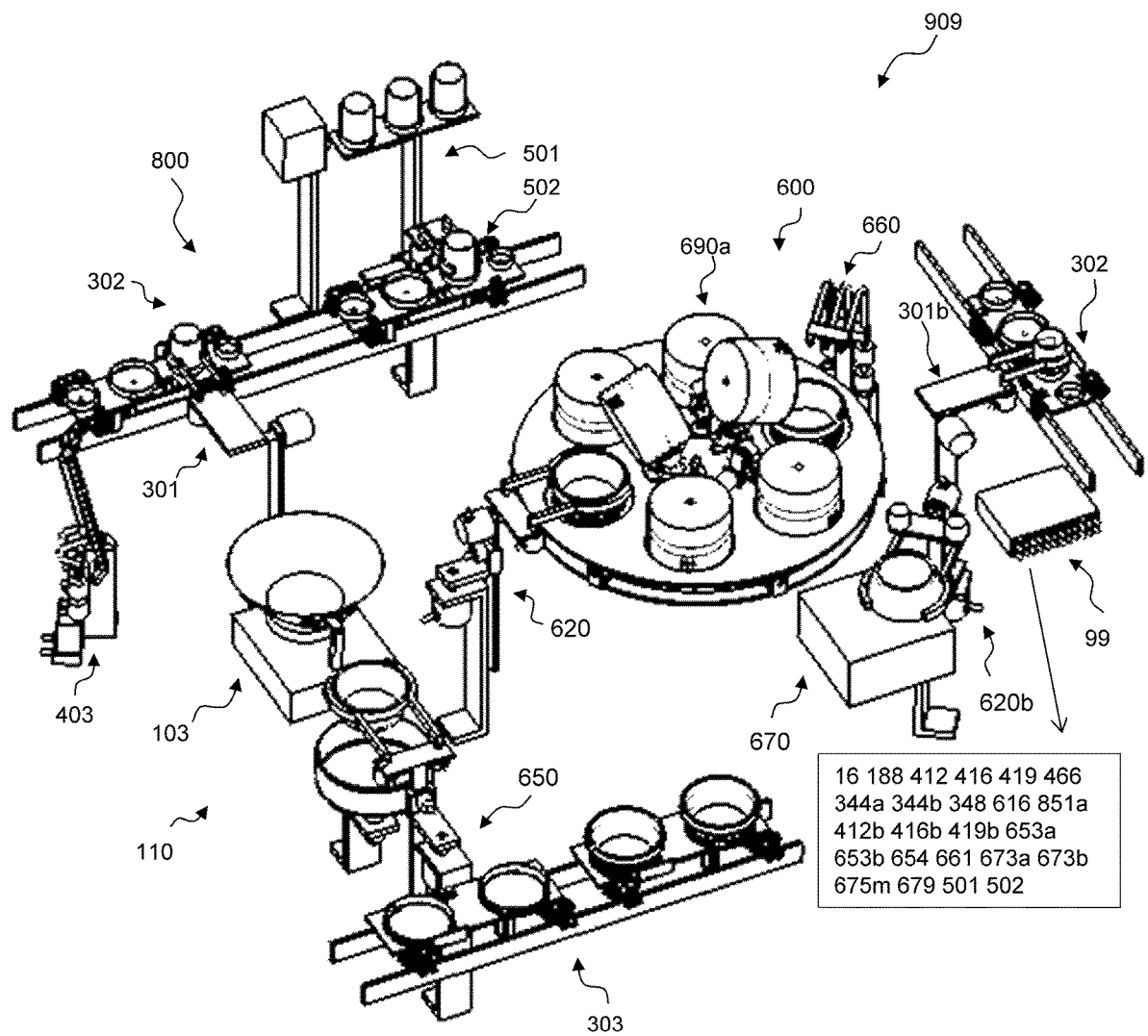
FIG. 23 shows an aerial view of a cooking system comprising the cooking sub-system of FIG. 22.
Figure 24A:
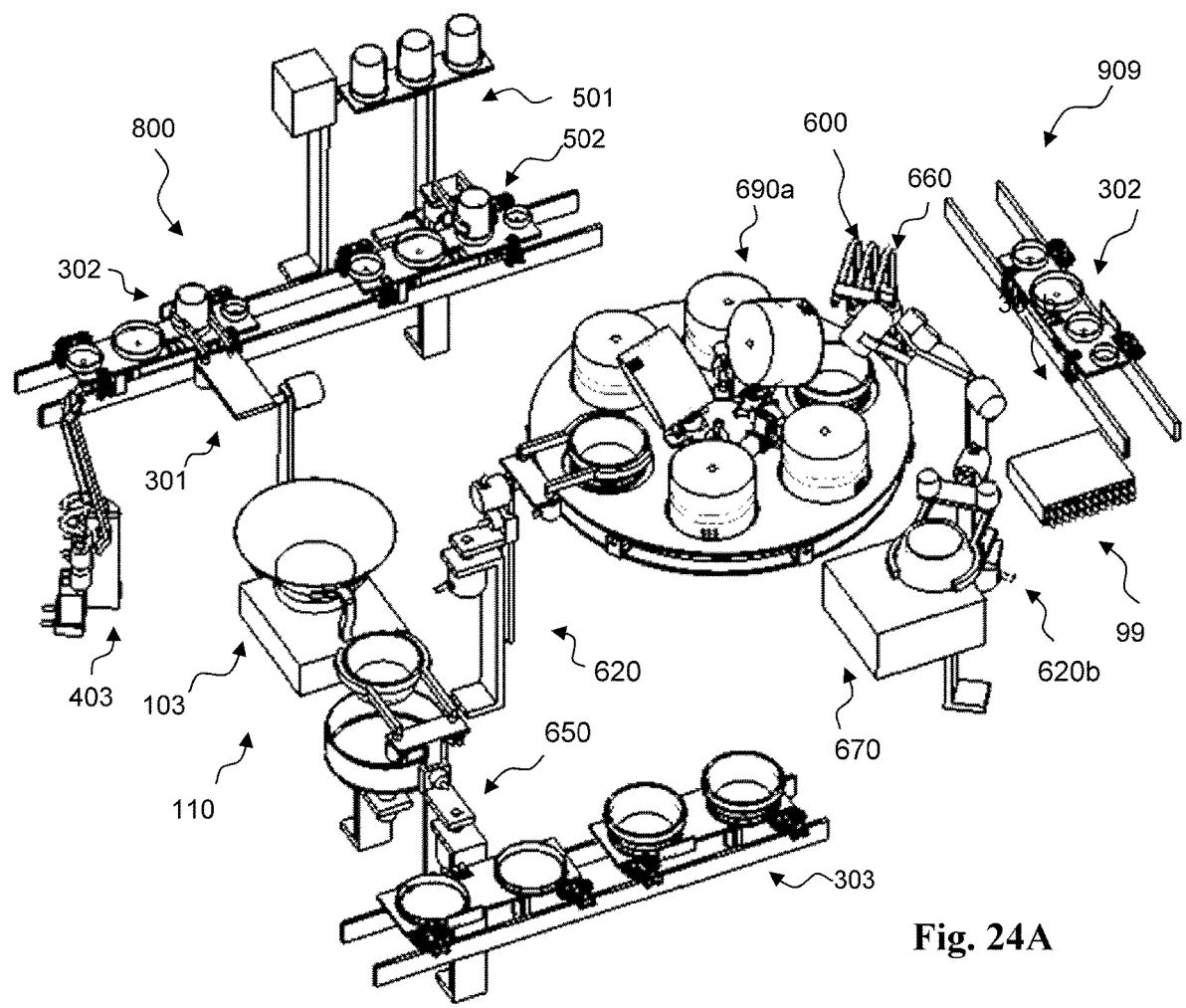
FIG. 24A shows an aerial view of the cooking system showing the dispensing of a food or a food ingredient from an ingredient container into a food container.
Figure 24B:
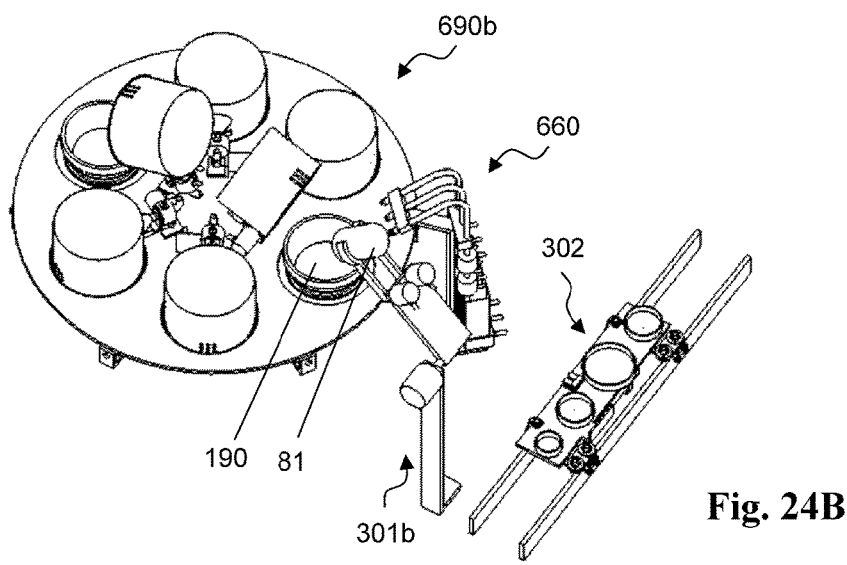
FIG. 24B shows a close-up view of the dispensing.
Figure 25A:
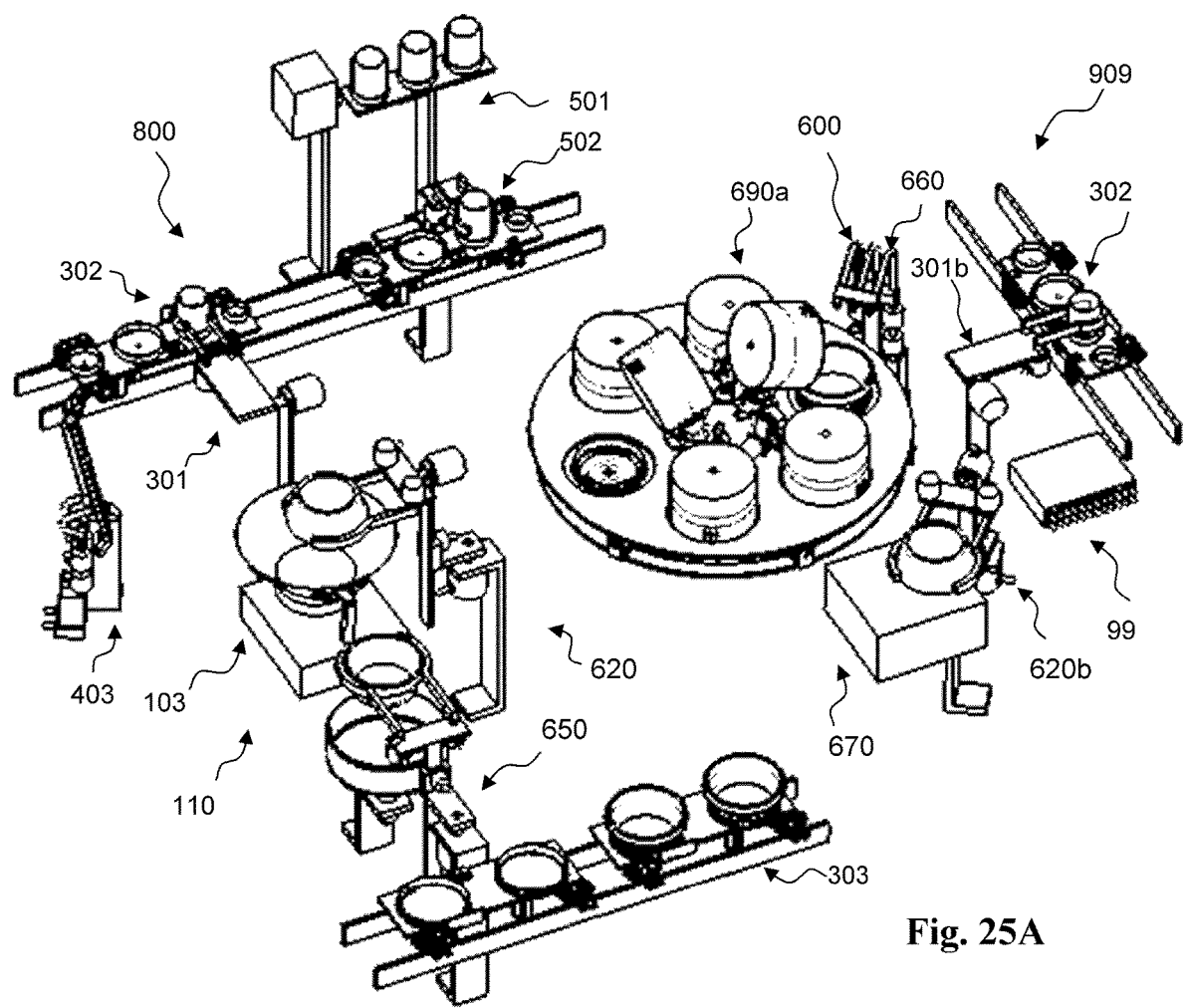
FIG. 25A shows an aerial view of the cooking system showing the dispensing of a semi-cooked food from a food container into a cookware.
Figure 25B:
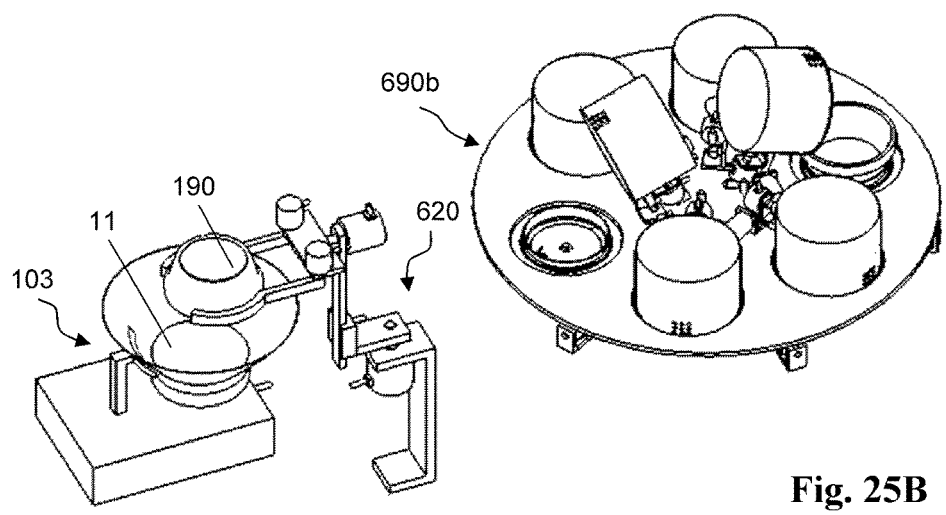
FIG. 25B shows a close-up view of the dispensing.
Figure 26:
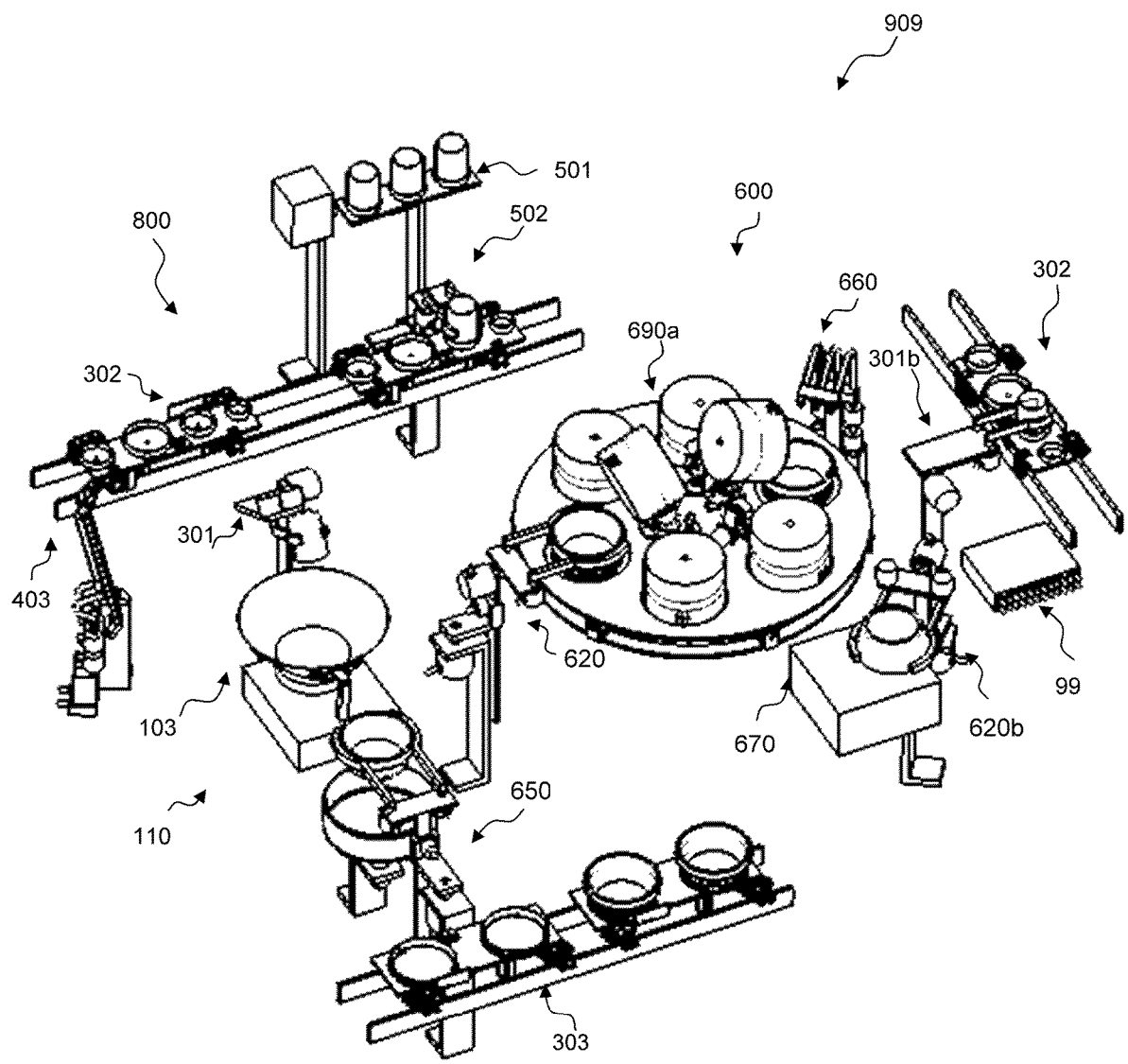
FIG. 26 shows an aerial view of the cooking system showing the dispensing of a food or a food ingredient from an ingredient container into the cookware.

In some embodiments, referring to FIG. 22, a cooking sub-system 800 comprises: a transport system 302 (as in FIG. 9A); a cooking apparatus 110 referred to as a second cooking apparatus (as in FIGS. 6B-6C); and a transport system 303 (as in FIG. 16B). The ingredient dispensing apparatus 301 of the cooking apparatus 110 is positioned next the cooking apparatus 103 of the cooking apparatus 110. The ingredient dispensing apparatus 301 can grip an ingredient container from a vehicle 790 of the transport system 302 and then dispense the food or food ingredient from the ingredient container into the cookware 11 of the cooking apparatus 103. The transfer apparatus 650 of the cooking apparatus 110 is positioned next to the cooking apparatus 103. The transfer apparatus 650 can grip a food container 182 from a vehicle 640 of the transport system 303 and move it to a receiving position relative to the support component of the cooking apparatus 103 to receive a cooked food from the cookware 11.

The cooking sub-system 800 further comprises: a liquid dispensing apparatus 403 (as in FIG. 7B); a transfer apparatus 502 (as in FIG. 12); and a storage 501 (as in FIG. 11) which may store a plurality of ingredient containers 81, wherein the ingredient containers 81 may contain or otherwise hold a food or a food ingredient. The liquid dispensing apparatus 403 is positioned next to the cooking apparatus 103 and can dispense liquid ingredients into the cookware 11. The transfer apparatus 502 may load an ingredient container 81 (which contains or otherwise holds a food or a food ingredient) from the storage 501 to a vehicle 790 of the transport system 302. The vehicle 790 may move the ingredient container to a location next to the cooking apparatus 103 to be gripped and held by the ingredient dispensing apparatus 301.

The cooking sub-system 800 may cook and transfer food or food ingredient(s) as follows. The transfer apparatus 502 loads one or more ingredient containers 81 (which contain or otherwise hold a food or a food ingredient) from the storage 501 to a vehicle 790 of the transport system 302. Then, the vehicle 790 can transport the (one or more) ingredient containers to a location next to the cooking apparatus 103 so that the ingredient containers may be successively gripped and moved by the ingredient dispensing apparatus 301 to dispense the food or food ingredient from the ingredient containers to the cookware 11 of the cooking apparatus 103, when the cookware 11 is already rotated to the upright position (or first end-position). The liquid dispensing apparatus 403 may dispense liquid ingredients into the cookware 11. As we will see below, another cooking apparatus may be used to produce a semi-cooked food and the semi-cooked food may be dispensed into the cookware 11 as well. Then, a cooked food is produced in the cookware 11 from the dispensed food or food ingredient(s), the dispensed liquid ingredients and the semi-cooked food. The cooked food in the cookware can be dispensed into a food container 182, which is gripped by the transfer apparatus 650. The transfer apparatus 650 can then load the food container 182 to a vehicle 640 (of the transport system 303) which is moved to a certain position relative to the support component 678 of the transfer apparatus 650. The vehicle 640 can transport the food container 182 to a location that is closer to customers.

It should be noted that the cooking sub-system 800 may further comprise a cleaning apparatus. The cookware 11 may be cleaned by the cleaning apparatus after the cooked food is dispensed. See U.S. patent application Ser. No. 17/069,707 for examples of the cleaning apparatus. The entire contents of the application are hereby incorporated herein. There are many known cleaning apparatuses that can be used for the function of the cleaning apparatus.

In some embodiments, referring to FIGS. 23-26, a cooking system 909 comprises: a cooking sub-system 800 (as in FIG. 22); and a cooking apparatus 600. The cooking apparatus 600 comprises: a cooking apparatus 690*a* (as in FIG. 17G) referred to as a first cooking apparatus; a food dispensing apparatus 620 (as in FIG. 14); a liquid dispensing apparatus 660 (as in FIG. 15); and an ingredient dispensing apparatus 301*b*, wherein the ingredient dispensing apparatus 301*b* is a copy of the ingredient dispensing apparatus 301 but is positioned next to the cooking apparatus 690*a*. The part numbers in the mechanism 301*b* are the same as the corresponding parts of the mechanism 301. In the cooking apparatus 600, the ingredient dispensing apparatus 301*b* can grip and move an ingredient container from a vehicle 790 of the transport system 302 of the cooking sub-system 800 to dispense the food or food ingredient from the ingredient container into one of the cooking containers 190 of the cooking apparatus 690*a*, and the ingredient container is returned to the vehicle after the food or food ingredient are dispensed. The food dispensing apparatus 620 is positioned between the cooking apparatus 103 of the cooking sub-system 800 and the cooking apparatus 690*a* to grip and move a cooking container 190 which is positioned or otherwise held by a container holder 898 (of the cooking apparatus 690*a*) to dispense semi-cooked food from the cooking container 190 into the cookware 11 of the cooking apparatus 103. The liquid dispensing apparatus 660 is positioned next to the cooking apparatus 690*a* to dispense liquid ingredients into a cooking container 190 of the cooking apparatus 690*a*.

The cooking system 909 further comprises: a container moving apparatus 620*b*; a food container cleaning mechanism 670 (described below); and a computer system 99 (as in FIG. 1). The container moving apparatus 620*b* is a copy of the food dispensing apparatus 620 but is positioned next to the food container cleaning mechanism 670. The part numbers in the container moving apparatus 620*b* are the same as the corresponding parts of the food dispensing apparatus 620. The container moving apparatus 620*b* can grip and move a cooking container 190 from the cooking apparatus 690*a* and turn the container 190 (optionally by 180 degrees) to a certain cleaning position so that the cooking container 190 can get cleaned by the food container cleaning mechanism 670. Then the cleaned cooking container 190 can be moved back to the rotatable component 845 of the cooking apparatus 690*a*.

In the cooking system 909, when the rotatable component 845 of the cooking apparatus 690a is rotated by the rotational motion mechanism 601 to a certain position, one or more of the following processes may be completed: (1) a motion mechanism 855a rotates the corresponding enclosure device 843 to the second end-position so that the ingredient dispensing apparatus 301b may move an ingredient container to dispense the food or food ingredient from the ingredient container into a cooking container 190 which is held by the container holder 898 corresponding to the motion mechanism 855a; (2) the motion mechanism 855a rotates the enclosure device 843 to the first end-position so that the food or food ingredient in the cooking container 190 is heated by the corresponding magnetron 842; (3) the motion mechanism 855a rotates the enclosure device 843 to the second end-position so that the food dispensing apparatus 620 can dispense a semi-cooked food from the cooking container 190 to the cookware 11 of the cooking apparatus 103 and then the food dispensing apparatus moves the cooking container 190 to the holder on the rotatable component 845; and (4) the rotatable component 845 is rotated to a position so that the container moving apparatus 620b can move the cooking container 190 to the food container cleaning mechanism 670 to get cleaned and then returned to the holder on the rotatable component 845.

The cooking system 909 may cook a food by applying the same steps as the cooking sub-system 800 except that a semi-cooked food produced by the cooking apparatus 600 can be dispensed into the cookware 11 wherein the semi-cooked food may be used as an ingredient for the cooking apparatus 103.

The computer system 99 is connected to the mechanisms and devices 16; 412; 416; 419; 466; 344a; 344b; 348; 616; 851a; 412b; 416b; 419b; 653a; 653b; 654; 661; 673a; 673b; 675m; 679; 501; and 502. The computer system 99 is also connected to the transport systems 302 and 303 to control the movements of the vehicles of the transport systems 302 and 303.

As shown in FIG. 27, the following tasks are performed by the computer system 99 prior to the operation of the cooking system 909.

In Step 961, the computer system 99 stores (in the computer system's memory) a program, configured to send or receive signals to and from the motors, actuators, inductive stoves, and pumps of the cooking system 909.

In Step 962, a database is installed in the computer system 99.

In Step 963, each of the cooking apparatuses, liquid dispensing apparatus, ingredient dispensing apparatuses, cookware cleaning mechanism, food container cleaning mechanism, food dispensing apparatus, transfer apparatus, transport system is assigned a unique ID. The computer system 99 stores the IDs of these apparatuses and mechanisms.

In Step 964, the computer system 99 stores the information of the structure of each vehicle of the transport system 302, including the ingredient container types that can be placed on the holders of the vehicle 790.

In Step 965, the computer system 99 stores a program for controlling the transport systems 302 and 303. The program may be used to control a vehicle 790 of the transport system 302 so that the vehicle 790 may move and stop at a pre-scheduled time at a position near one of the cooking apparatuses of the cooking system 909, where an ingredient container on a given holder of the vehicle 790 is at a dispensing position relative to the cooking apparatus. The program may be used to control a vehicle 640 of the transport system 303 so that the vehicle 640 may move and stop at a pre-scheduled time at a position near a transfer apparatus of the cooking system 909, where the container holders of the vehicle 640 are at a transferring position near the transfer apparatus.

In Step 966, the computer system 99 stores a list of food items which may be cooked by the cooking system 909.

In Step 967, for each food item in the list of Step 966, the computer system 99 stores a cooking program configured to control the motors, actuators, inductive stoves, pumps and devices in the cooking system 909.

In Step 968, for each food item in the list of Step 966, the computer system 99 stores types and quantities of the foods or food ingredients, relative timing of their dispensing and the respective ID of the destination cooking apparatus for each ingredient to be dispensed into; wherein the relative timing refers to the timing relative to the timing of the program of Step 967 corresponding to the food item. The food or food ingredient contained in an ingredient container is to be dispensed into a cookware or a cooking container.

Referring to FIG. 28, the following tasks are routinely performed by the computer system 99 during the operation of the cooking system 909.

In Step 971, the computer system 99 takes an order of a food item. The order may be placed by a human either at the computer system 99, or at a computer which sends the order to the computer system 99.

In Step 972, for the ordered food item of Step 971, the computer system 99 finds the information on the types and quantities of the ingredients needed for cooking the ordered food item. Such information was stored by the computer system 99 in Step 968.

In Step 973, the computer system 99 locates the ingredient containers that contain the food or food ingredient found in Step 972. The food or food ingredient may be dispensed from some larger containers into the ingredient containers. Alternatively, the food or food ingredient may already be in the ingredient containers, and their locations already stored in the memories of the computer system 99.

In Step 974, the computer system 99 schedules the cooking of the ordered food item by the cooking system 909. The schedule includes the timing for running the program of Step 967 corresponding to the ordered food item. The schedule also includes the timing of dispensing of the food or food ingredient from each ingredient container into a respective cooking container or a cookware of the cooking system 909, in accordance with the stored information by the computer system 99 in Step 968.

In Step 975, the computer system 99 controls the transport system 302 so that each ingredient container of Step 972 may be moved and stopped per the schedule of Step 974.

In Step 976, the computer system 99 runs the program of Step 967 corresponding to the ordered food item, according to the schedule of Step 974, to send or receive signals to or from the motors, actuators, inductive stoves, temperature sensors and pumps of the cooking system 909.

After all these steps, the cooking of the food item, including dispensing of the cooked food to a food container, is complete.

It should be noted that in the cooking system 909, the cooking apparatus 690a may be substituted by the cooking apparatus 690b, 680a, 680b or 680c.

Figure 29A:
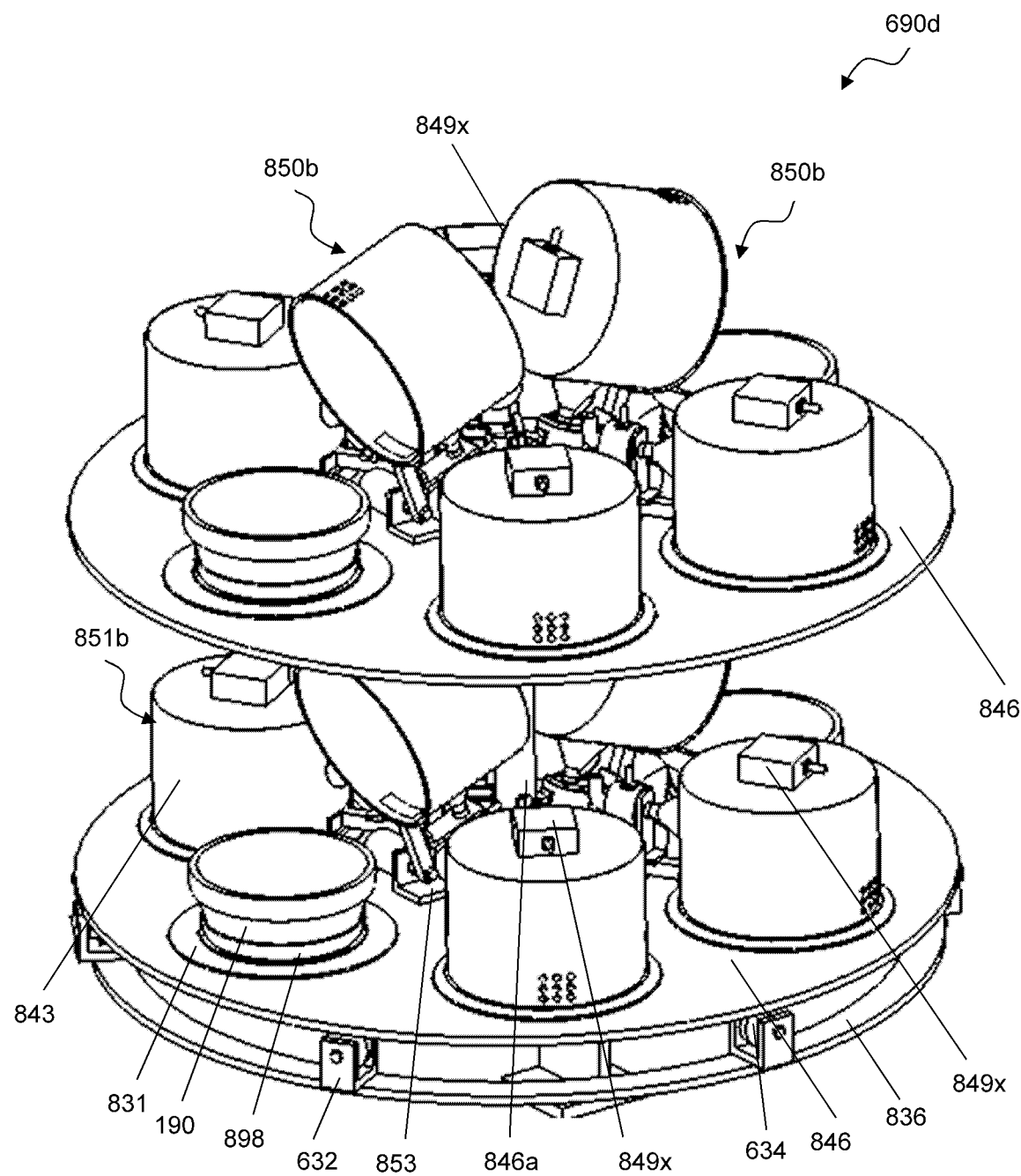
FIGS. 29A-29B show aerial views of a cooking apparatus.
Figure 29B:
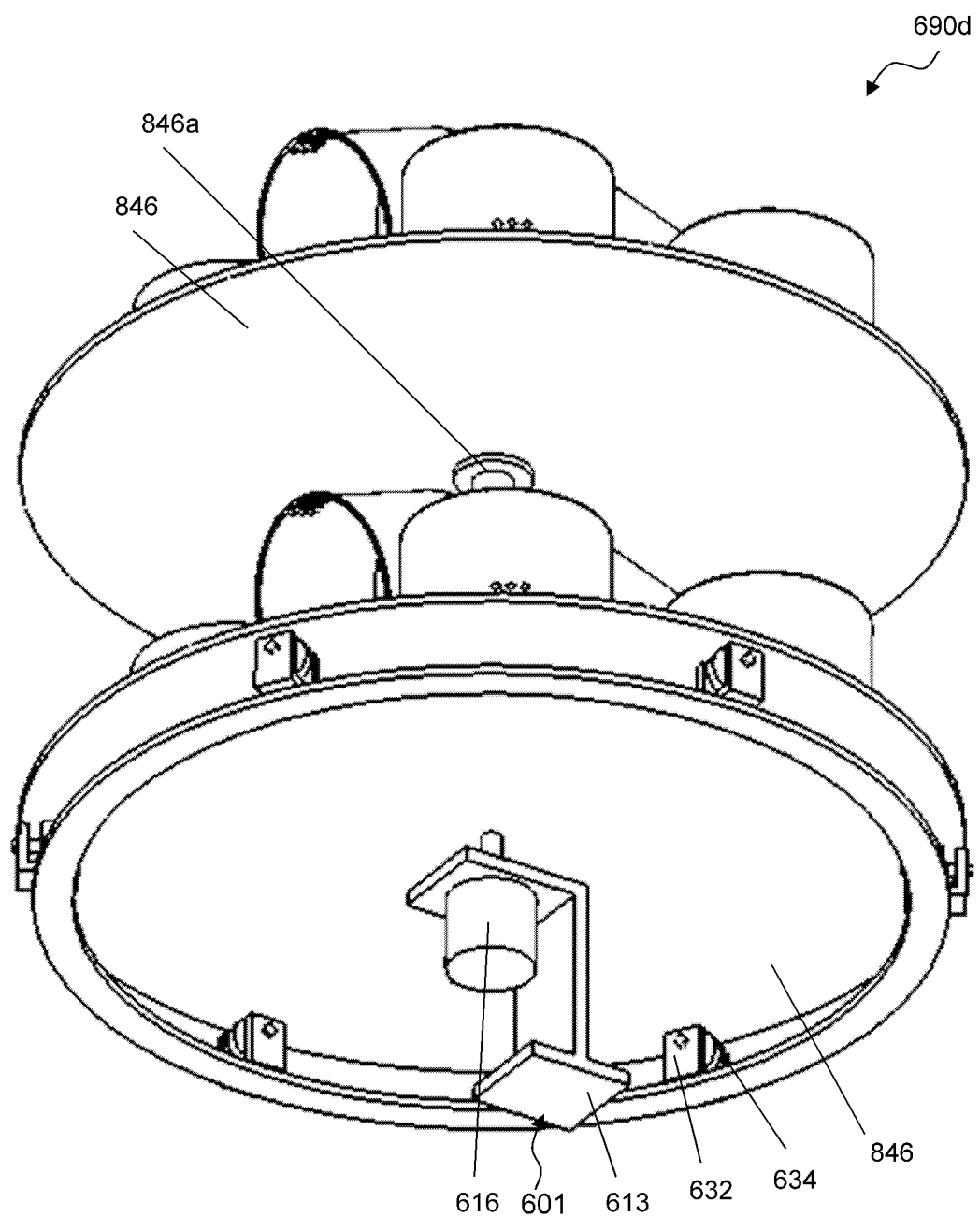

Referring to FIGS. 29A-29B, a cooking apparatus 690d comprises: a plurality of rotatable components 846 which are respectively positioned at different levels (the figures show two rotatable components 846 but there can be more in some applications), wherein the rotatable components 846 are fixedly or rigidly connected via connectors 846a; and a rotational motion mechanism 601 (as in FIG. 17A). The rotatable components 846 are directly or indirectly fixedly connected to the shaft 611 of the rotational motion mechanism 601, so that the rotational motion mechanism 601 may produce a rotation of the rotatable components 846 around the axis of the shaft 611 wherein the axis of the shaft 611 is vertical. The rotatable components 846 may comprise a turntable but this is not a requirement.

A plurality of wheels 634 are mounted on a plurality of support components 632 which are rigidly or fixedly connected to the support component 836; and the support component 836 is optionally rigidly or fixedly connected to the floor of the building or the ground (the connection is not shown in figures but is easy to construct). The wheels 634 are used to touch and provide support to the lowest one of the rotatable components 846.

The cooking apparatus 690d further comprises a plurality of microwave ovens 850b each of which is mounted on one of the rotatable components 846 wherein each individual microwave oven is described as in FIGS. 18C-18D. The microwave ovens 850b which are mounted on a same rotatable component 846 may optionally be cyclically and symmetrically positioned around the axis of the shaft 611. A container holder 898 is fixedly connected to a first enclosure component 831 of a microwave oven 850b and is located inside a corresponding cooking chamber. The container holder 898 is configured to hold a cooking container 190 in the cooking chamber so that the movement of the cooking container 190 relative to the rotatable component 846 may be restricted or limited when the rotatable component 846 is moved.

As explained earlier, the electromagnetic waves produced by the magnetron 842 of the microwave generator 849x of the microwave oven 850b, can pass through (with help of the stirrer 899) the interior of the waveguide 824 and then transfer into the cooking chamber enclosed by the enclosure device 843 of the microwave ovens 850b and the first enclosure component 831 of the microwave ovens 850b. The electromagnetic waves in the cooking chamber can heat the food or food ingredient contained in a cooking container 190 positioned inside the cooking chamber.

In some applications, some microwave ovens can be bigger than the others. It is also possible that some microwave ovens are substituted by other ovens. It is not a requirement that the number of microwaves mounted on each rotatable component 846 is the same for all.

Figure 30:
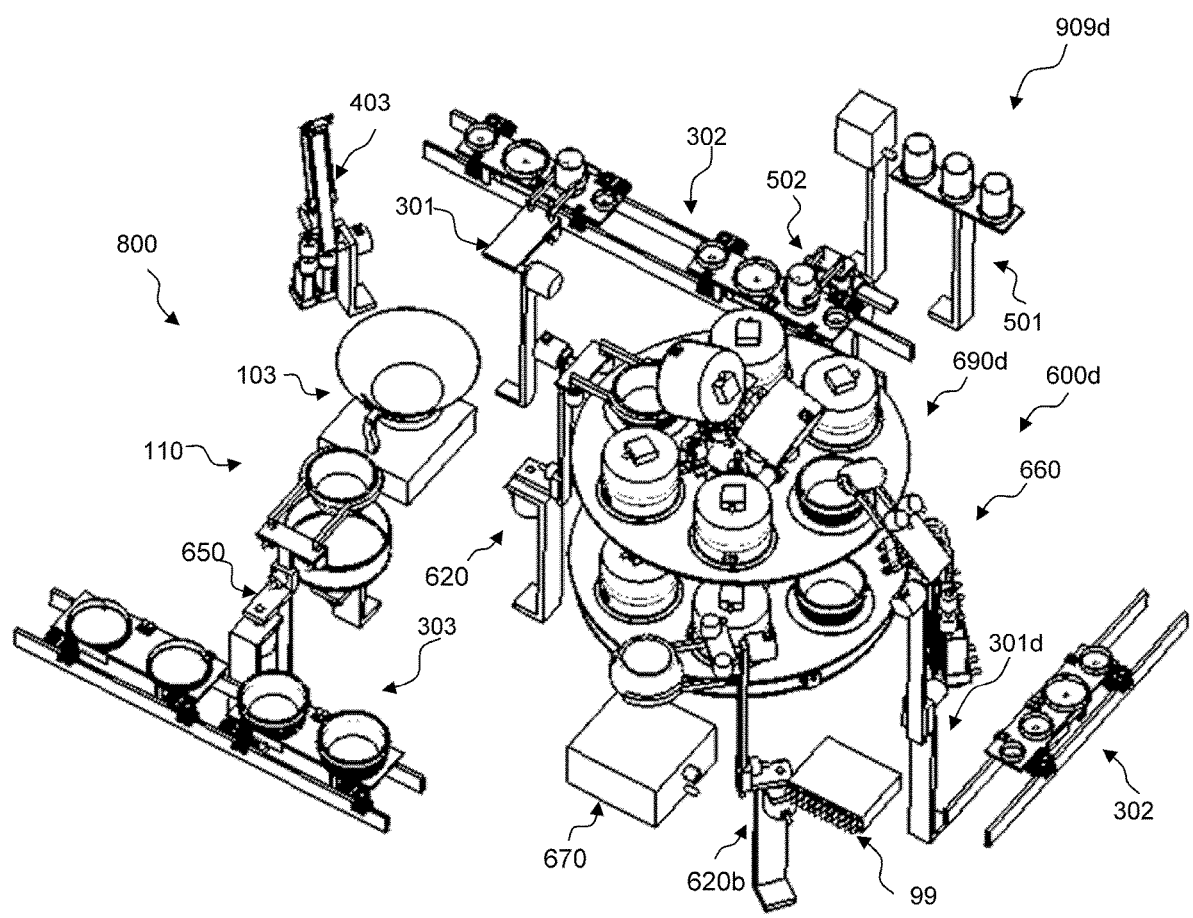
FIG. 30 shows an aerial view of a cooking system comprising the cooking apparatus of FIGS. 29A-29B.

In some embodiments, referring to FIG. 30, a cooking system 909d comprises: a cooking sub-system 800 (as in FIG. 22); and a cooking apparatus 600d (explained below). The cooking apparatus 600d comprises: a cooking apparatus 690d (as in FIGS. 29A-29B) referred to as a first cooking apparatus; a food dispensing apparatus 620 (as in FIG. 14); a liquid dispensing apparatus 660 (as in FIG. 15); and an ingredient dispensing apparatus 301d (as in FIG. 6D). The ingredient dispensing apparatus 301d is positioned next the cooking apparatus 690d. The ingredient dispensing apparatus 301d can grip and move an ingredient container from a vehicle 790 of the transport system 302 of the cooking sub-system 800 to dispense the food or food ingredient from the ingredient container into one of the cooking containers 190 of the cooking apparatus 690d, and the ingredient container is returned to the vehicle after the food or food ingredient are dispensed. The food dispensing apparatus 620 is positioned between the cooking apparatus 103 of the cooking sub-system 800 and the cooking apparatus 690d to grip and move a cooking container 190 which is positioned or otherwise held by a container holder 898 (of the cooking apparatus 690d) to dispense semi-cooked food from the cooking container 190 into the cookware 11 of the cooking apparatus 103. The liquid dispensing apparatus 660 is positioned next to the cooking apparatus 690d to dispense liquid ingredients into a cooking container 190 of the cooking apparatus 690d.

The cooking system 909d further comprises: a container moving apparatus 620b; a food container cleaning mechanism 670 (described below); and a computer system 99 (as in FIG. 1). The container moving apparatus 620b is a copy of the food dispensing apparatus 620 but is positioned next to the food container cleaning mechanism 670. The part numbers in the container moving apparatus 620b are the same as the corresponding parts of the food dispensing apparatus 620. The container moving apparatus 620b can grip and move a cooking container 190 from the cooking apparatus 690d and turn the cooking container 190 (optionally by 180 degrees) to a certain cleaning position so that the cooking container 190 can get cleaned by the food container cleaning mechanism 670. Then the cleaned cooking container 190 can be moved back to the rotatable component 846 of the cooking apparatus 690d.

In the cooking system 909d, when the rotatable components 846 of the cooking apparatus 690d is rotated by the rotational motion mechanism 601 to a certain position, one or more of the following processes may be completed: (1) a motion mechanism 855b rotates a corresponding enclosure device 843 to the second end-position so that the ingredient dispensing apparatus 301d may dispense the food or food ingredient into a cooking container 190 which is held by the container holder 898 corresponding to the enclosure device 843; (2) the motion mechanism 855b rotates the enclosure device 843 to the first end-position so that the food or food ingredient in the cooking container 190 can be heated by the corresponding magnetron 842; (3) the motion mechanism 855b rotates the enclosure device 843 to the second end-position so that the food dispensing apparatus 620 can dispense a semi-cooked food from the cooking container 190 to the cookware 11 of the cooking apparatus 103 and then the food dispensing apparatus moves the cooking container 190 to the container holder 898 on the rotatable component 846; and (4) the rotatable component 846 is rotated to a position so that the container moving apparatus 620b can move the cooking container 190 to the food container cleaning mechanism 670 to get cleaned and then returned to the holder on the rotatable component 846.

The cooking system 909d may cook a food by applying the same steps as the cooking sub-system 800 except that a semi-cooked food produced by the cooking apparatus 600d can be dispensed into the cookware 11 wherein the semi-cooked food may be used as an ingredient for the cooking apparatus 103.

Figure 31A:
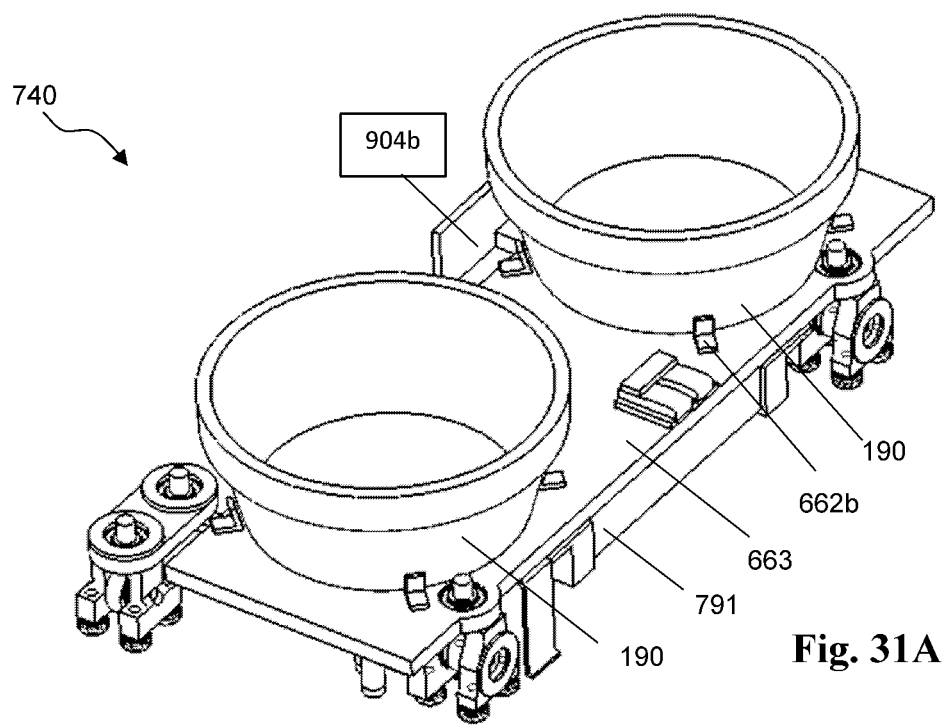
FIG. 31A shows an aerial view of a vehicle.

Referring to FIG. 31A, a vehicle 740 is the same as the vehicle 640 (as in FIG. 16A) except that the container holders 662 are substituted by container holders 662b. The other part numbers in the vehicle 740 are the same as the corresponding part numbers in the vehicle 640. The container holders 662b are configured to position or otherwise hold a cooking container 190 so that the movement of the cooking container 190 may be restricted or limited when the vehicle is moving. The computer 904b may control the operations of the electrical or electronic devices of the vehicle 740 by sending signals to the electrical or electronic device. The computer 904b may communicate with the computer system 99 via a wireless communication device.

Figure 31B:
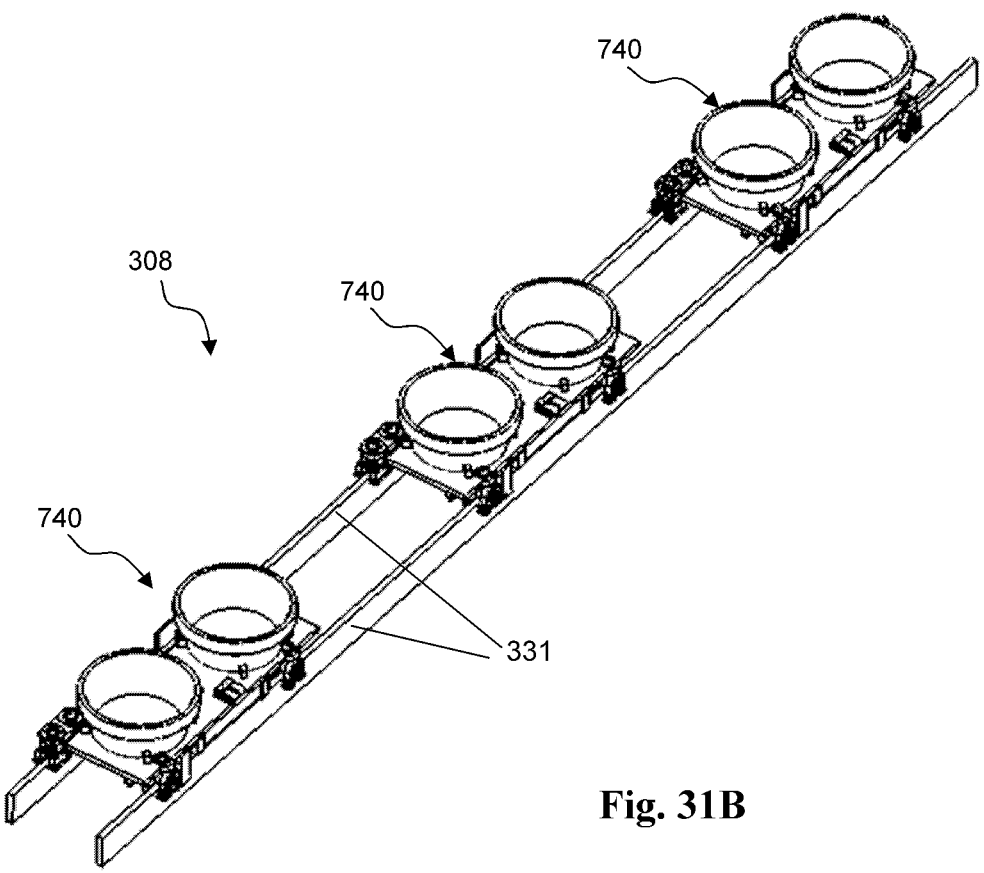
FIG. 31B shows an aerial view of a transport system comprising the vehicle of the FIG. 31A.

Referring to FIG. 31B, a transport system 308 further comprises a plurality of vehicles 740 and mini-rails 331. The vehicles 740 and the cooking containers 190 held by the container holders 662b on the vehicles 740 may move along the mini-rails 331. The transport system 308 can transfer cooking containers 190. The computer 904b is connected to the computer system 99 via wireless means, so that the computer system 99 may control the timing and speed of the vehicles 740.

It should be noted that the vehicles 740 may comprise additional components for the purpose of staying on the track.

Figure 32:
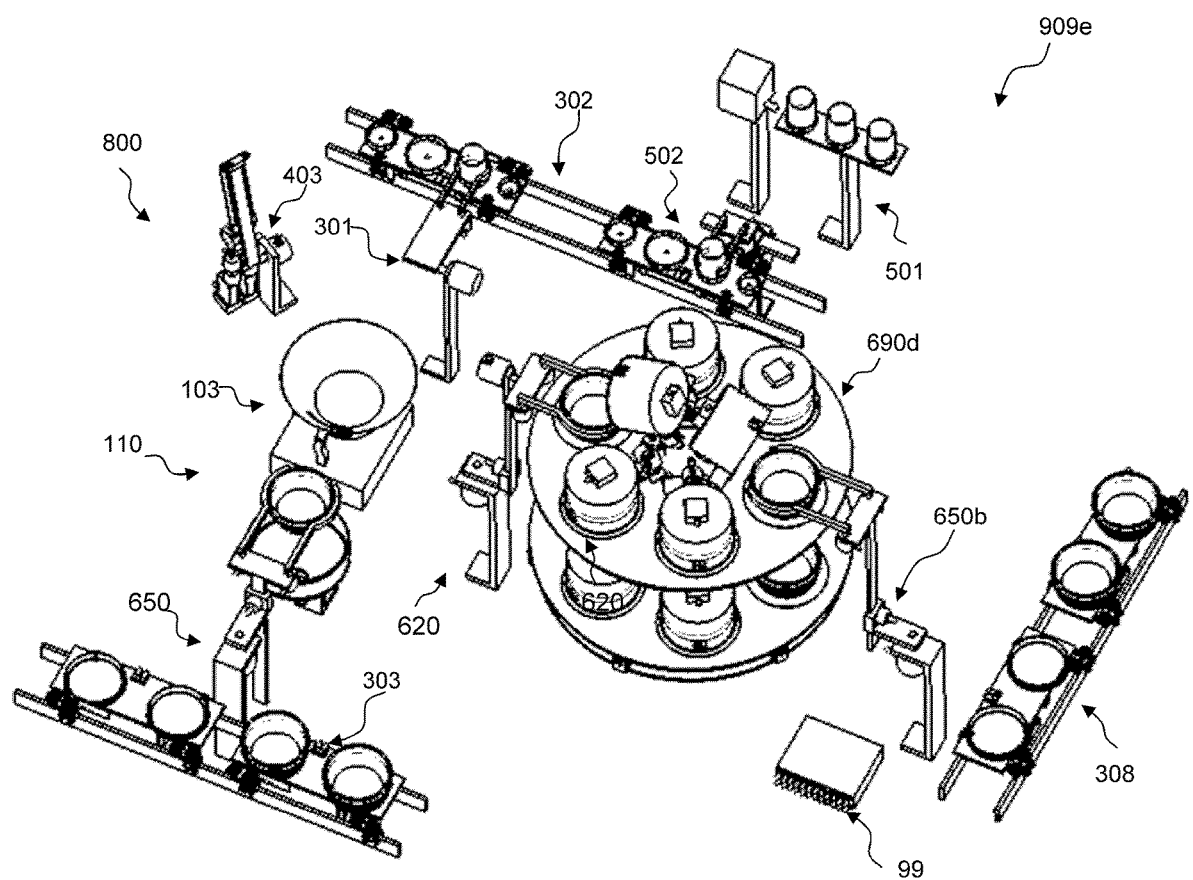
FIG. 32 shows an aerial view of a cooking system comprising the transport system of FIG. 31B.

In some embodiments, referring to FIG. 32, a cooking system 909e is similarly configured to the cooking system 909d. The cooking system 909e comprises: a cooking sub-system 800 (as in FIG. 22); a cooking apparatus 690d (as in FIGS. 29A-29B); a transport system 308 (as in FIG. 31B); a transfer apparatus 650b; and a computer system 99 (as in FIG. 1). The transfer apparatus 650b is a copy of the transfer apparatus 650 but is positioned between the cooking apparatus 690d and the transport system 308. The transfer apparatus 650b can grip a cooking container 190 (which contains or holds food or food ingredient(s)) from a vehicle 740 of the transport system 308 and move it to a container holder 898 of the cooking apparatus 690d. The food dispensing apparatus 620 is positioned between the cooking apparatus 103 and the cooking apparatus 690d. The food dispensing apparatus 620 can grip and move a cooking container 190 on one of the container holders 898 of the cooking apparatus 690d to dispense semi-cooked food from the cooking container 190 into the cookware 11 of the cooking apparatus 103. The computer system 99 is connected to the electric or electronic components of the apparatuses or mechanisms in the cooking system 909e so that the computer system 99 may communicate with and/or control the components by known techniques.

In the cooking system 909e, when the rotatable component 846 of the cooking apparatus 690d is rotated by the rotational motion mechanism 601 to a certain position, one or more of the following processes may be completed: (1) a motion mechanism 855b rotates a corresponding enclosure device 843 to the second end-position so that the transfer apparatus 650b can grip and move a cooking container 190 containing food or food ingredient(s) from a vehicle 740 of the transport system 308 to the corresponding container holder 898 of the cooking apparatus 690d; (2) the motion mechanism 855b rotates the enclosure device 843 to the first end-position so that the food or food ingredient in the cooking container 190 can be heated by the corresponding magnetron 842; (3) the rotatable component 846 is rotated to a position and the motion mechanism 855b rotates the enclosure device 843 to the second end-position so that the food dispensing apparatus 620 can dispense a semi-cooked food from the cooking container 190 to the cookware 11 of the cooking apparatus 103 and then the food dispensing apparatus moves the cooking container 190 to the container holder 898 on the rotatable component 846; and (4) the rotatable component 846 is rotated to a position so that the transfer apparatus 650b can grip and move the cooking container 190 to a container holder 662b of a vehicle 740.

The cooking system 909e may cook a food by applying the same steps as the cooking sub-system 800 except that a semi-cooked food produced by the cooking apparatus 690d can be dispensed into the cookware 11 wherein the semi-cooked food may be used as an ingredient for the cooking apparatus 103.

It should be noted that a first enclosure component (844, 831, or 817) and the corresponding enclosure device 843 (as the second enclosure component) in the above-described cooking systems may be substituted by other shapes of solids, as long as they are structured to enclose a cooking chamber. For example, the first enclosure component may be substituted by a solid 848 (in the shape of a cap facing upward) comprising a flat bottom and a cylindrical wall, and the second enclosure component 843 may be substituted by a solid 847 (also in the shape of a cap, facing downward) comprising a flat bottom and a cylindrical wall, which has a same radius as the cylindrical wall of the solid 848; see FIG. 17H. As another example, the first enclosure component may be substituted by a solid (in the shape of a cap, facing upward) comprising a flat bottom and a cylindrical wall (which is higher than the cylindrical wall in the solid 848), and the second enclosure component may be substituted by a flat or curved lid.

It should be noted that the transport systems 302, 303 and 308 in the above cooking systems may comprise a single system or a plurality of disconnected sub-systems. The transport system may comprise different types of vehicles. The ingredient containers may be configured differently for different types or quantities of ingredients. It should be noted that the transport systems 302, 303 and 308 may be combined into one transfer system.

It should be noted that the transport systems 302, 303 and 308 may be substituted by another transport system to move ingredient containers, e.g., a transport system comprising a cyclic motion mechanism, a turntable, a chain fixed to chair wheels, a robot arm, or a conveyor mechanism.

The transport system may be substituted by any transport system disclosed in U.S. patent application Ser. Nos. 16/517,705 and 16/997,933. The entire contents of the applications are incorporated herein by reference.

In the cooking systems, the ingredient dispensing apparatuses 301 and 301b may be configured differently. The container holders of the transport system 302 which are next to different ingredient dispensing apparatuses may be configured to have different sizes. The ingredient containers 81 on different holders may be configured to have different sizes. The transport system 302 may comprise two or more sub-systems which are not connected with each other, and the vehicles may be configured differently on different sub-systems.

The ingredient dispensing apparatuses 301 and 301b may be combined into one. The ingredient dispensing apparatuses may be substituted by mechanisms each comprising a robot arm.

It should be noted that the ingredient dispensing apparatuses 301, 301b and 301d, the food dispensing apparatus 620, and the container moving apparatus 620b may be substituted by another type of dispensing apparatus, such as the robotic apparatus 222 (of FIG. 4F), which is a combination of robot arm and robot fingers. Similarly, the motion mechanism 104 of the cooking apparatus 103 may be substituted by the robot arm 218 (of FIG. 2I) where the moving member 217b is fixedly connected to the cookware 11. The transfer apparatus 650 may be substituted by the robotic apparatus 222.

It should be noted that the microwave generator 849a or 849x may further comprise a capacitor, a transformer, and/or other electrical devices such as in a common microwave oven. A control device is configured to control the timing and power of a magnetron 842 and the timing and speed of a stirrer 899. The control devices are connected to the computer system 99 via wires or by wireless means, so that the computer system 99 may control the timing and power of the magnetrons 842 and the timing and speed of the stirrers 899.

It should be noted that each microwave generator 849*a* or 849*x* may be substituted by another type of generator of electromagnetic waves. Generators of electromagnetic waves may be constructed by known techniques.

It should be noted that the drawings in the present patent application are schematic and may not be well scaled. The distances between various mechanisms and apparatuses may not be drawn to scale. The 3-dimensional positioning of various mechanisms and apparatuses in a cooking system may be done in various other ways.

A motor may be an AC or DC motor, stepper motor, servo motor, inverter motor, pneumatic or hydraulic motor, etc. A motor may optionally further comprise a speed reducer, encoder, and/or proximity sensor.

A motor is said to drive a rotation of a shaft, if the rotation produced by the motor can induce the rotation of the shaft directly or indirectly via connection of shafts (e.g., by coupling), via mechanical transmission, and/or via other means.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

A rigid component described in the present patent application can be any type of solid component which has some degree of rigidity in an application, and there is no strict or quantitative requirement for the degree of rigidity. It should be noted that there is no perfect rigid component in our world, as there are always elastic, thermal, and other deformations in any physical object. A rigid component may comprise one or more of the following: a bar, a tube, a beam, a plate, a board, a frame, a structure, a bearing housing, a shaft. A rigid component can be made of metal such as steel or aluminum, or a mixture of metals, an alloy, a reasonably rigid plastic, wood, or other materials, or a combination of different types of materials.

Similarly, a rigid connection of two or more components can be a connection which has some degree of rigidity in an application, and there is no strict quantitative requirement for the degree of rigidity. A rigid connection may be a welding of two or more metal components. A rigid connection may be a bolting of two or more components; and so on. Clearly, a typical connection of a shaft and a bearing housing by a bearing (and accessories), for example, is not a rigid connection, since the shaft can rotate relative to the bearing housing.

Most common bearings are ball bearings and roller bearings. However, a bearing in the present patent application can be of any type.

A support component described in the present patent application can be any type of rigid component. A support component may be moved or fixed relative to the floor of the building or the ground.

Only a few examples and implementations are described. Other implementations, variations, modifications and enhancements to the described examples and implementations may be made without deviating from the spirit of the present invention. For example, the term cookware is used to generally refer to a device for containing or holding a food or food ingredient during cooking.

For the purpose of present patent application, a cookware can be a wok, a pot, a pan, a basket, a bowl, a dish, a container, a board, a rack, a net, a mesh, or any object used to contain or otherwise hold a food or a food ingredient during a cooking process. The cooking also is not limited to any particular ethnic styles. The cooking may include but is not limited to: frying (including stir frying), steaming, boiling, roasting, baking, smoking, microwaving etc. The cooking apparatus may or may not use a heater.

Similarly, a food container, ingredient container, or container, can be a bowl, a plate, a cup, a jar, a bottle, a flat board, a basket, a net, a wok, a pan, or any object used to contain or otherwise hold a food or a food ingredient. A container can have a rather arbitrary geometric shape. It is possible that different ingredient containers may have different shapes. It is possible that different food containers may have different shapes. It is possible that different cooking containers may have different shapes. It is possible that different cookware may have different shapes.

An enclosure component is meant to be a solid. A plurality of solids may be shaped to enclose a space; and in this case the solids may be referred to as enclosure components. A container and a lid can be examples of enclosure components as the lid and the container may enclose a space, often referred to as the interior of the container. The lid may optionally have the shape of a cap, but this is not a requirement in any sense. The caps described above may be substituted by other shapes. A flat board and a cap may enclose a space, often referred to as the interior of the cap. Two caps with similarly shaped edges (wherein the caps are positioned against each other along the edges) may also enclose a space. The walls, the floor, the ceiling, the windows, and the doors of a typical room (in a building) are also enclosing components which may together enclose a space, often referred to as the inside of the room.

A gripper is a device used to touch and grip an object such as a container. A gripper can be a rigid or elastic object as in FIGS. 4A-4E. In this patent application, a gripper may be pneumatic gripper, which is an actuating device that uses compressed air as power to pinch or grip an object. A gripper may be a vacuum chuck.

A gripping mechanism can be any mechanism that can be used to grip an object. A gripping mechanism may optionally comprise a gripper such as a vacuum chuck. A gripping mechanism may optionally comprise a plurality of rigid or elastic grippers which are moved to grip an object. A gripping mechanism may optionally comprise a robot hand. In fact, a robot hand may be used as a gripping mechanism for our purposes.

A motion mechanism can be any mechanism that can be used to produce a movement of an object, which may be a component of the motion mechanism or an object that is rigidly or fixedly connected to a component of the motion mechanism. A motion mechanism may produce a linear motion of a component. A motion mechanism may produce a rotation of a component. A motion mechanism may comprise a robot arm. A motion mechanism may be a combination motion mechanism comprising a plurality of motion sub-mechanisms. A motion mechanism may comprise: a crank rod mechanism; an eccentric motion mechanism; etc. A motion mechanism may comprise one or more the following parts: motor; encoder; shaft; coupling; bearing housing; bearings and accessories; gear and rack; screw rod and screw nut; cylinder; hydraulic cylinder; electromagnet; cam; eccentric shaft; Geneva mechanism, etc. Motion mechanisms can be more complex, and the motions produced by a motion mechanism can be a planar motion, a spherical motion, an oscillatory or vibratory motion, see e.g., U.S. patent application Ser. Nos. 16/997,196, 15/706,136 (in this application a motion mechanism may be referred to as a transport mechanism), Ser. Nos. 15/801,923, and 15/798,357. The entire contents of the above applications are hereby incorporated herein by reference.

It should be noted that the linear motion produced by the linear motion mechanism may be a linear motion between two end-positions or a linear motion with multiple stop positions. Any robot arm may be used as a motion mechanism for our purposes.

A transfer apparatus can be any apparatus that can be used to transfer an object (such as a container) from one position to another. A transfer apparatus may comprise: a gripping mechanism comprising a support component and one or more grippers; and a combination motion mechanism which is a combination of a plurality of motion sub-mechanisms, said combination motion mechanism being configured to move the support component of the gripping mechanism. A transfer apparatus may comprise a robot arm and a gripping mechanism. A robotic apparatus comprising a combination of a robot arm and a robot hand may be used as a transfer apparatus for our purposes.

An ingredient dispensing apparatus can be any apparatus that can be used to dispense a food or a food ingredient from an ingredient container into a cookware or a cooking container. A typical dispensing apparatus of the food or food ingredient may comprise: a gripping mechanism configured to grip an ingredient container, and a motion mechanism configured to move a (support) component of gripping mechanism. There are more examples in U.S. Pat. No. 10,455,987 and U.S. patent application Ser. No. 15/798,357. In particular, a robotic apparatus comprising a robot hand and robot arm may be used as an ingredient dispensing apparatus. This is often used in prior art.

A food dispensing apparatus can be any apparatus that can be used to dispense a cooked (or semi-cooked) food from a cookware into another container. A food dispensing apparatus may comprise a motion mechanism which moves the cookware. A food dispensing apparatus may alternatively comprise a robotic apparatus comprising a robot arm and a robot hand that moves the cookware, and this is often the case when the cookware is not fixedly attached to another (relatively heavy) mechanism.

There is a difference between transfer apparatus and ingredient (or food) dispensing apparatus, as follows. A dispensing apparatus needs to turn (or rotate) a gripped container upside down or by some angle of say, 90 to 180 degrees, to dispense the food or food ingredient contained in the container to another container. In comparison, a transfer apparatus does not need to turn (or rotate) a gripped container, since the food or food ingredient is not to be dispensed from the container. Indeed, it is advantageous (though not always a strict requirement) for the transfer apparatus to keep the gripped container in an upright or nearly upright position, so as to not let the food or food ingredient drop out. Even if the container is sealed by a cover or lid, there is no need for the food or food ingredient to touch the cover or lid.

Each vertical motion mechanism as described above may be substituted by a motion mechanism which can produce a linear or non-linear motion in an upward or downward direction, where an upward direction needs not to be exactly vertical. It can have an inclination angle between 0 and 90 degrees. The same applies to each horizontal motion mechanism described above.

A liquid dispensing apparatus can be any apparatus that can be used to dispense a liquid ingredient from a container into a cookware. A liquid dispensing apparatus may comprise liquid pipes, a liquid pump, a valve, and/or flow sensors, etc. There are more examples in U.S. Pat. No. 10,455,987.

A cooking apparatus can be any apparatus comprising a cookware. A cooking apparatus may optionally further comprise a motion mechanism configured to move the cookware. The motion mechanism may optionally comprise a motion sub-mechanism configured to move the cookware to stir the food or food ingredient(s) in the cookware. The motion mechanism may optionally comprise a motion sub-mechanism configured to move the cookware to dispense a cooked (or semi-cooked) food from the cookware. A cooking apparatus may optionally comprise a transfer apparatus configured to move the cookware. Said transfer apparatus may optionally grip and turn the cookware to dispense a cooked (or semi-cooked) food from the cookware. Examples of cooking apparatuses are given in U.S. Pat. No. 10,455,987 and U.S. patent application Ser. Nos. 16/997,196, 15/706,136, 16/155,895, 15/801,923, and 15/869,805, the entire disclosures of which are hereby incorporated herein by reference.

A cleaning apparatus can be any apparatus that can be used to clean an object, e.g., a funnel, or a container such as cookware, food container, or ingredient container. A cleaning apparatus comprises a liquid source (e.g., tap water, or a water tank) and a liquid pipe to transfer the liquid from the source to the object; wherein the liquid flow may be controlled by a valve, a liquid pump, and/or by other known techniques; wherein the liquid may be referred to as a cleaning liquid, such as hot water, for the purpose of cleaning the object. In some applications, the liquid may be sprayed onto the object at high speed, but this is not a requirement. A cleaning apparatus may optionally further comprise a stirrer which is rotated to stir the cleaning liquid in the object, e.g., a container, which is cleaned by the cleaning apparatus. A cleaning apparatus may optionally comprise a motion mechanism configured to move the water pipes and stirrers away from or towards the object, which is cleaned or to be cleaned by the cleaning apparatus.

A transport system can be any system that can be used to transfer a container (such as, an ingredient container, a food container, a cookware, or a cooking container). In some applications (but not always), a transport system can move a container after the container is placed on a member of the transport system. For example, a transport system may include a plurality of vehicles each configured to carry and transport a container; wherein the vehicles may optionally move on rail tracks. A transport system may optionally comprise a rotating turntable, or a cyclic motion mechanism, a chain, and/or a belt. Examples of transport systems are given in U.S. Pat. No. 10,455,987 and U.S. patent application Ser. Nos. 15/798,357, 16/997,933, and 16/155,895, the entire disclosures of which are hereby incorporated herein by reference. A transport system may only comprise a transfer apparatus.

A container holder is a solid which has an adequate shape to position or hold a container of a certain shape.

A "container holder configured to position or hold a container" may be any solid which has the shape to (steadily) position the container or to (steadily) hold the container. For example, if the container is a bowl, then a table, a horizontally placed net, or a ring of a matching shape, a platform, a device consisting of two properly placed parallel sticks, can be a container holder configured to position or hold the bowl. In other applications, a "container holder configured to position or hold a container" may be a device or mechanism that can be moved to position or hold the container. Thus, a gripping mechanism which can grip the container may also be considered a container holder configured to hold the container.

A container transfer apparatus can be any transfer apparatus used to move a container to a (different) member of a transport system. The container transfer apparatus can optionally be a part of the transport system.

A heater for the purpose of cooking in the known technique may substitute any stove and heater disclosed in the present application.

In our patent application, a computer system may or may not comprise a network. A computer system may be a single computer in some simpler applications.

A loading apparatus can be any transfer apparatus used to move a container to a (different) member of a transport system. The loading apparatus can optionally be a part of the transport system.

Control by a computer or computer system of a motor, an actuator, a heater, or electrical or electronic devices is by known techniques.

It should be noted that a cooking system may comprise several different motion mechanisms. For the purpose of our patent application, if a first apparatus (or equipment) is different from a second apparatus (or equipment), then a motion mechanism of the first apparatus is implicitly different from a motion mechanism of the second apparatus. For example, we may say that "a first cooking apparatus comprises a motion mechanism and a second cooking apparatus comprises a motion mechanism." Such words should be compared with: "a first vehicle (e.g., a truck) comprises a motor and a second vehicle (e.g., a car) comprises a motor." Implicitly, the motor of the second vehicle is a different motor than the motor of the first vehicle; and the two motors may or may not have the same configuration. Thus, in plain meanings, the motion mechanism of the second cooking apparatus is a different motion mechanism than the motion mechanisms of the first cooking apparatus. Different motion mechanisms may or may not have the same design and configuration. The same comment applies to various gripping mechanisms, various support components, various motors, and/or various grippers, etc.

Generally speaking, components belonging to different equipment are implicitly not the same mechanism, even if they have the same design and configuration and/or they are referred to by the same words (e.g., gripping mechanism).

What is claimed is:

1. An automated cooking system comprising:
a first cooking apparatus comprising:
a plurality of microwave ovens, each said microwave oven comprising:
a first enclosure component comprising a first solid;
a second enclosure component comprising a second solid; and
a first motion mechanism configured to move the second enclosure component between a first position and a second position, said first motion mechanism comprising a first motor or other driving mechanism; and
a magnetron or microwave generator;
wherein the first enclosure component and the second enclosure component are configured to enclose a cooking chamber when the second enclosure component is moved to the first position by the first motion mechanism, wherein the cooking chamber is configured to position a cooking container, wherein the cooking container is a container used to contain or hold a food or one or more food ingredients;
wherein the magnetron or microwave generator is configured to generate electromagnetic waves of microwave frequencies in the cooking chamber to heat the food or food ingredients contained or held in the cooking container positioned in the cooking chamber; and
a second motion mechanism comprising a second motor, said second motion mechanism being configured to move the first enclosure components of the microwave ovens among a plurality of positions; and
a second cooking apparatus comprising a cookware, said cookware being configured to contain or hold a food or one or more food ingredients;
wherein the second cooking apparatus is configured to produce a cooked food from the food or food ingredients;
wherein the food or food ingredients heated by one of the plurality of microwave ovens of the first cooking apparatus may be used as a food ingredient for the second cooking apparatus.

2. The cooking system of claim 1, further comprising a plurality of ingredient containers each configured to contain or hold food ingredients.

3. The cooking system of claim 1, further comprising a storage configured to position or store a number of ingredient containers, wherein each ingredient container is used to contain or hold one or more food ingredients.

4. The cooking system of claim 1, wherein the first cooking apparatus further comprises an ingredient dispensing apparatus configured to move an ingredient container to dispense one or more food ingredients from the ingredient container to the cooking container that is positioned in one of the cooking chambers of the first cooking apparatus, wherein the ingredient container is used to contain or hold the food ingredients, said ingredient dispensing apparatus comprising:
a gripping mechanism comprising a support component and one or more grippers, said gripping mechanism being configured to grip the ingredient container; and
a third motion mechanism configured to move the support component of the gripping mechanism, said third motion mechanism comprising a third motor or other driving mechanism.

5. The cooking system of claim 1, wherein the second cooking apparatus further comprises an ingredient dispensing apparatus configured to move an ingredient container to dispense one or more food ingredients from the ingredient container to the cookware of second cooking apparatus, wherein the ingredient container is used to contain or hold the food ingredients, said ingredient dispensing apparatus comprising:
- a gripping mechanism comprising a support component and one or more grippers, said gripping mechanism being configured to grip the ingredient container; and
- a fourth motion mechanism configured to move the support component of the gripping mechanism, said fourth motion mechanism comprising a fourth motor or other driving mechanism.

6. The cooking system of claim 1, further comprising a transport system configured to transport an ingredient container, wherein the ingredient container is used to contain or hold one or more food ingredients.

7. The cooking system of claim 6, wherein the transport system comprises a plurality of vehicles, said cooking system further comprising a container transfer apparatus configured to load an ingredient container to one of the plurality of vehicles, wherein the ingredient container is used to contain or hold one or more food ingredients, said container transfer apparatus comprising:
- a gripping mechanism comprising a support component and one or more grippers, said gripping mechanism being configured to grip the ingredient container; and
- a fifth motion mechanism configured to move the support component of the gripping mechanism, said fifth motion mechanism comprising a fifth motor or other driving mechanism.

8. The cooking system of claim 1, wherein the second cooking apparatus further comprises a liquid dispensing apparatus configured to dispense a liquid ingredient to the cookware of the second cooking apparatus, said liquid dispensing apparatus comprising a liquid pipe, a liquid container, and/or a pump.

9. The cooking system of claim 1, further comprising a dispensing apparatus configured to dispense a heated food or food ingredients from the cooking container that is positioned in one of the cooking chambers of the first cooking apparatus to the cookware of the second cooking apparatus, said dispensing apparatus comprising:
- a gripping mechanism comprising a first support component and one or more grippers, said gripping mechanism being configured to grip the cooking container; and
- a sixth motion mechanism configured to move the first support component of the gripping mechanism, said sixth motion mechanism comprising:
  - a first motion sub-mechanism comprising a sixth motor and a second support component, said first motion sub-mechanism being configured to produce a motion of the first support component of the gripping mechanism;
  - a second motion sub-mechanism comprising a seventh motor and a third support component, said second motion sub-mechanism being configured to produce a motion of the second support component of the first motion sub-mechanism; and
  - a third motion sub-mechanism comprising an eighth motor and a fourth support component, said third motion sub-mechanism being configured to produce a motion of the third support component of the second motion sub-mechanism.

10. The cooking system of claim 9, wherein the motion produced by the first motion sub-mechanism in the dispensing apparatus is a rotation, wherein the motion produced by the second motion sub-mechanism in the dispensing apparatus is a vertical linear motion, wherein the motion produced by the third motion sub-mechanism in the dispensing apparatus is a rotation.

11. The cooking system of claim 1, further comprising a dispensing apparatus comprising a robotic apparatus comprising a robot hand and one or more robot fingers, said dispensing apparatus being configured to move the cooking container to dispense a cooked food from the cooking container to the cookware of the second cooking apparatus, wherein the cooking container is used to contain the cooked food and is positioned in the cooking chamber of one of the plurality of microwave ovens of the first cooking apparatus prior to the dispensing.

12. The cooking system of claim 1, wherein the second cooking apparatus further comprises a motion mechanism configured to move the cookware to dispense a cooked food from the cookware to a food container, wherein the food container is used to contain or hold the cooked food, said motion mechanism comprising a ninth motor.

13. The cooking system of claim 1, wherein the second enclosure component of each microwave oven comprises a cap or a lid.

14. A cooking system comprising
a first cooking apparatus, said first cooking apparatus comprising:
- a plurality of microwave ovens, each said microwave oven comprising:
  - a first enclosure component comprising a first solid;
  - a second enclosure component comprising a second solid;
  - a first motion mechanism configured to move the second enclosure component between a first position and a second position, said first motion mechanism comprising a first motor or other driving mechanism; and
  - a magnetron or microwave generator;
  - wherein the first enclosure component and the second enclosure component are configured to enclose a cooking chamber when the second enclosure component is moved to the first position by the first motion mechanism, wherein the cooking chamber is configured to position a cooking container, wherein the cooking container is a container used to contain or hold a food or one or more food ingredients;
  - wherein the magnetron or microwave generator is configured to generate electromagnetic waves of microwave frequencies in the cooking chamber to heat the food or food ingredients contained or held in the cooking container positioned in the cooking chamber; and
- a second motion mechanism comprising a second motor, said second motion mechanism being configured to move the first enclosure components of the microwave ovens among a plurality of positions.

15. A cooking system comprising:
a first cooking apparatus comprising:
- a plurality of microwave ovens, each said microwave oven comprising:
  - a first enclosure component comprising a first solid;
  - a second enclosure component comprising a second solid;
  - a first motion mechanism configured to move the second enclosure component between a first position and a second position, said first motion mechanism comprising a first motor or other driving mechanism; and a magnetron or microwave generator;

wherein the first enclosure component and the second enclosure component are configured to enclose a cooking chamber when the second enclosure component is moved to the first position by the first motion mechanism, wherein the cooking chamber is configured to position a cooking container, wherein the cooking container is a container used to hold a food or one or more food ingredients;

wherein the magnetron or microwave generator is configured to generate electromagnetic waves of microwave frequencies in the cooking chamber to heat the food or food ingredients contained or held in the cooking container positioned in the cooking chamber;

a second motion mechanism comprising a second motor, said second motion mechanism being configured to move the first enclosure components of the microwave ovens among a plurality of positions; and a transfer apparatus configured to grip and move the cooking container to and from one of the cooking chambers of the first cooking apparatus, wherein the cooking container is used to contain or hold a food or one or more food ingredients, said transfer apparatus comprising:

a gripping mechanism comprising a support component and one or more grippers, said gripping mechanism being configured to grip the cooking container; and a third motion mechanism configured to move the support component of the gripping mechanism, said third motion mechanism comprising a third motor or other driving mechanism.

16. The cooking system of claim 15, wherein the motion produced by the second motion mechanism is configured to be an intermittent rotation around a vertical axis.

17. The cooking system of claim 15, further comprising an ingredient dispensing apparatus configured to move an ingredient container to dispense one or more food ingredients from the ingredient container to the cooking container that is positioned in one of the cooking chambers of the first cooking apparatus, wherein the ingredient container is used to contain or hold the food ingredients, said ingredient dispensing apparatus comprising:

a gripping mechanism comprising a support component and one or more grippers, said gripping mechanism being configured to grip the ingredient container; and a fourth motion mechanism configured to move the support component of the gripping mechanism, said fourth motion mechanism comprising a fourth motor or other driving mechanism.

18. The cooking system of claim 15, wherein each said microwave oven further comprises a cover configured to be rigidly, fixedly, or elastically connected to the second enclosure component of the microwave oven, said cover being configured to cover the cooking container when the second enclosure component is moved to the first position and when the cooking container is positioned in the cooking chamber of the microwave oven, wherein the cooking container is used to hold a food or one or more food ingredients.

19. The cooking system of claim 15, wherein the motion produced by the first motion mechanism of one of the plurality of microwave ovens of the first cooking apparatus is configured to be a rotation or a linear motion.

20. The cooking system of claim 15, wherein the gripping mechanism of the transfer apparatus comprises one or more robot fingers, wherein the third motion mechanism of the transfer apparatus comprises a robot arm.

* * * * *